United States Patent [19]
Jones

[11] Patent Number: 5,724,701
[45] Date of Patent: Mar. 10, 1998

[54] H.V.A.C. DUCT CLEANING SYSTEM

[76] Inventor: Edward Ames Jones, 242 W. Glen Ave., Ridgewood, N.J. 07450

[21] Appl. No.: 290,540

[22] Filed: Aug. 15, 1994

[51] Int. Cl.$^6$ ........................................................ F23J 3/02
[52] U.S. Cl. ........................................................ 15/304; 15/319
[58] Field of Search ........................ 15/304, 319, 327; 55/356, 469, 472

[56] References Cited

U.S. PATENT DOCUMENTS

| | | | |
|---|---|---|---|
| 3,381,328 | 5/1968 | Szabo | 15/327.1 |
| 3,484,890 | 12/1969 | Case | 15/327.1 |
| 4,473,921 | 10/1984 | Weber | 15/304 |
| 4,778,496 | 10/1988 | Conrad | 55/356 |
| 4,921,509 | 5/1990 | Maclin | 55/472 |
| 4,968,333 | 11/1990 | Ellis | 55/356 |
| 5,069,961 | 12/1991 | Travis | 55/356 |
| 5,072,487 | 12/1991 | Walton | 15/304 |
| 5,438,729 | 8/1995 | Powell | 15/304 |

FOREIGN PATENT DOCUMENTS

| | | | |
|---|---|---|---|
| 0002565 | 6/1985 | Finland | 15/304 |
| 2081936 | 2/1982 | United Kingdom | 15/319 |

*Primary Examiner*—David Scherbel
*Assistant Examiner*—Randall Chin
*Attorney, Agent, or Firm*—Friscia & Nussbaum

[57] ABSTRACT

This H.V.A.C. duct cleaning system comprises an air compressor connected to a manifold wherein at least one line is coupled to an air gun with a quick connect device while another line is connected to the duct cleaning system providing a pressurized exhaust to remove debris from the ducts. Fixed lengths of plastic tubing are connected to the air gun and one another by quick connects with the end tubing having an air head to dislodge dirt and other contaminants within the ducts. The duct cleaning system includes a series of filter and blower modules controlled by a variable frequency drive to convert and control power to the various blowers. A primary filter module is connected to the ducts, a main filter module connected to the outlet of the primary filter module or blower and a blower which preferably is a tube axial blower or can be a backwardly inclined centrifugal blower is connected to the outlet of either the primary or main filter module to provide a pressurized exhaust. The modules are mounted on aluminum carts with retractable handles, pneumatic or shock absorbing casters and pneumatic tires for ease of movement.

10 Claims, 64 Drawing Sheets

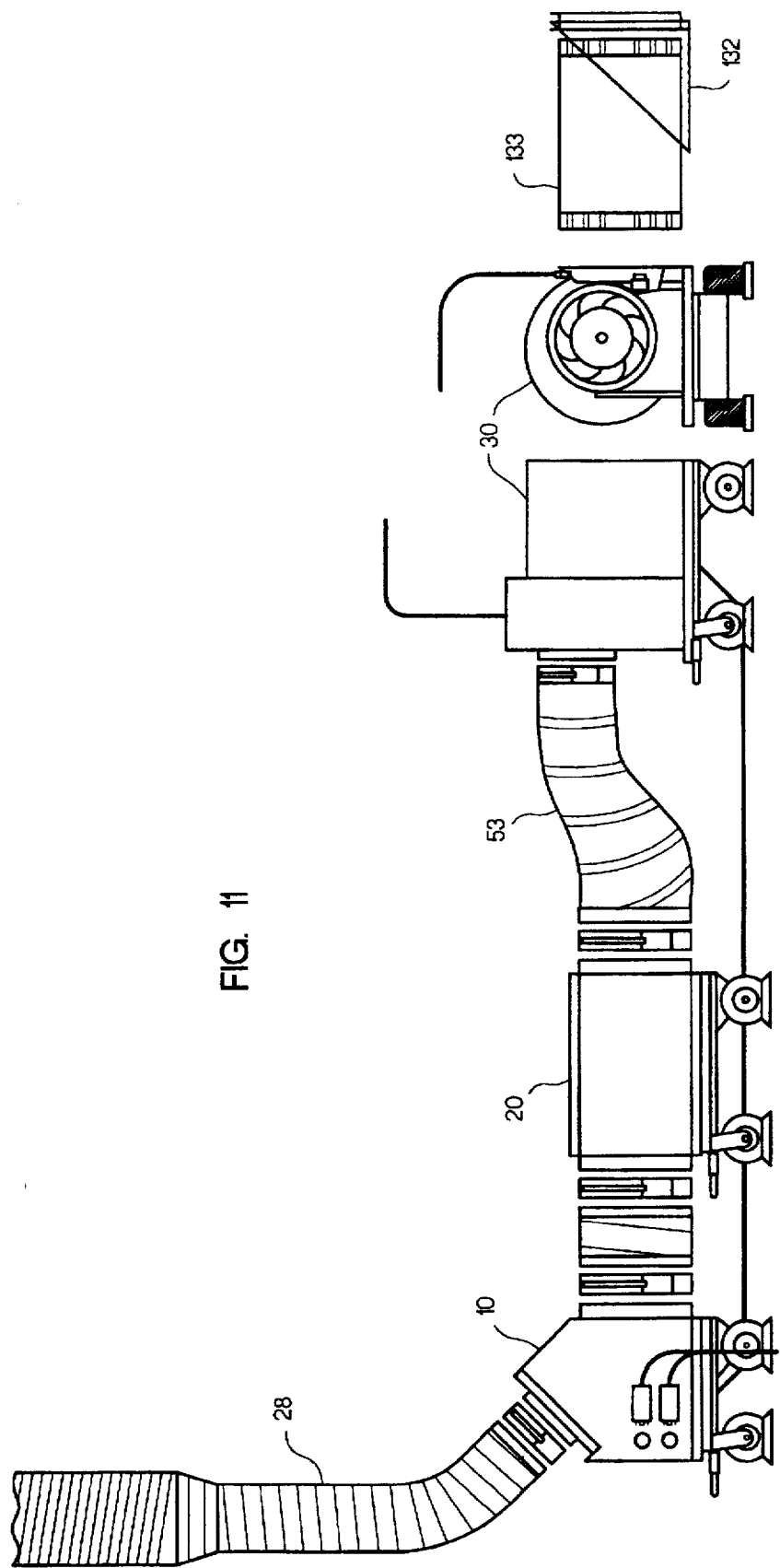

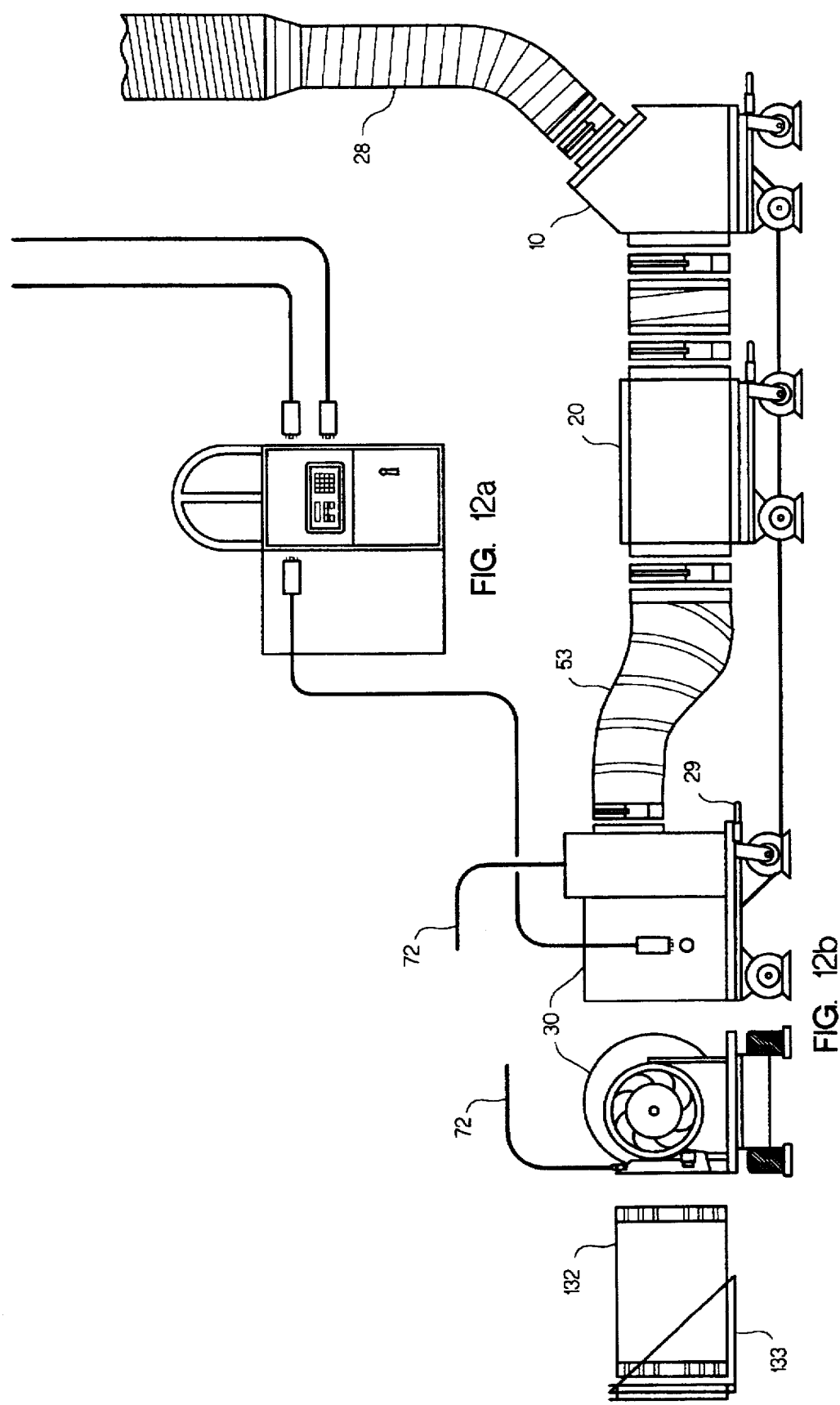

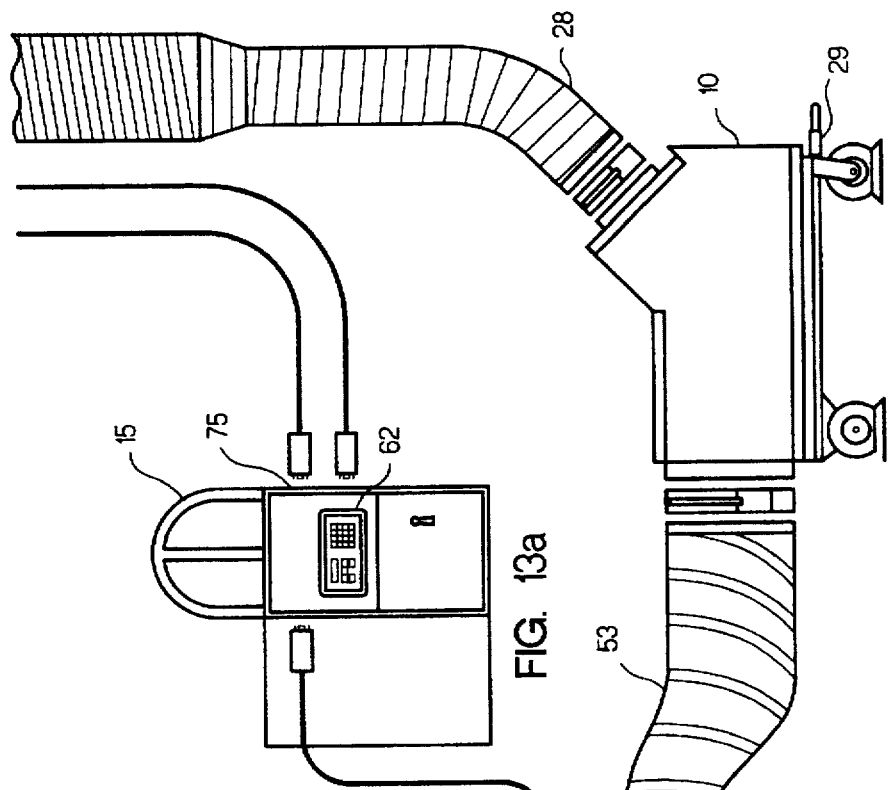
FIG. 13a
FIG. 13b
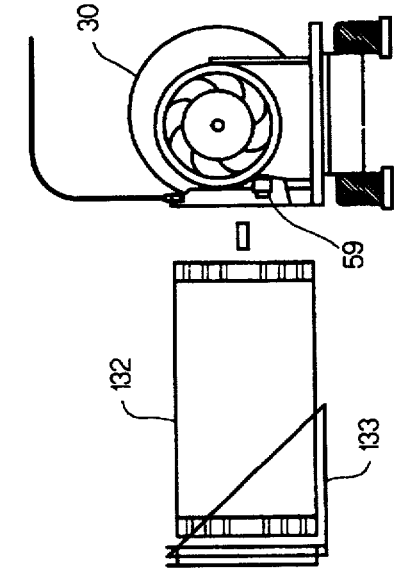
FIG. 13c

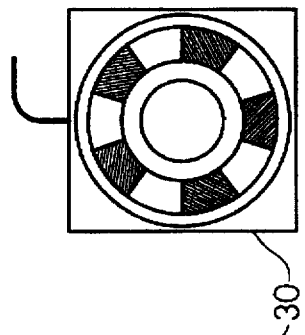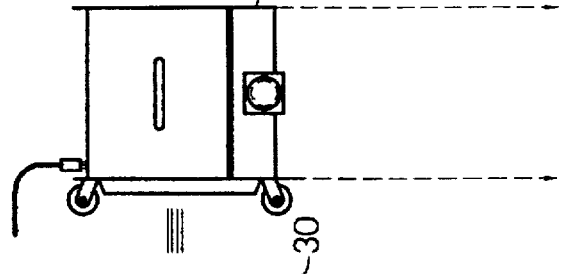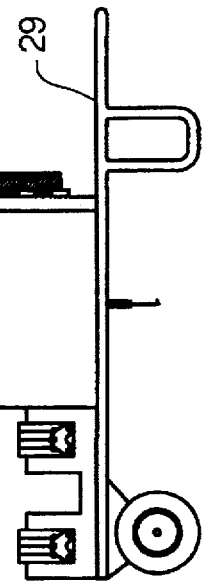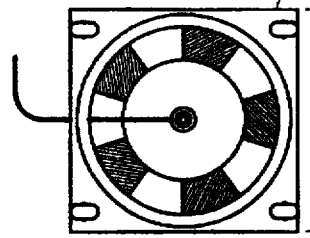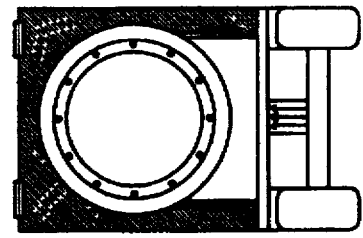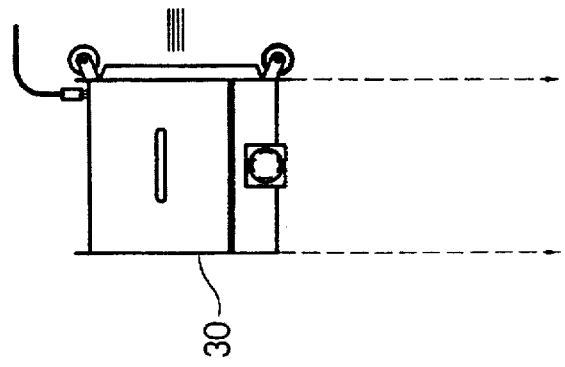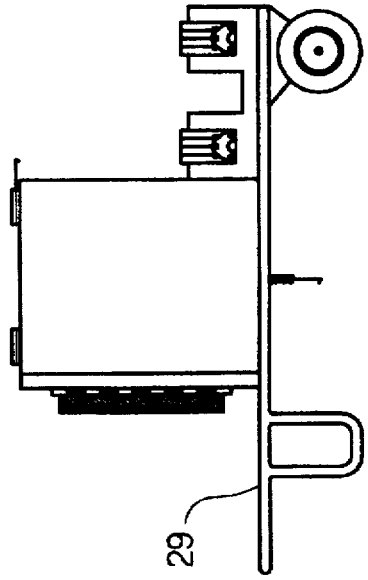

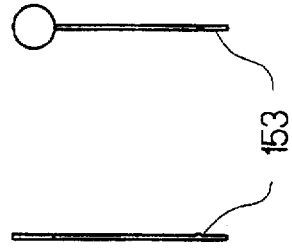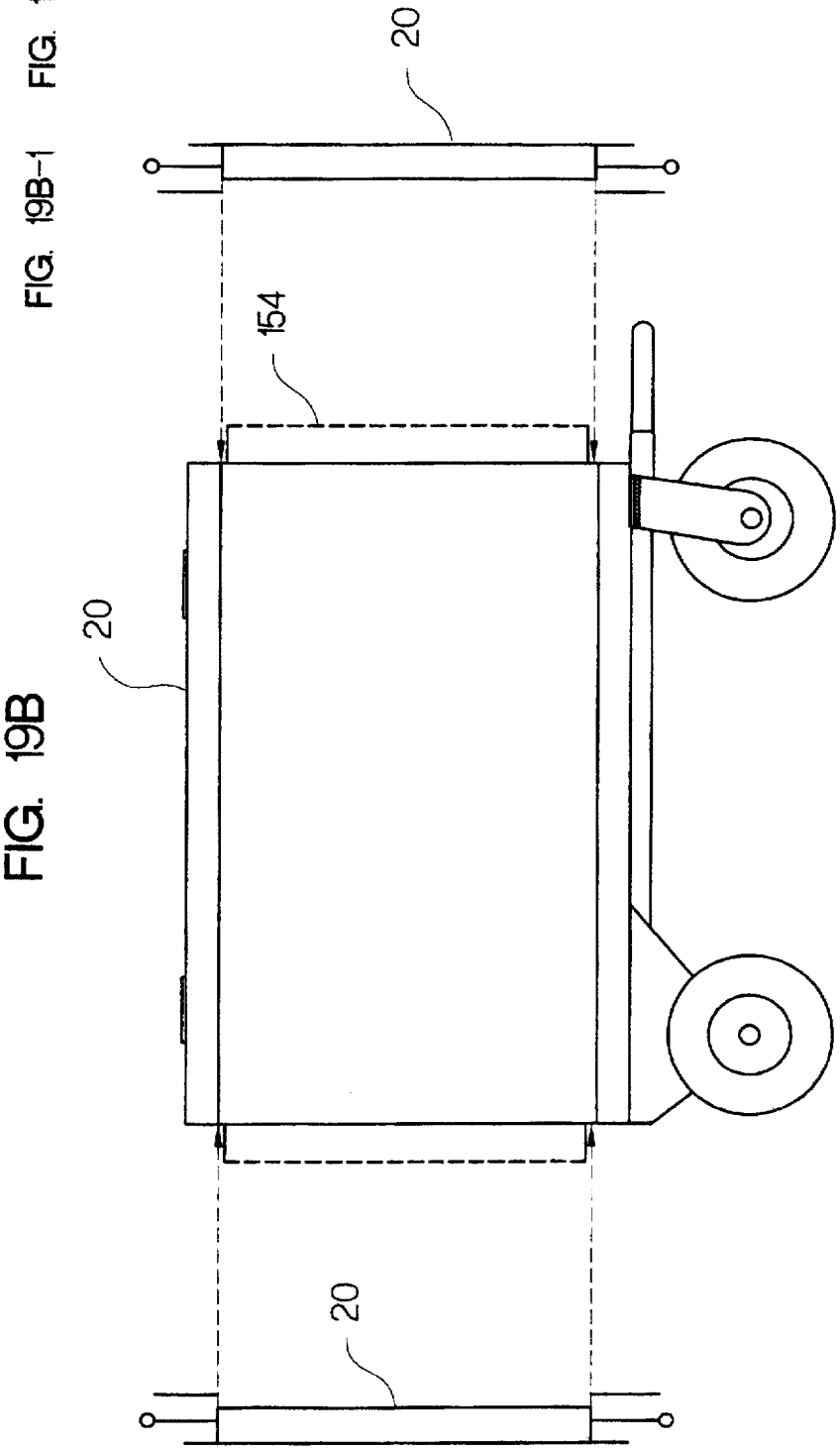

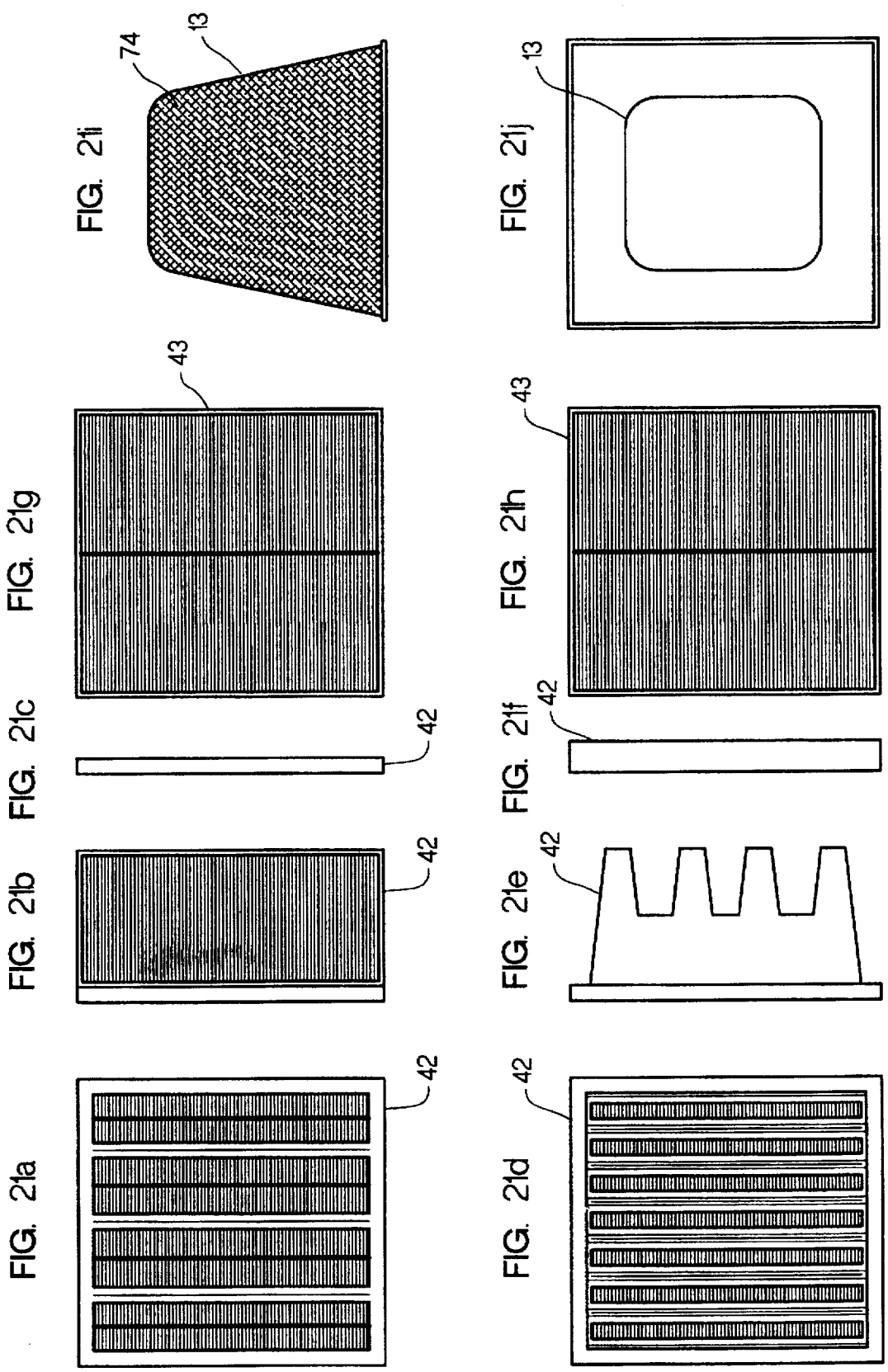

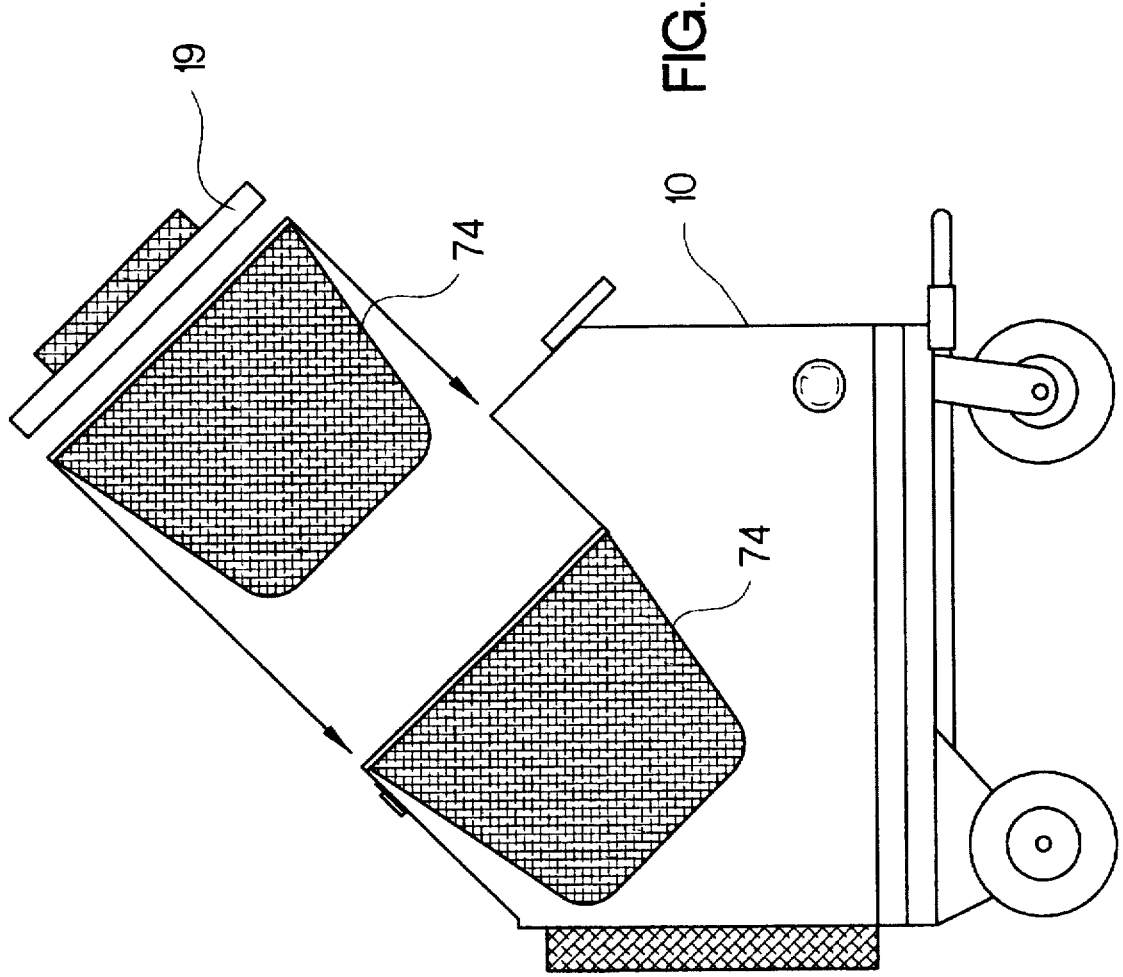

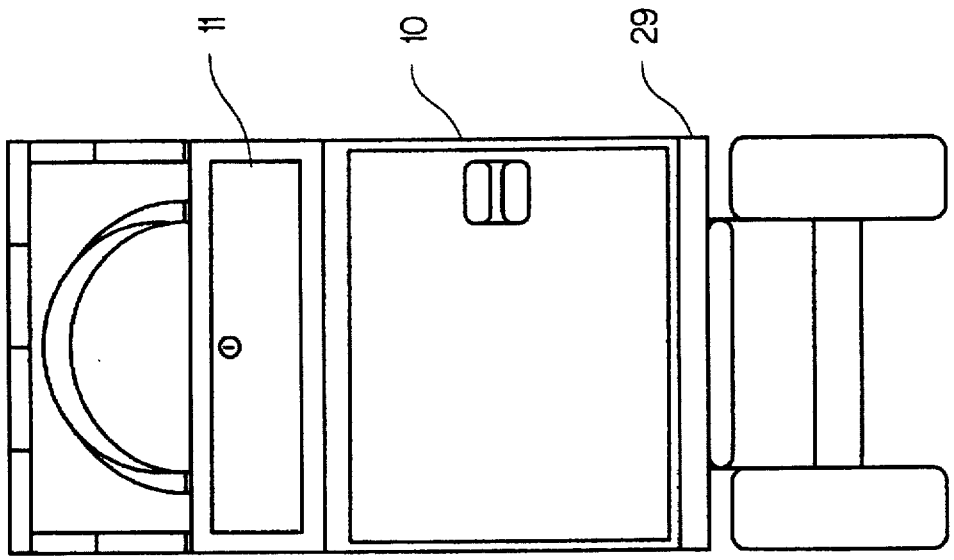
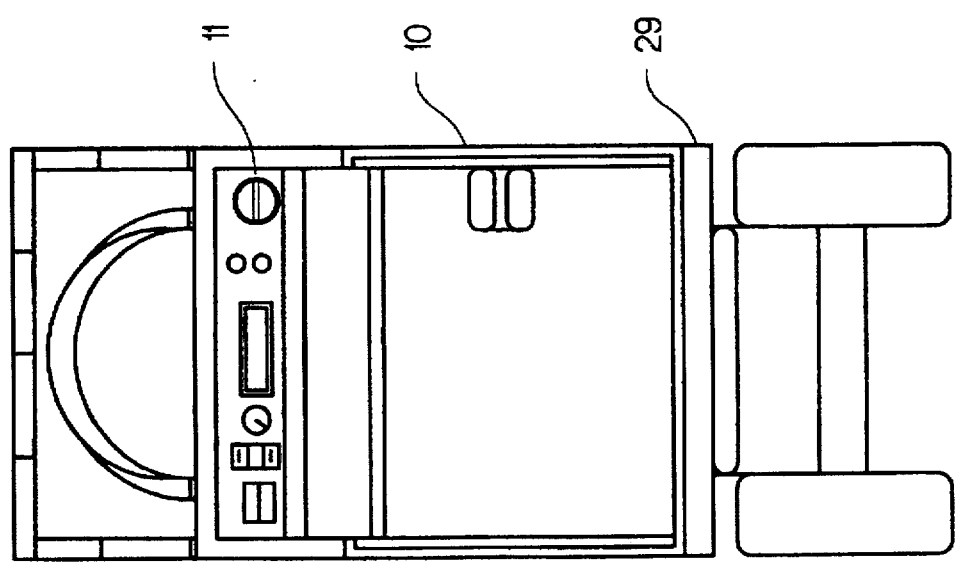

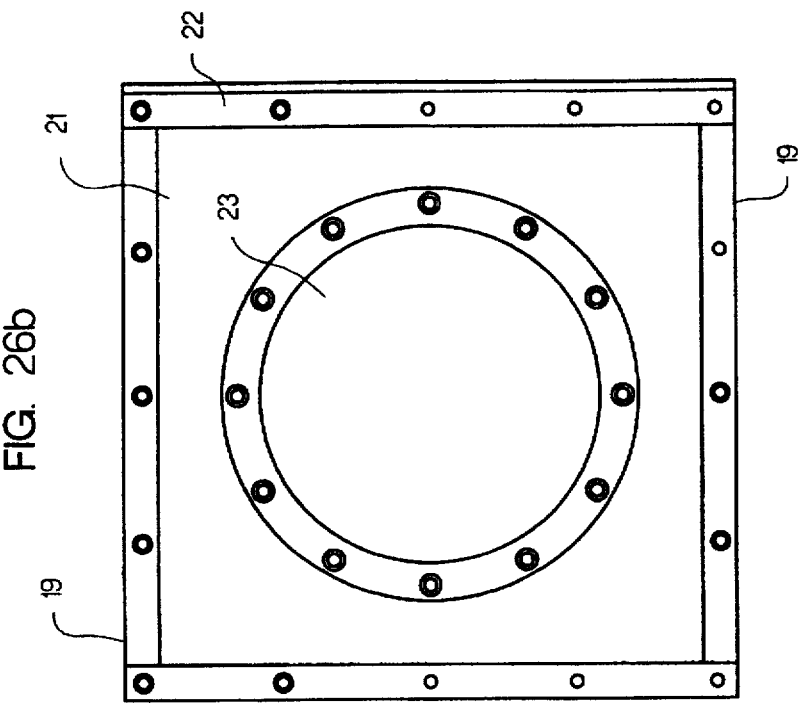
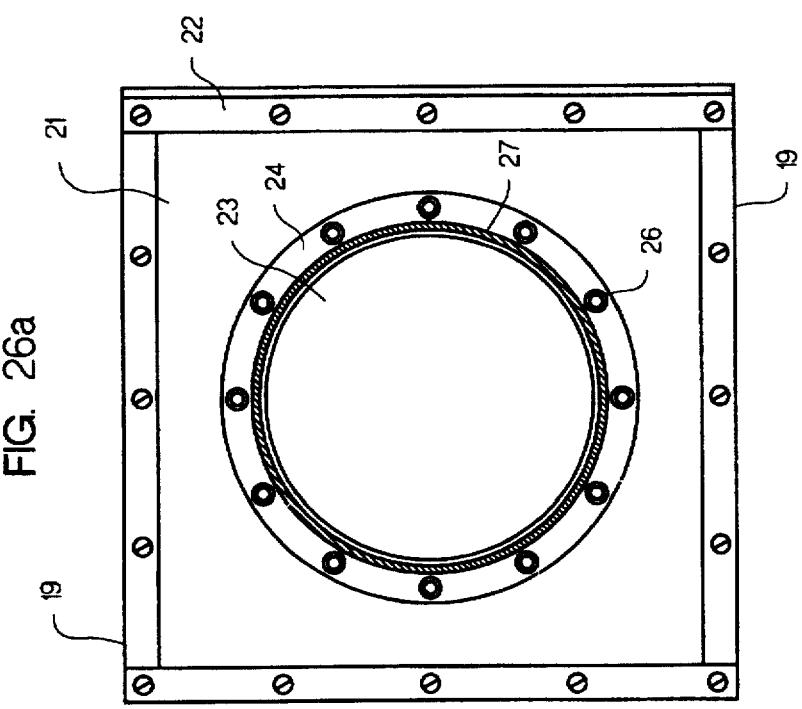
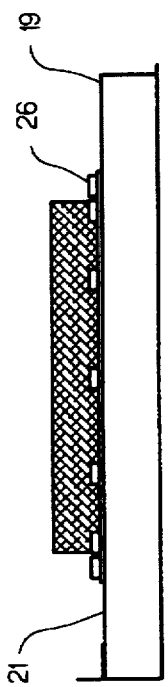
FIG. 26b
FIG. 26a
FIG. 26c

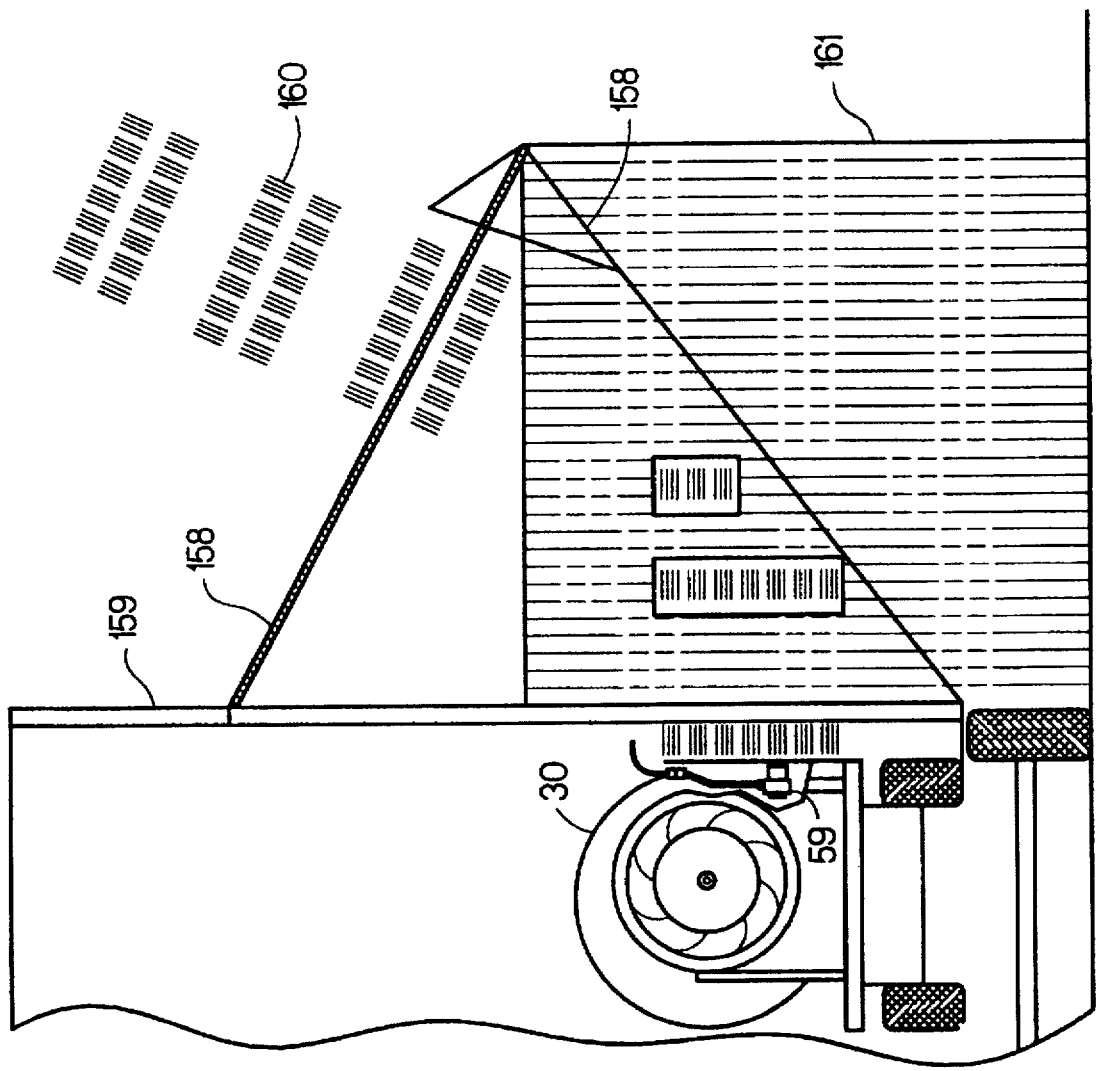

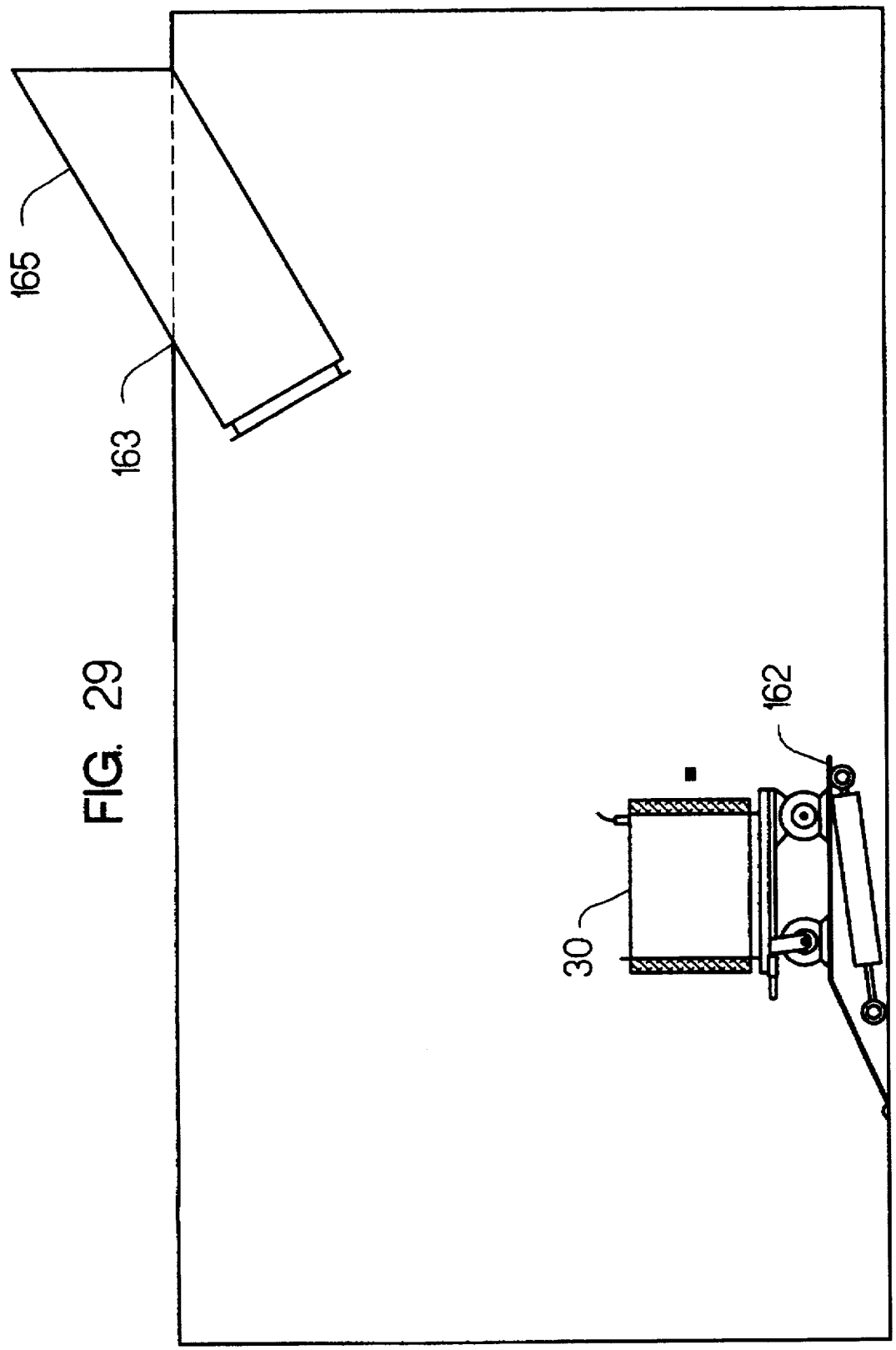

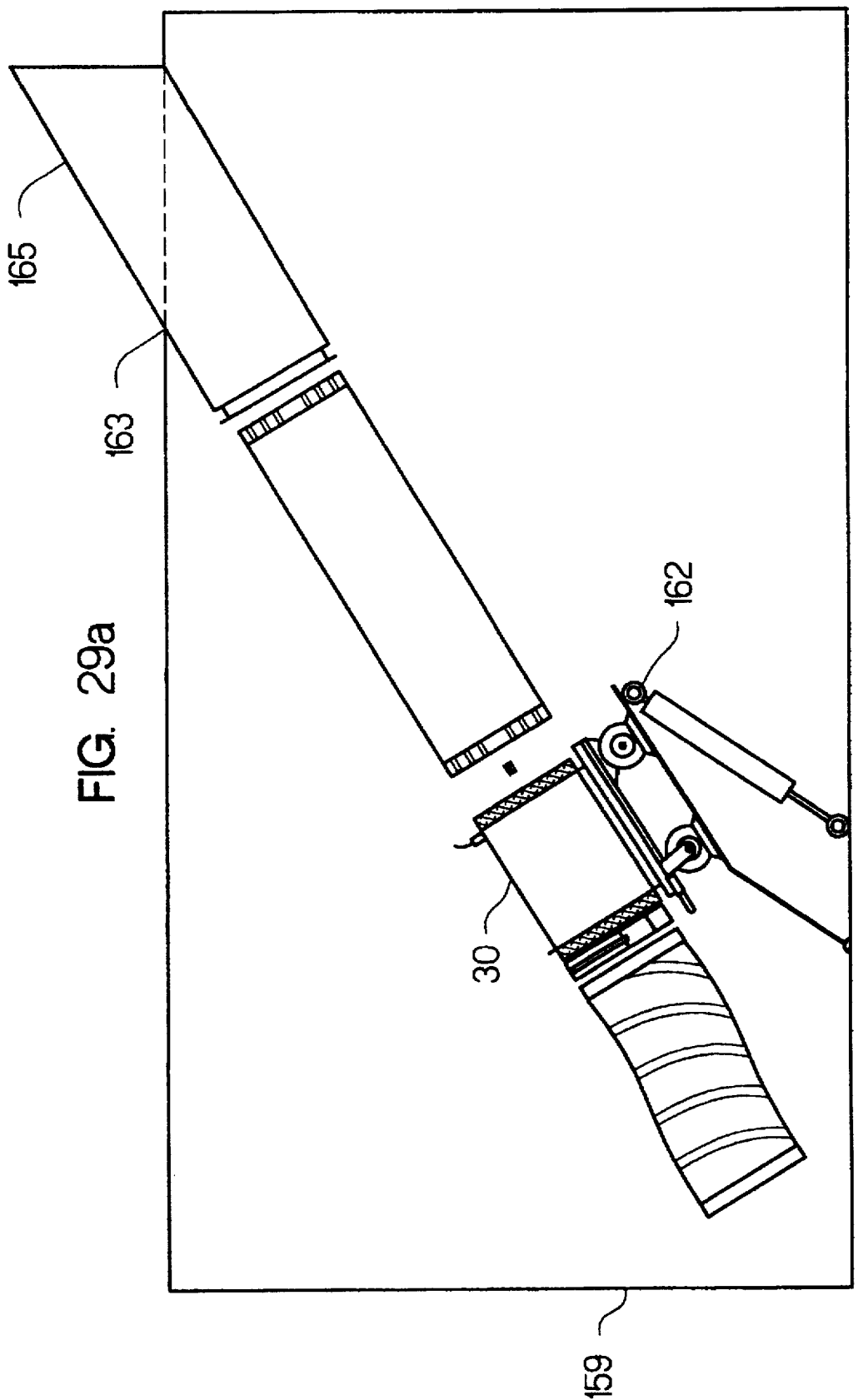

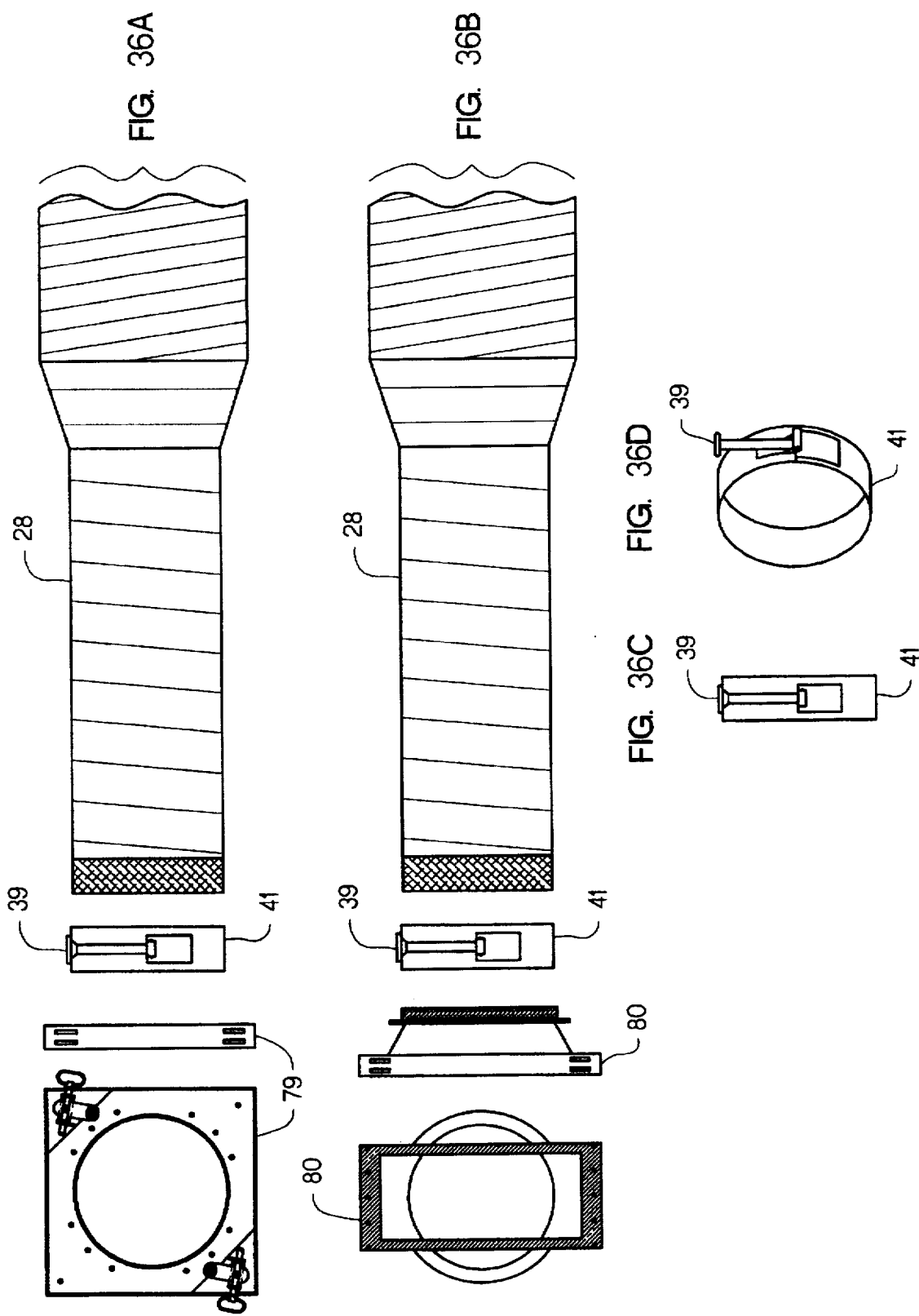

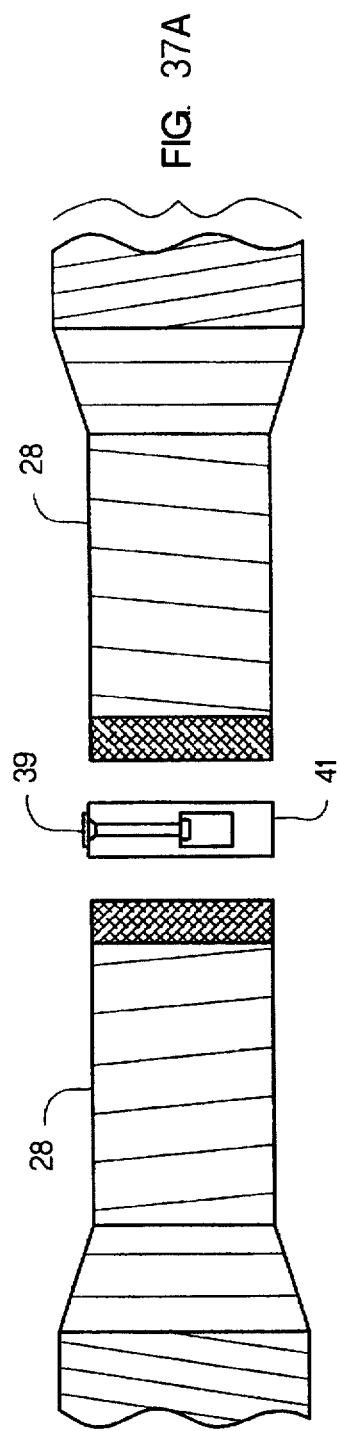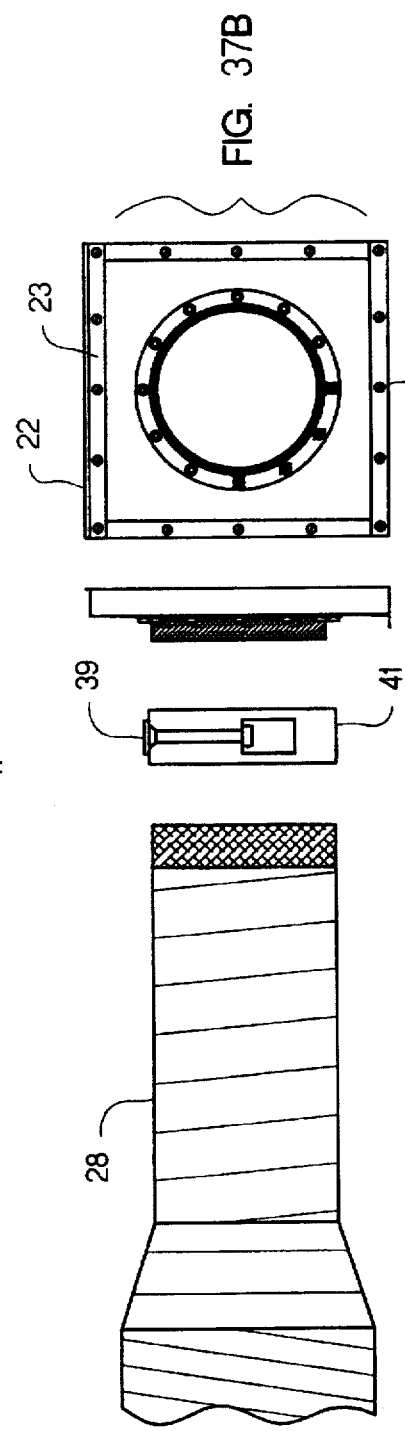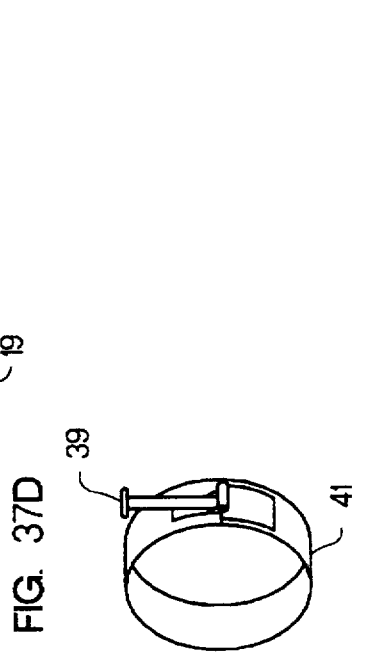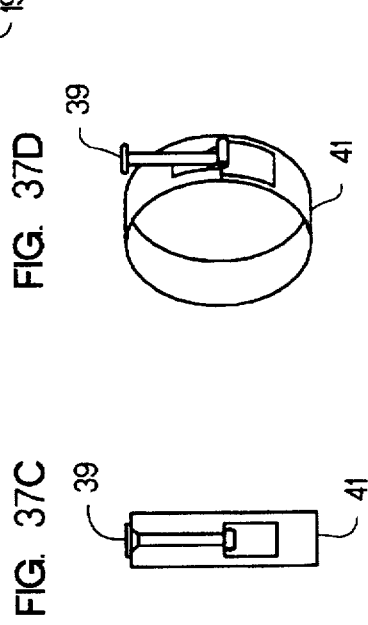

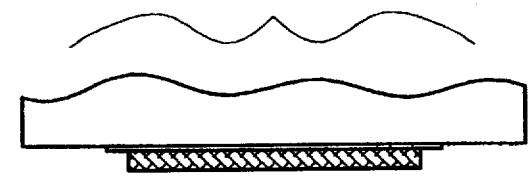
FIG. 38A
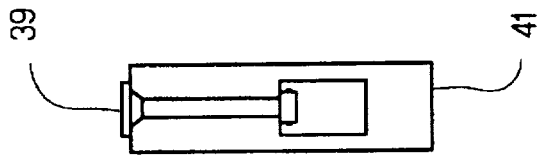
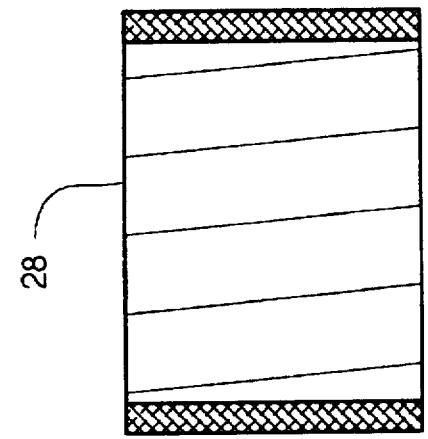
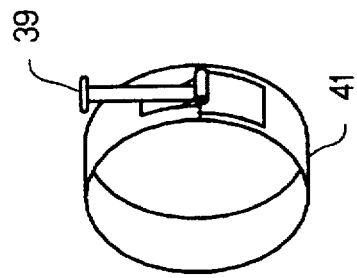
FIG. 38C
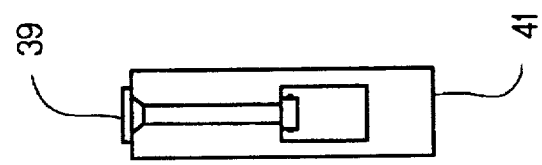
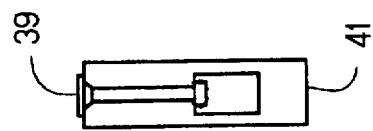
FIG. 38B

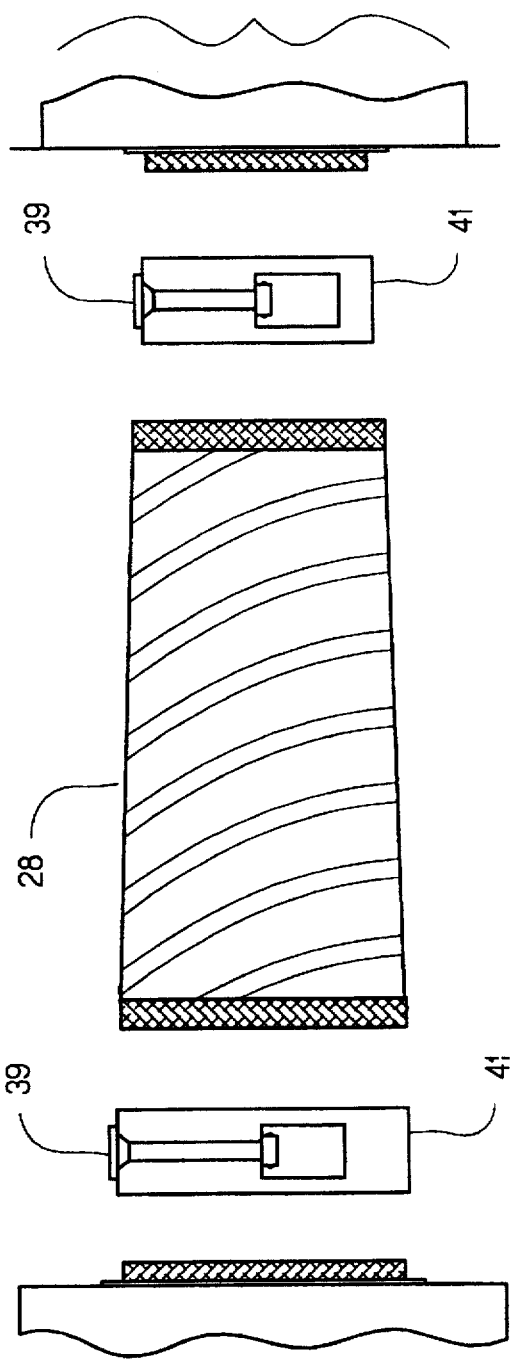
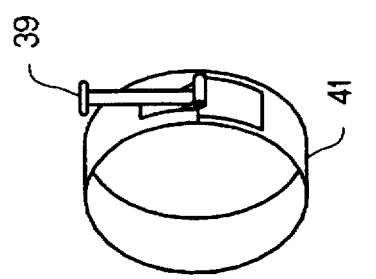
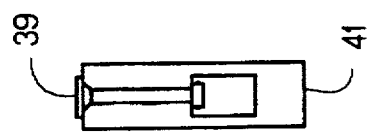
FIG. 39A
FIG. 39B
FIG. 39C

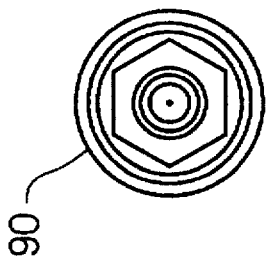
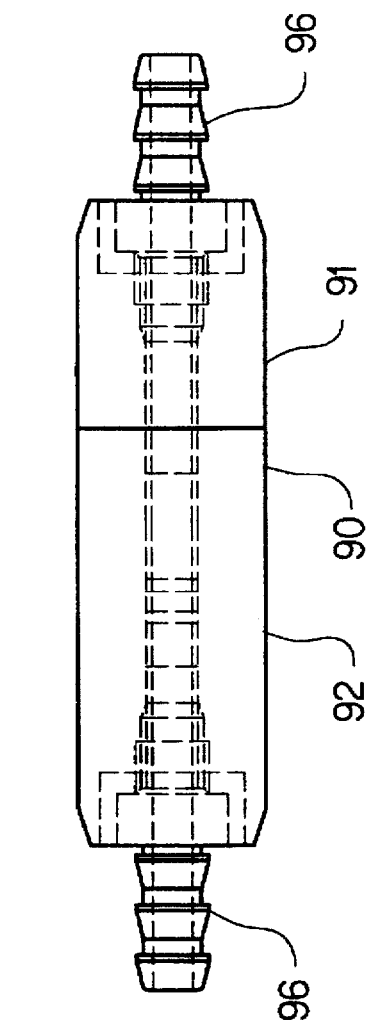
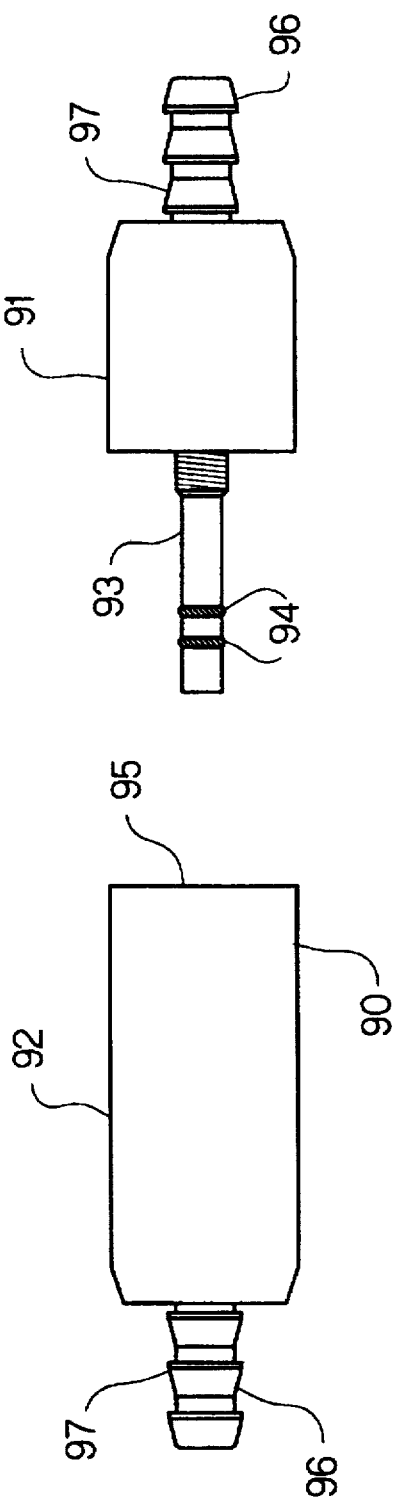

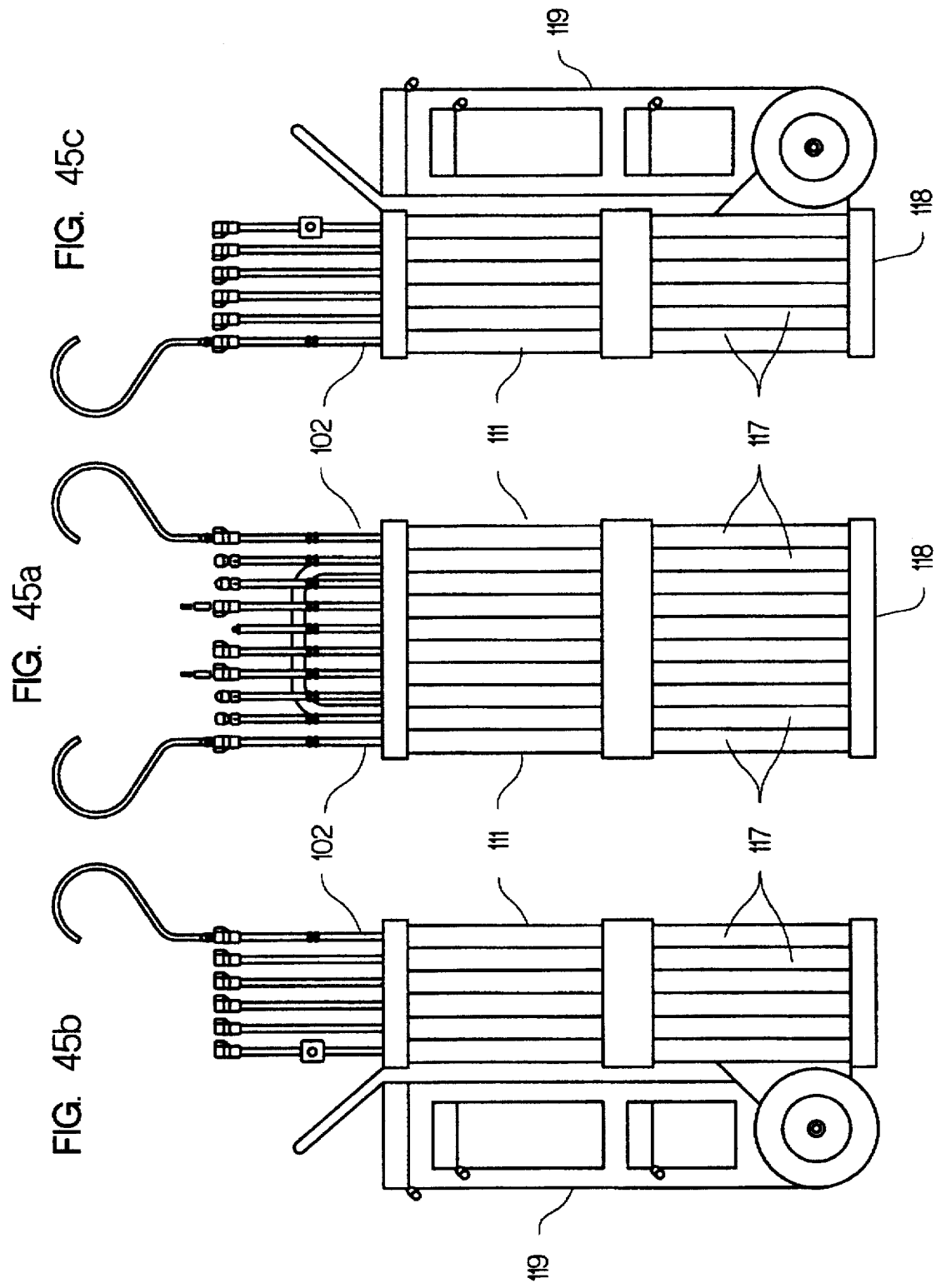

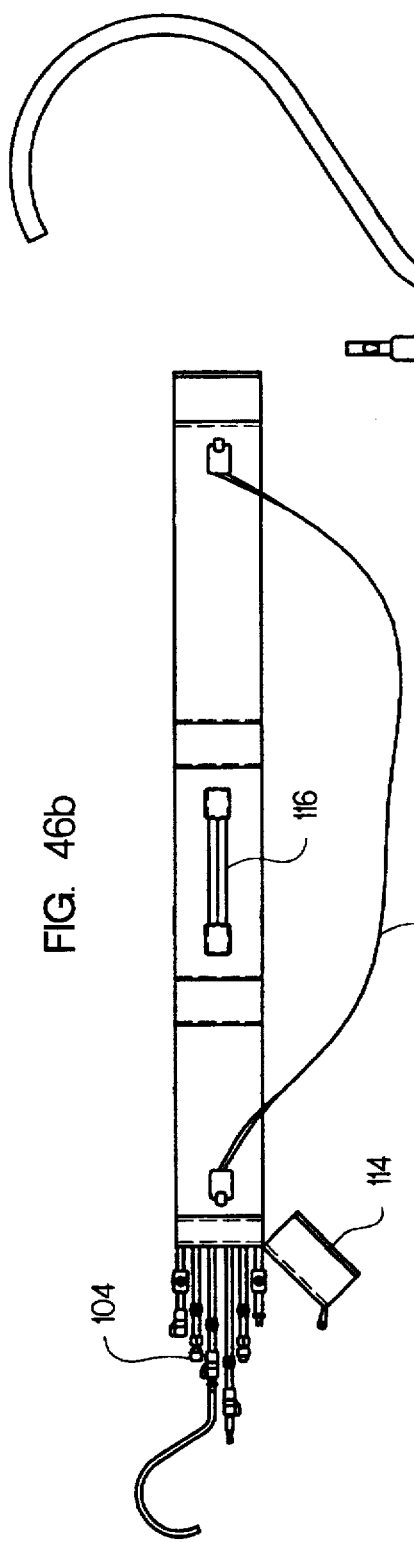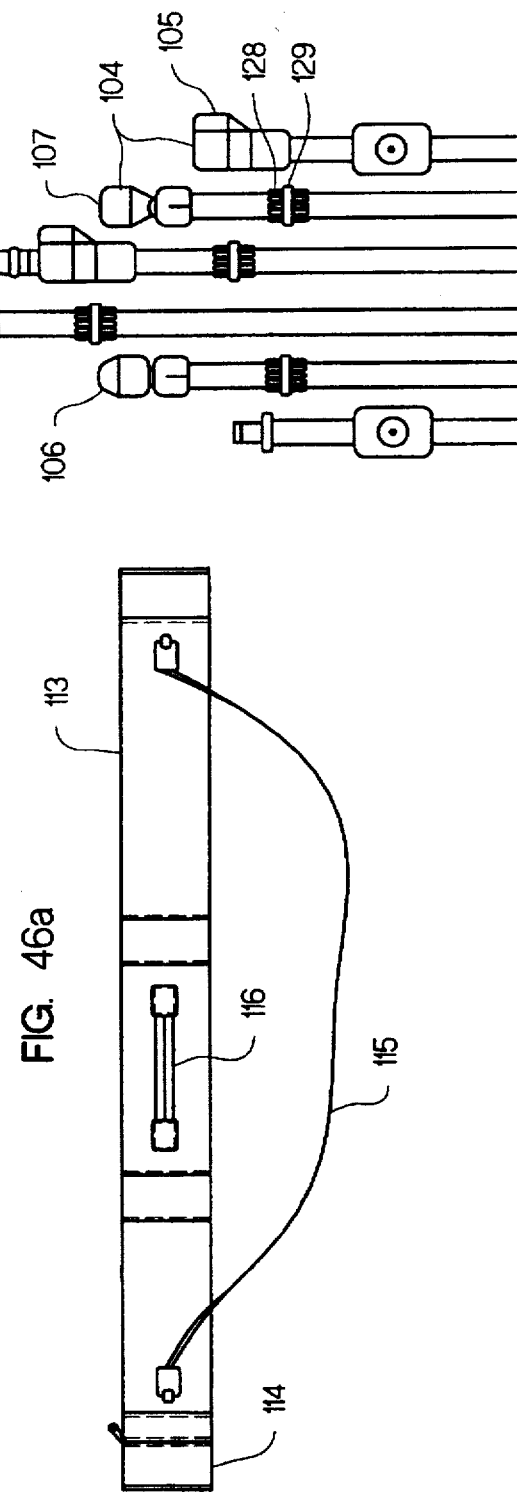

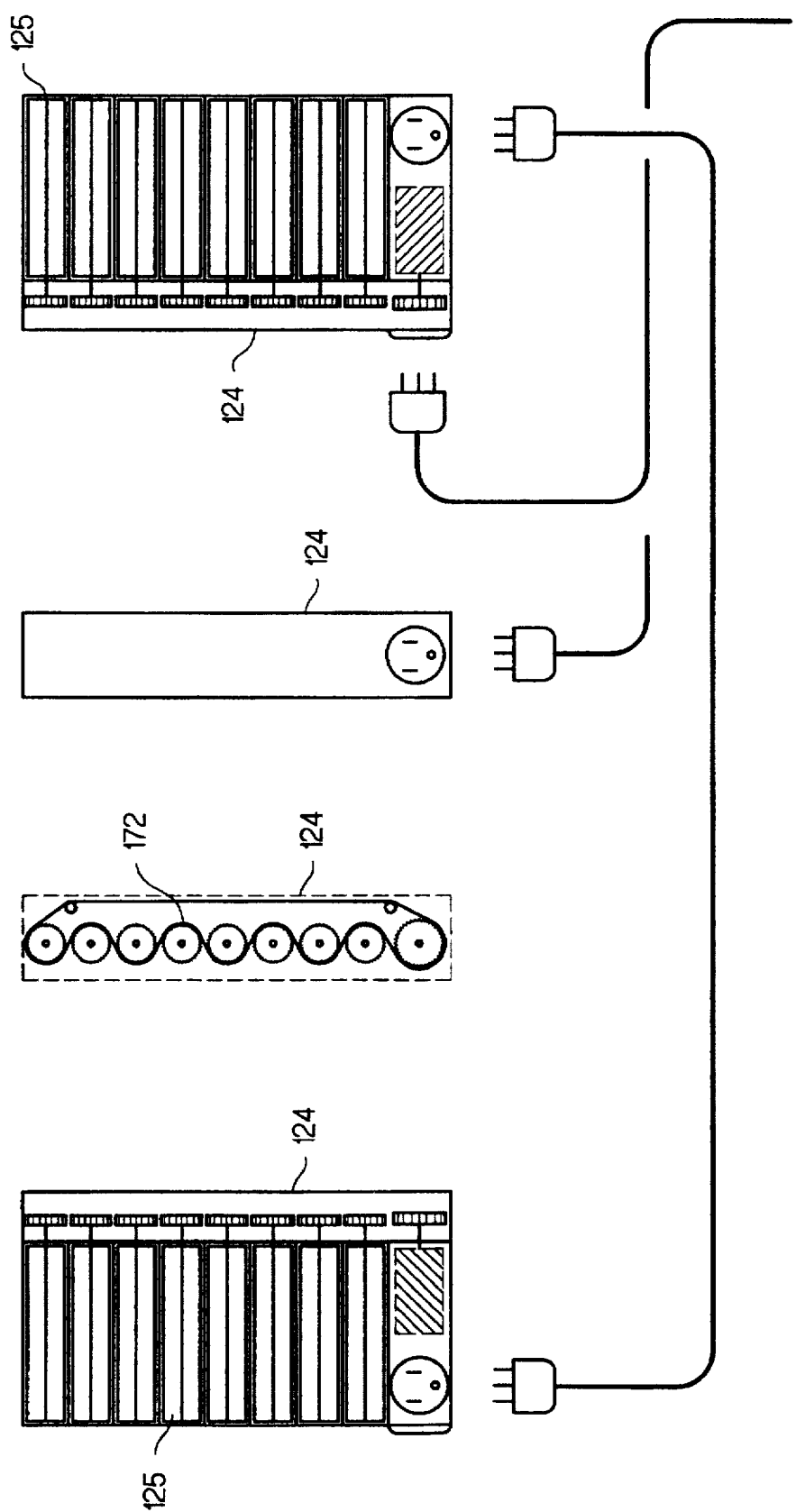

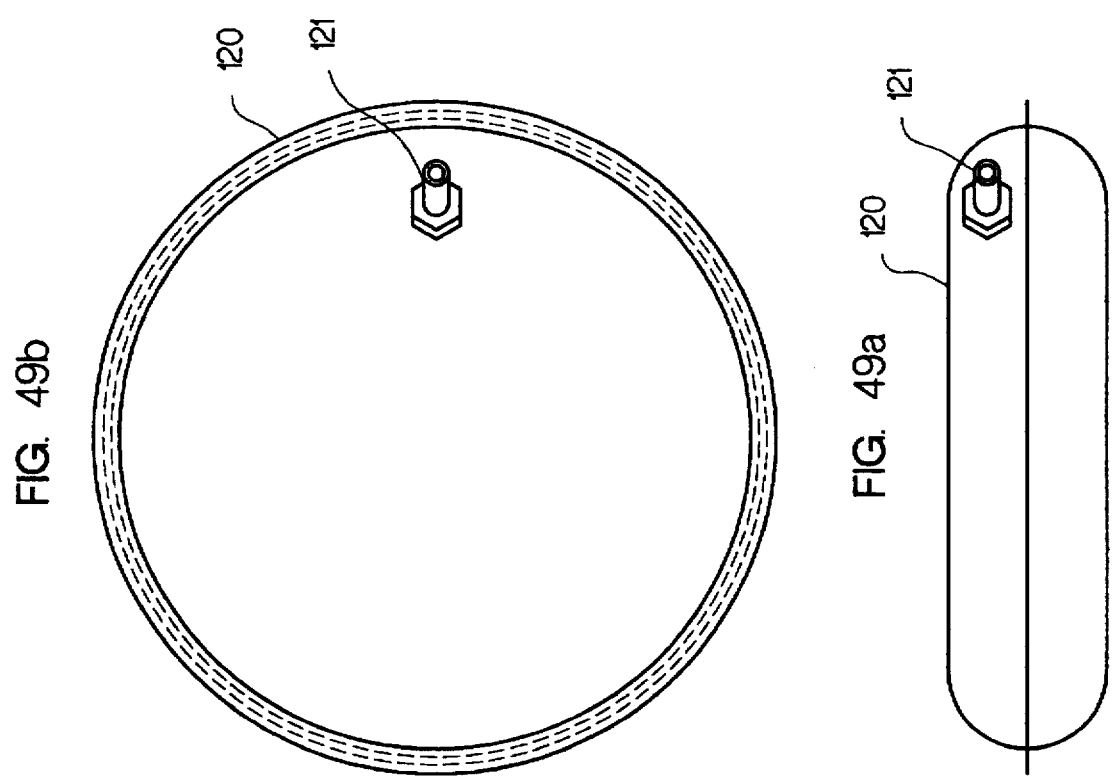

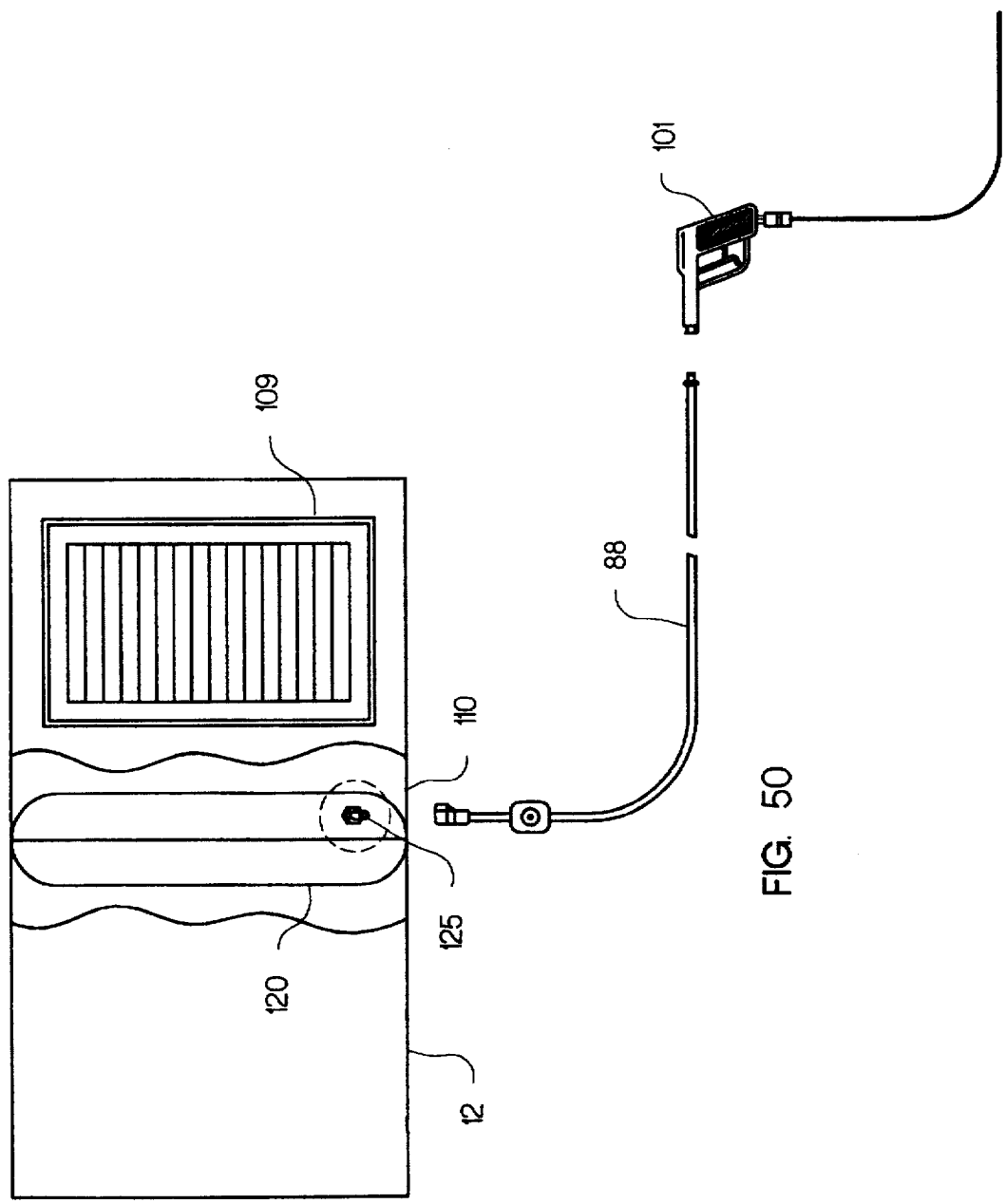

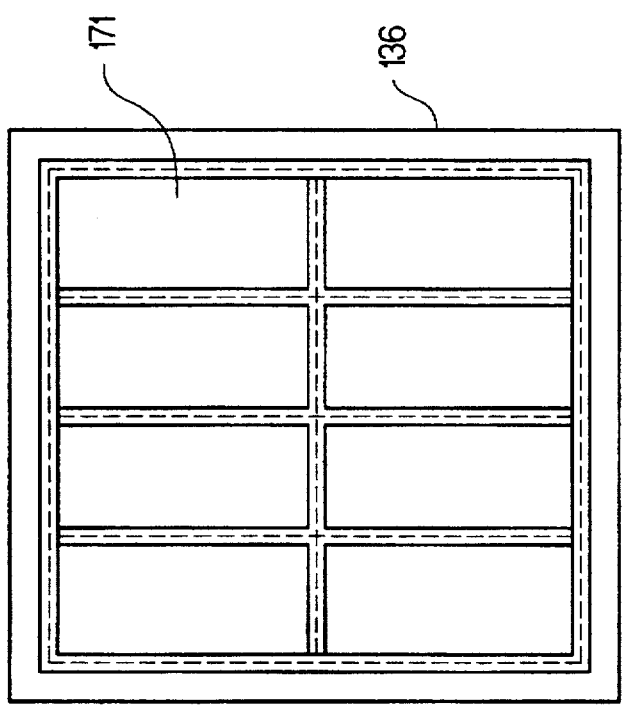
FIG. 51b
FIG. 51a

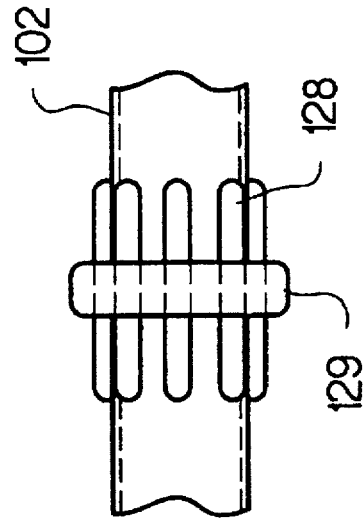
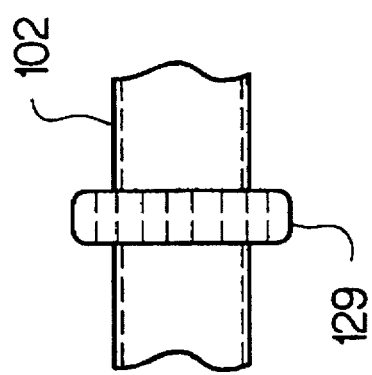
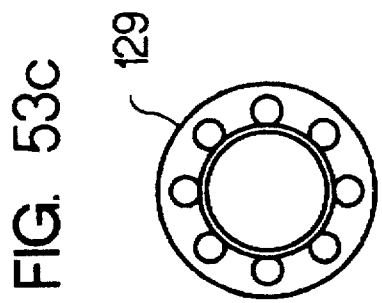
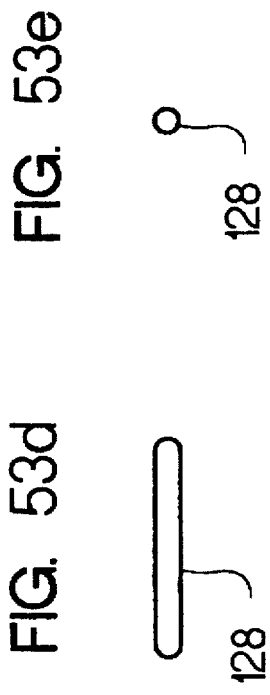
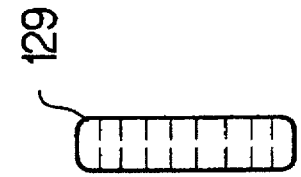
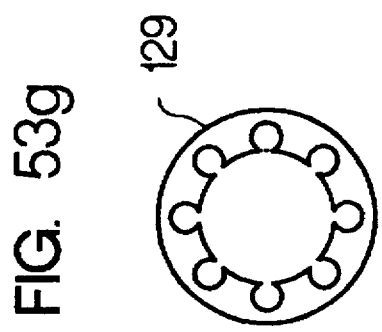

H.V.A.C. DUCT CLEANING SYSTEM

BACKGROUND OF THE INVENTION

This invention relates to H.V.A.C. systems and in particular to a system for cleaning H.V.A.C. ducts. It is common knowledge that after ducts have been in use for a number of years, they accumulate dirt, dust, and various other contaminants which could be harmful to the individuals breathing the air from such ducts. Many ducts are never cleaned and others are cleaned quite infrequently by antiquated methods. The "sick" building syndrome is receiving considerable attention and the government is considering drafting clean air standards for buildings. Indoor air has been found to be up to seventy times more polluted than outdoor air according to the EPA. Also, 50% of all illnesses are caused or aggravated by polluted indoor air as reported by the American College of Allergists. A dirty heating, ventilation and air conditioning system is a prime cause of indoor air problems.

Various apparatus do exist for scraping and vacuuming ducts but no particular system has received widespread acceptance. Most ducts are never cleaned, particularly in households and even where an attempt is made at cleaning, the job is slow, laborious and expensive. In contrast, the present invention proposes a portable system which can be wheeled into position, assembled and put into use in both a commercial and a residential environment. This new system cleans ductwork more efficiently and at lower cost.

SUMMARY OF THE INVENTION

This invention relates to duct cleaning systems and more particularly to a new and improved system for cleaning H.V.A.C. ducts using a plurality of portable modules. The modules include a first unit or master module having a primary filter mounted therein which is coupled to the ductwork and removable through a breech view door when it is necessary to change filters. The module also includes a control panel when a 3 phase motor is used to power a blower and no control panel in the embodiment where a tube axial blower is used.

The primary filter is coupled to a filter module which contains a series of electrostatic filters and V cell filters which can be changed as desired to control the efficiency of filtration. The outlet of the filter module is connected through tapered ducting to a blower unit which provides a pressurized exhaust from a blow tip.

The debris in the system is dislodged by an air gun which is connected to 5 foot lengths of plastic tubing having quick connect couplings at the ends thereof so that any particular length of tubing can be connected with various air heads mounted at the forward end to dislodge debris by means of compressed air. A ductwork illuminator comprising of a chemically reactive ring may be mounted about the tubing at intervals to permit viewing of the internal ductwork.

The system may also include a duct resonator to enhance cleaning of the ducts by disrupting the air flow in the system. During normal operation, the lengths of plastic tubing are removed from a unique caddy arrangement and coupled together with quick connect couplings. The forward tubing is connected to one of the aforementioned air heads and when activated by compressed air, dislodges debris from all interior surfaces of the duct work, which is exhausted into the primary filter and then the filter module. To more efficiently clean the ducts, a vent vac cover is designed to seal any open ducts by magnetically attaching to the duct outlet and a duct bladder is used to seal off various ducts.

Accordingly, it is an object of this invention to provide a new and improved system for cleaning ducts.

Another object of this invention is to provide a mobile system for cleaning H.V.A.C. ducts in an expeditious and inexpensive manner.

A further object of this invention is to provide a new and improved H.V.A.C. duct cleaning system wherein portable modules are coupled together to filter the debris dislodged in the system by various air heads mounted on the forward coupled strips of tubing.

A still further object of this invention is to provide a new and improved system for cleaning H.V.A.C. ducts which includes a plurality of modules each mounted on a special cart which are coupled together to provide a filtering arrangement and a blower for the debris dislodged within the ductwork by various air heads mounted on the forward end of coupled strips of tubing.

BRIEF DESCRIPTION OF THE DRAWINGS

The above and other objects and advantages of this invention may be more clearly seen when viewed in conjunction with the accompanying drawings wherein:

In FIG. 6, filtration is by a primary filter cabinet and main filter module, and other components are shown, while FIG. 7 shows views of the caddy including the tube lengths with couplings at the ends thereof and shows a particulate arrestance bag, and other components. FIG. 8 shows a primary filter module and main filter module with an exhaust chute attached to an exhaust director.

FIG. 11 is a rear view of FIG. 10;

FIG. 12a shows a centrifugal blower controlled by a variable frequency drive;

FIG. 12b is an end view of the centrifugal blower;

FIG. 12c shows a side view of an exhaust chute;

FIG. 13a depicts a centrifugal blower controlled by a variable frequency drive with the filtration by a master filter module;

FIG. 13b shows an end view of the centrifugal blower with FIG. 13c showing an exhaust chute;

FIG. 17d depicts the primary filter bag mounted within the filter; and, FIG. 17f show the filter cabinet before mounting on the cart;

FIGS. 18a–d show the tube axial blower with pressurized exhaust mounted to the cart with FIG. 18a depicting a front view; FIG. 18b a view from the left side and FIG. 18c a view from the right side; and, FIG. 18d depicting the blower in a rear view;

FIGS. 19A-1–19A-5 depict the residential tube axial blower mounted on a cart depicting respectively front (19A-3), rear (19A-1), top (19A-2), and side (19A-4 and 19A-5) views of the system;

Figure 1:
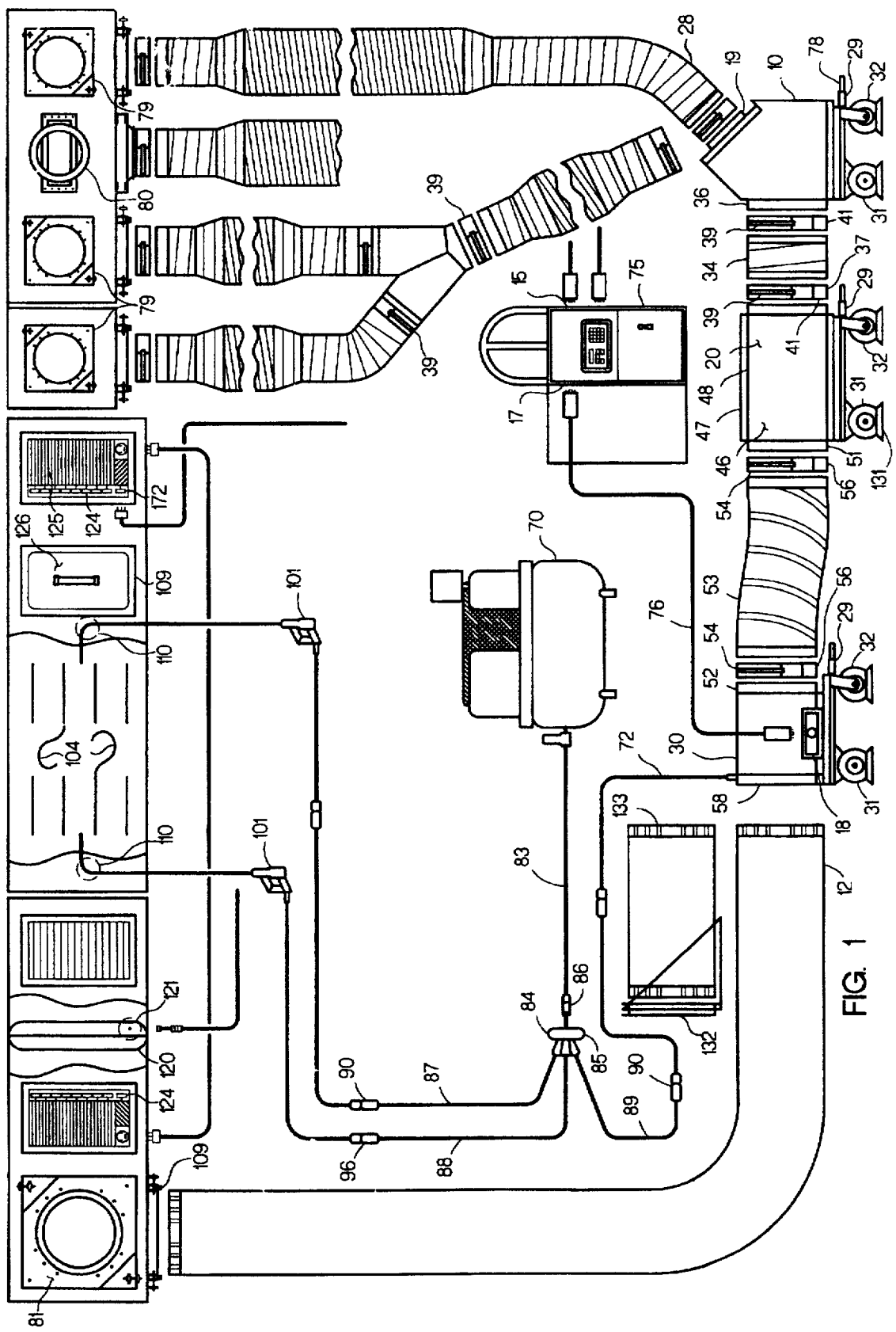
FIG. 1 is a schematic drawing of the H.V.A.C. duct cleaning system which includes a tube axial blower controlled by a variable frequency drive with filtration in a primary filter module leading to a main filter module, and other components.
Figure 2:
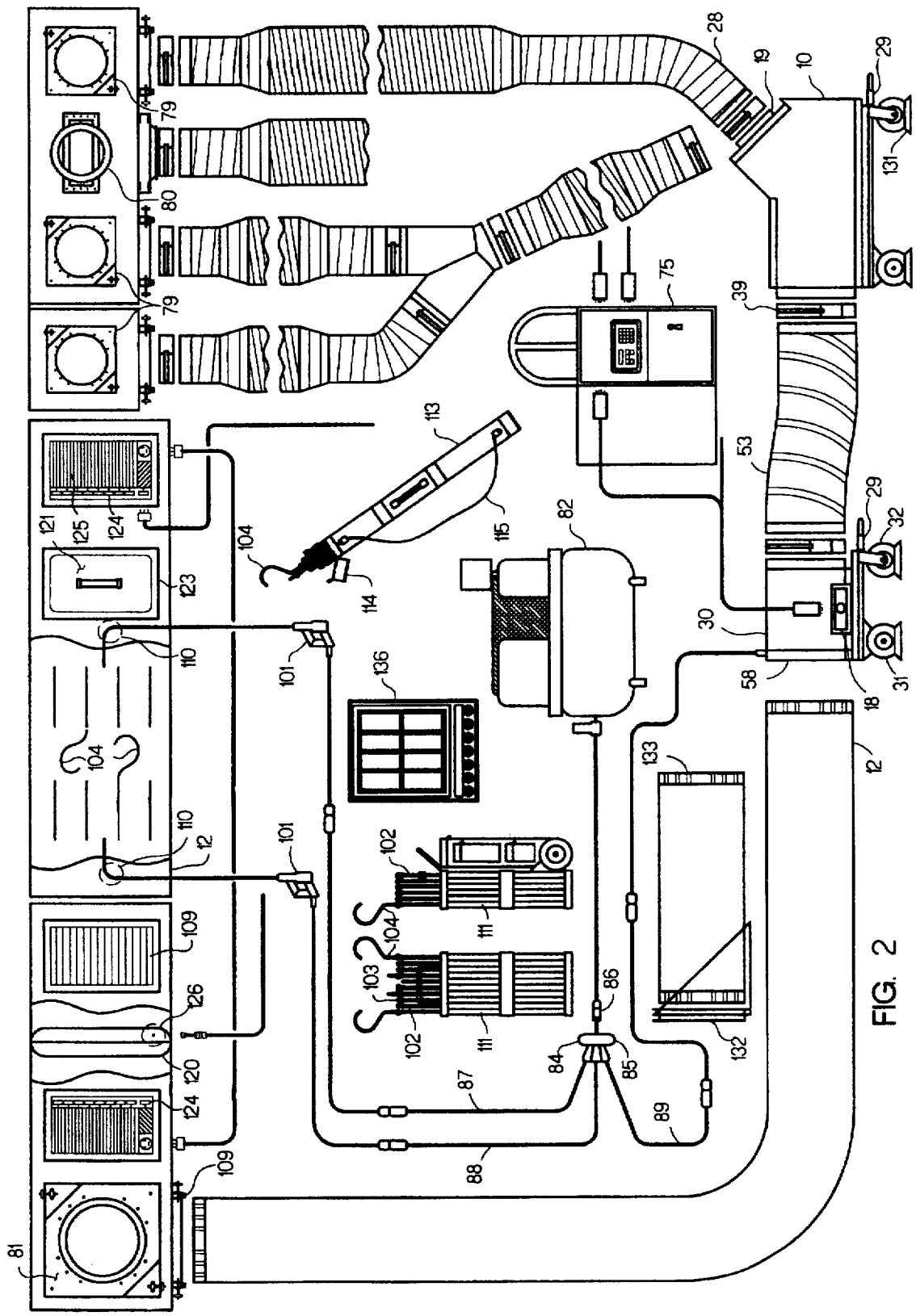
FIG. 2 shows a duct cleaning system with a tube axial blower controlled by a variable frequency drive with filtration by a master filter module, and other components.
Figure 20C:
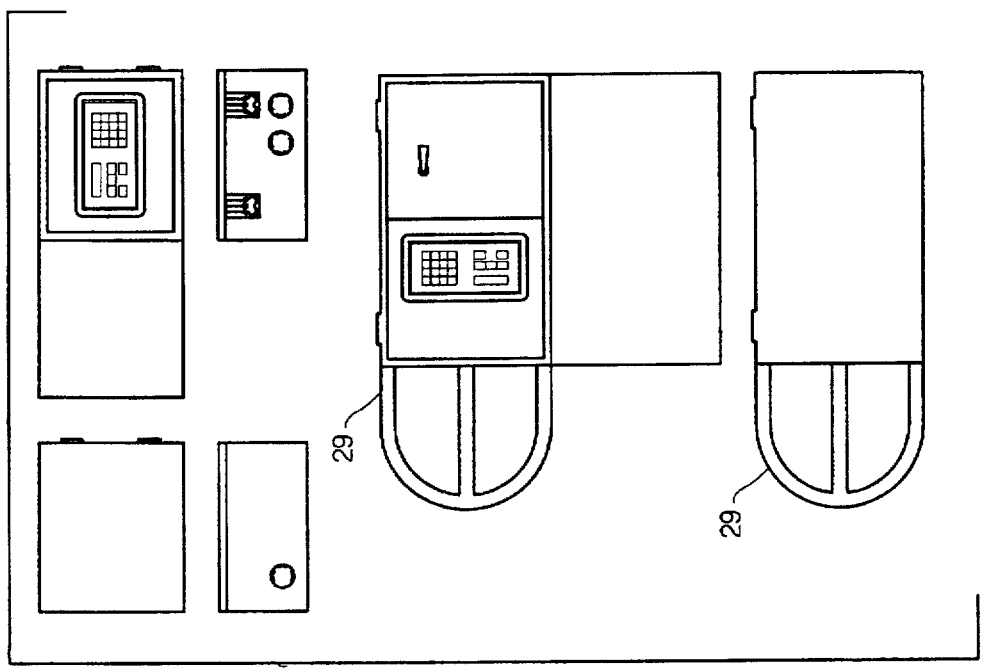
Figure 20B:
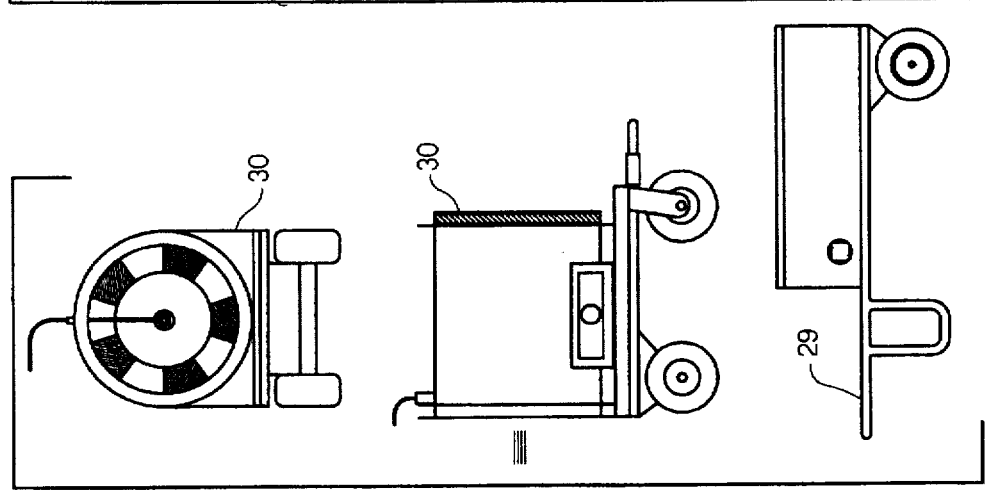
Figure 20A:
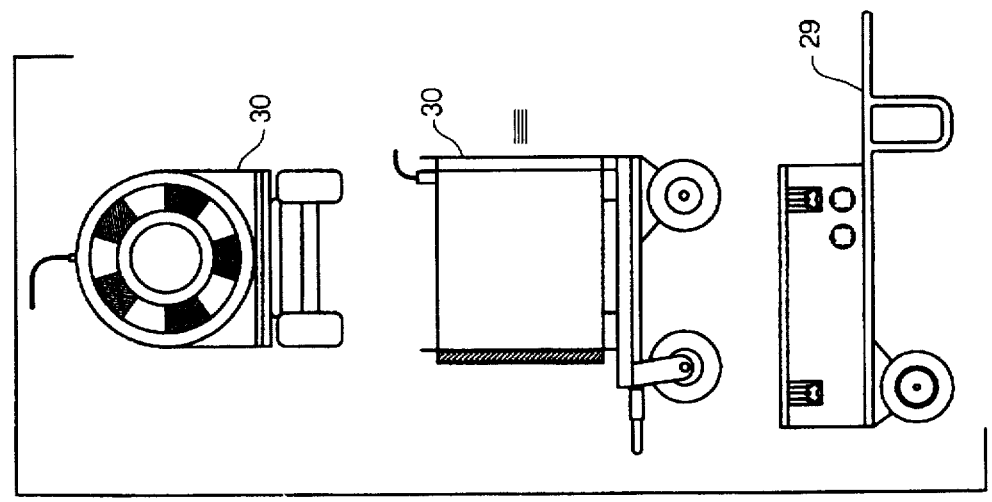
Figure 22:
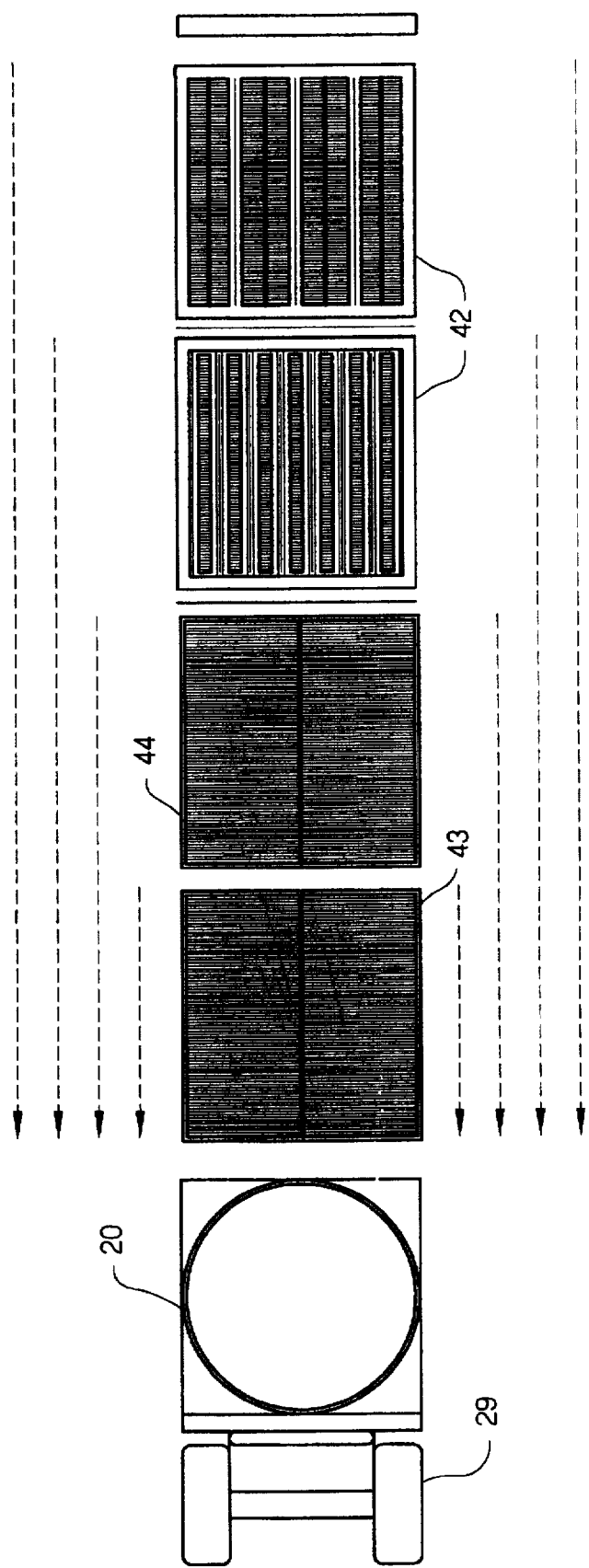
Figure 23:
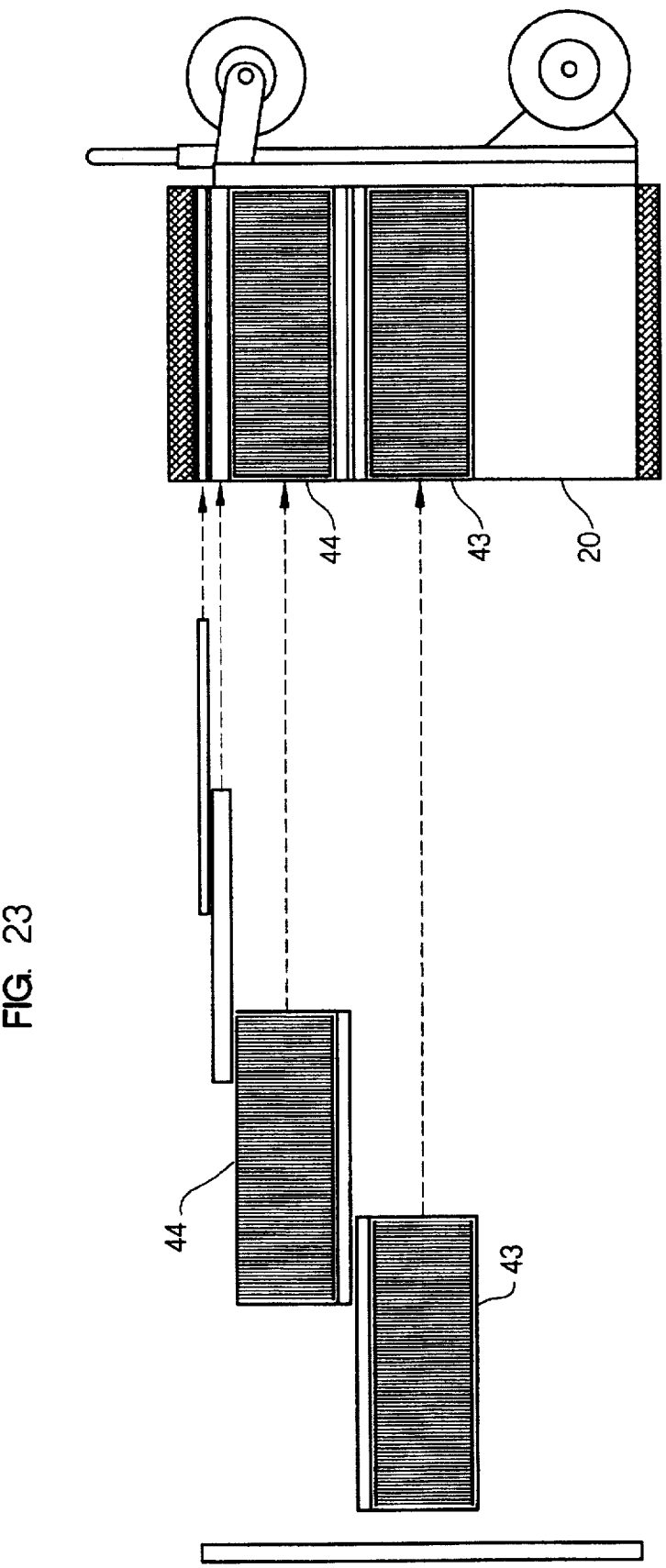
Figure 24E:
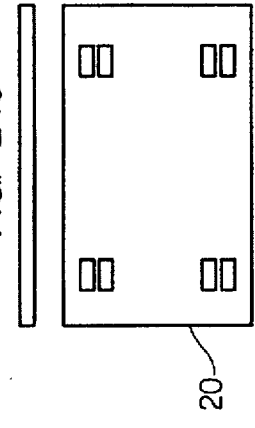
Figure 24F:
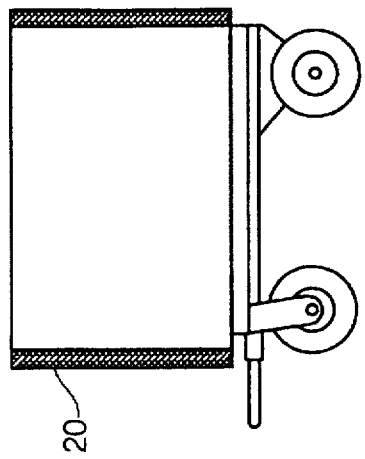
Figure 24G:
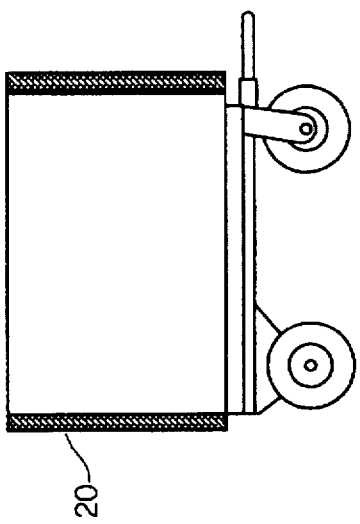
Figure 24A:
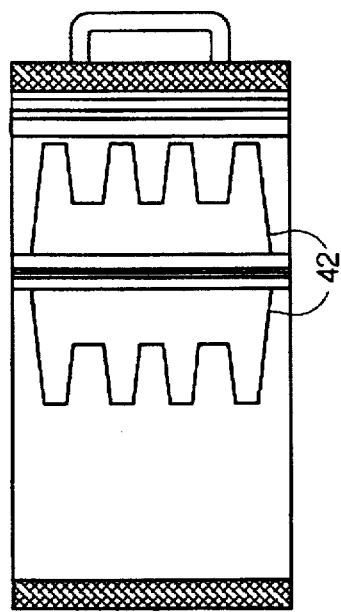
Figure 24C:
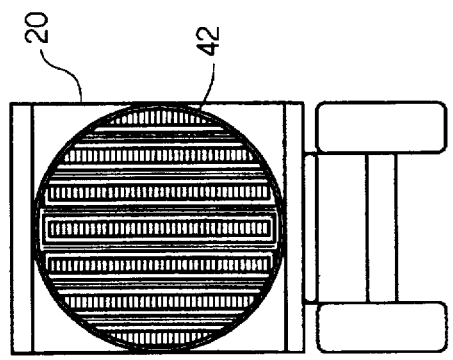
Figure 24B:
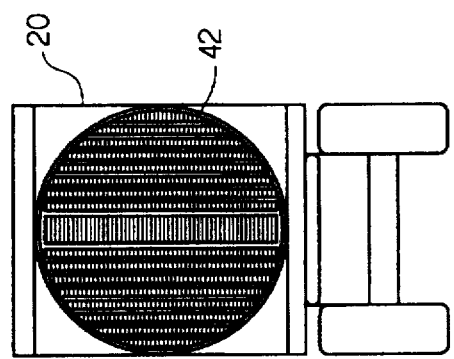
Figure 25A:
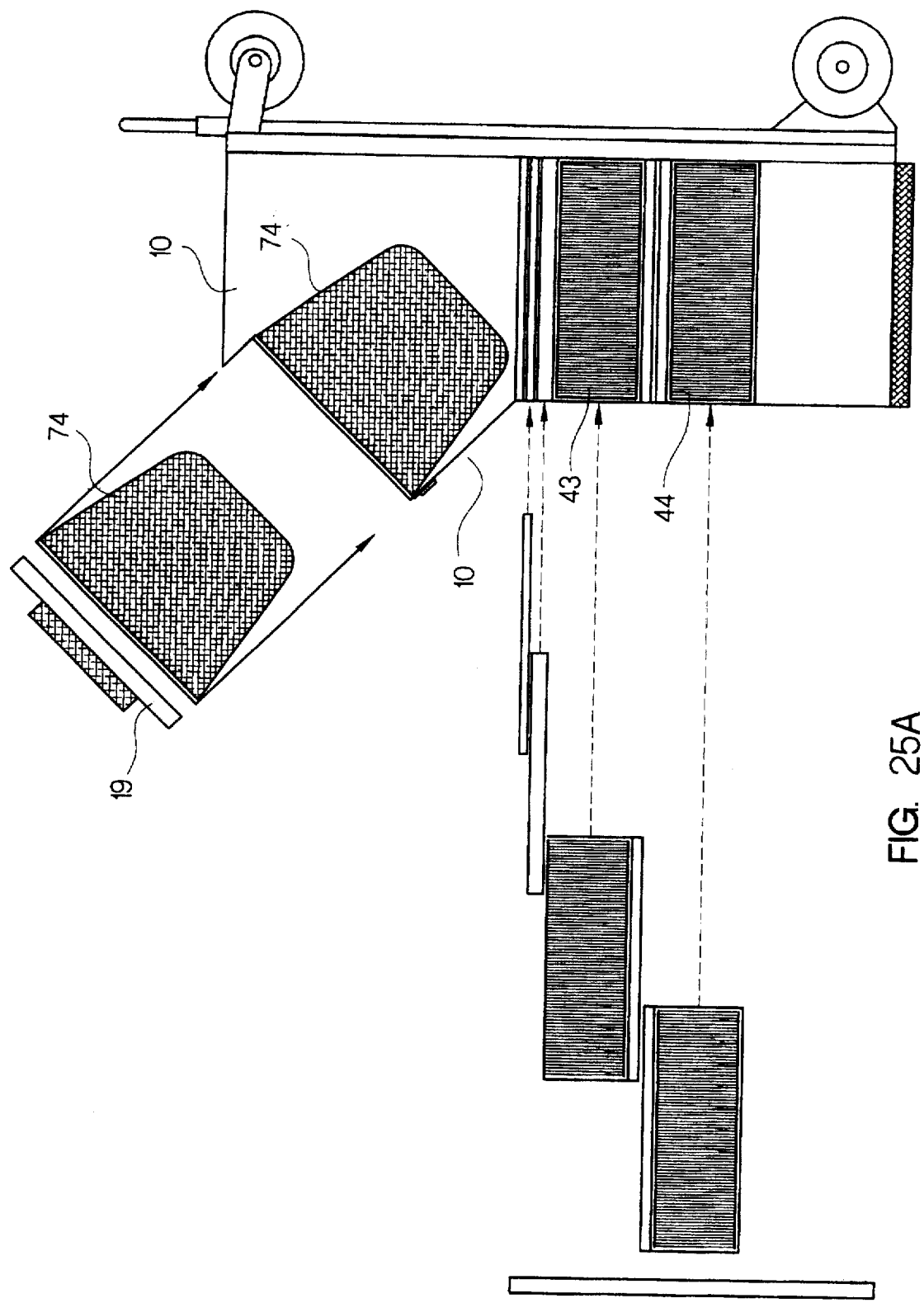
Figures 4, 25B:
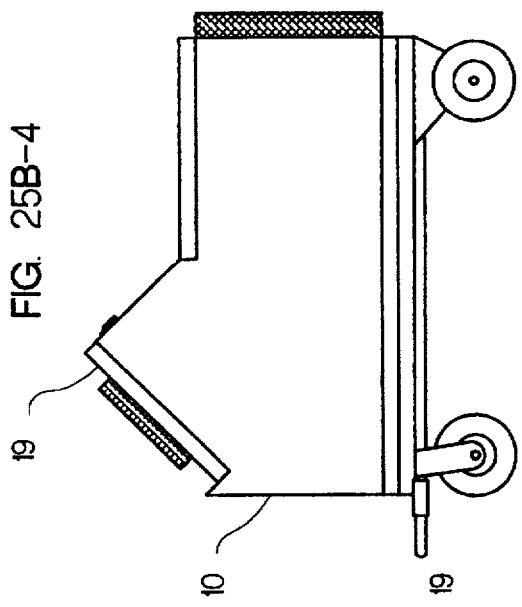
Figures 5, 25B:
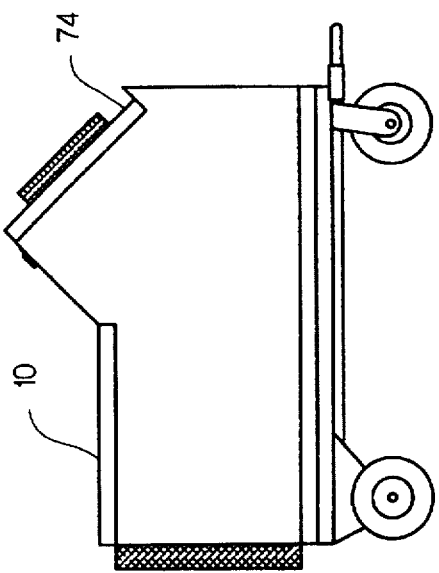
Figures 3, 25B:
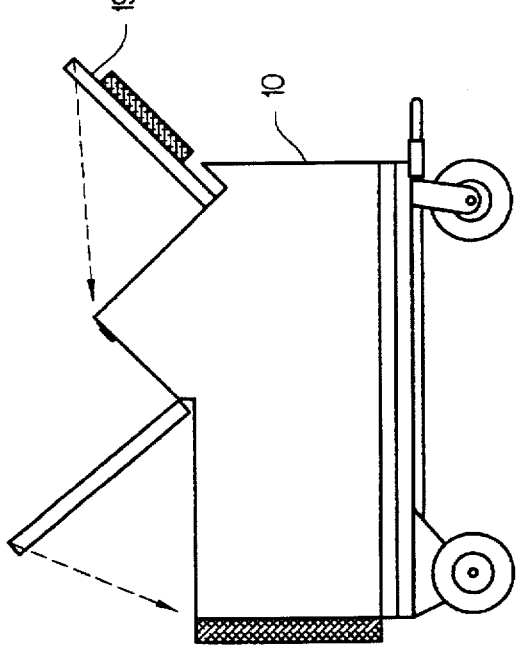
Figures 1, 25B:
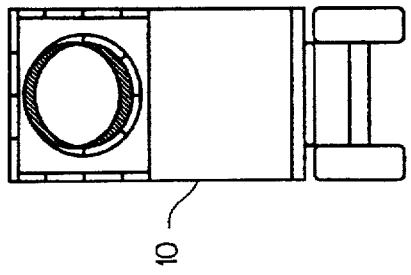
Figures 2, 25B:
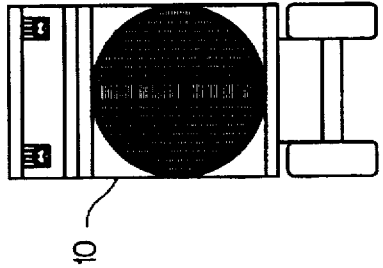
Figure 25C:
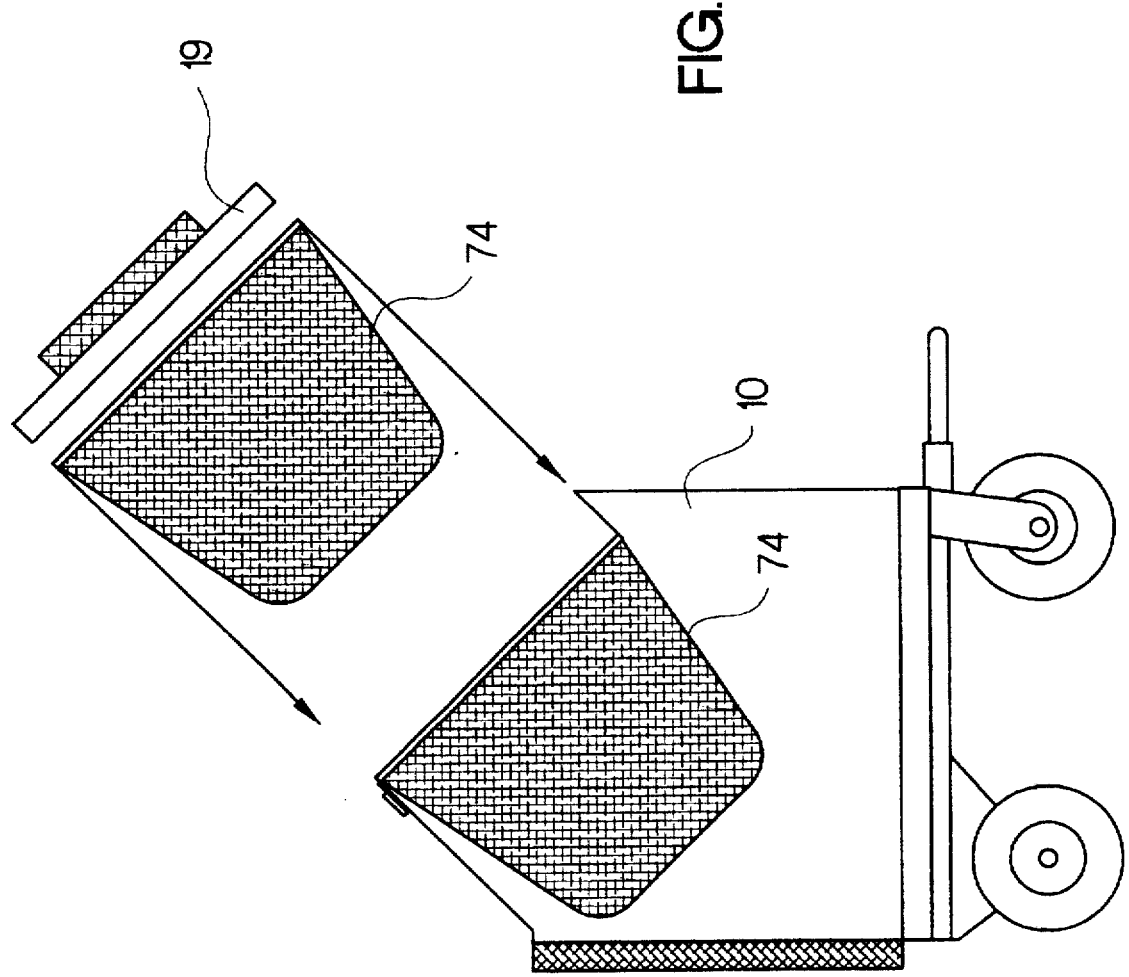
Figures 3, 25D:
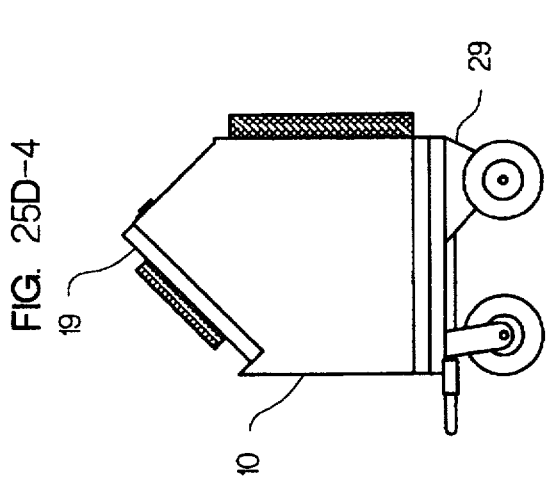
Figures 4, 25D:
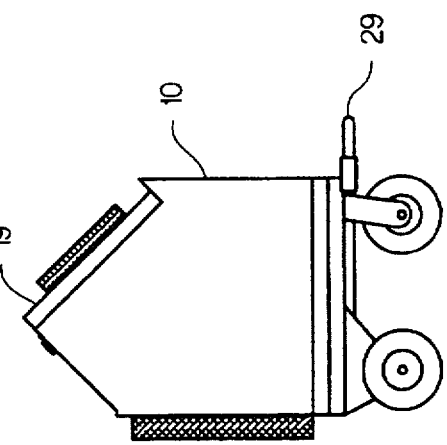
Figures 5, 25D:
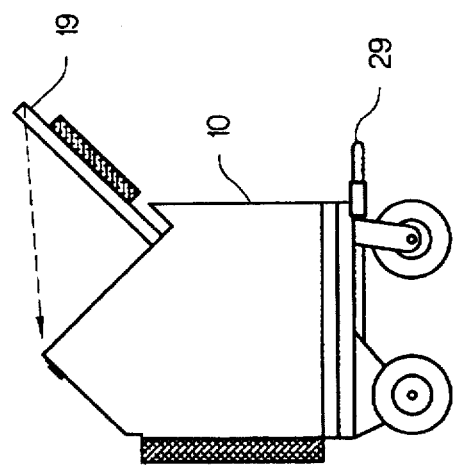
Figures 1, 25D:
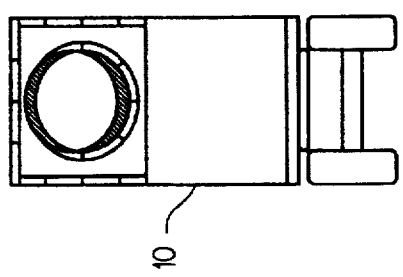
Figures 2, 25D:
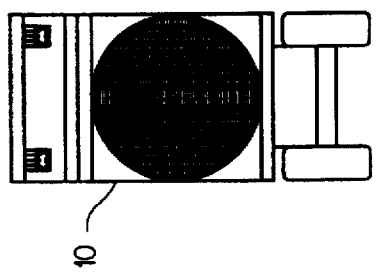
Figures 3, 25F:
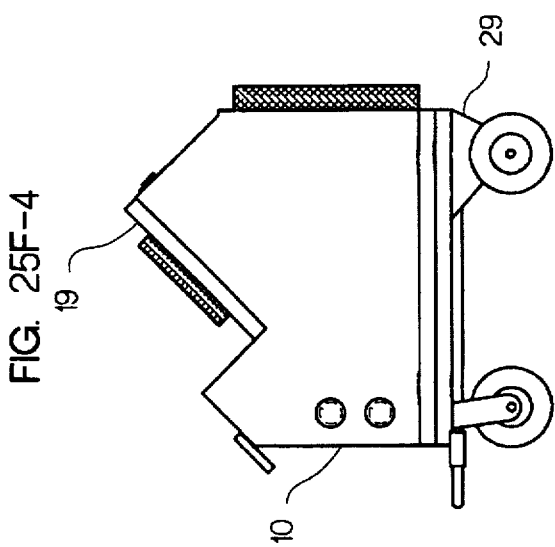
Figures 4, 25F:
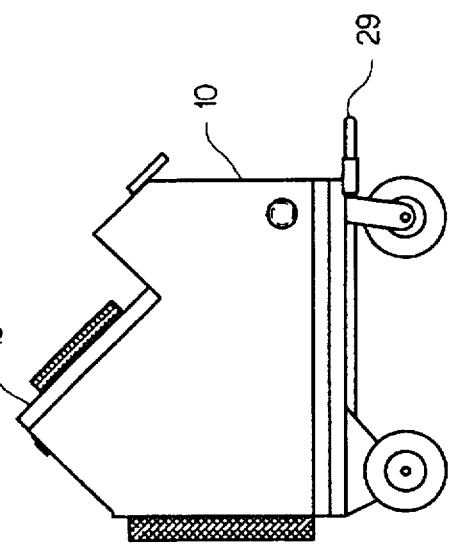
Figures 5, 25F:
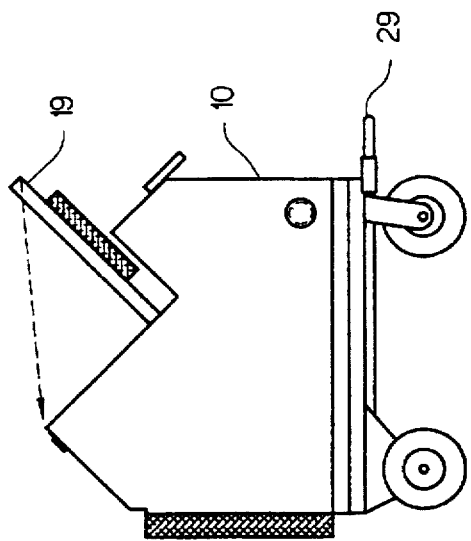
Figures 1, 25F:
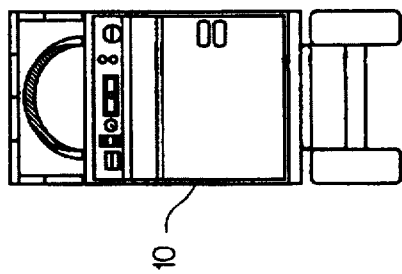
Figures 2, 25F:
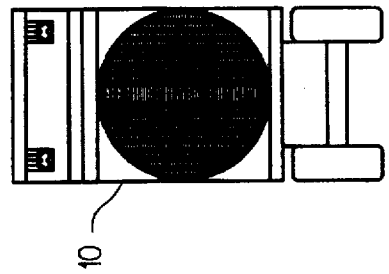
Figures 3, 25H:
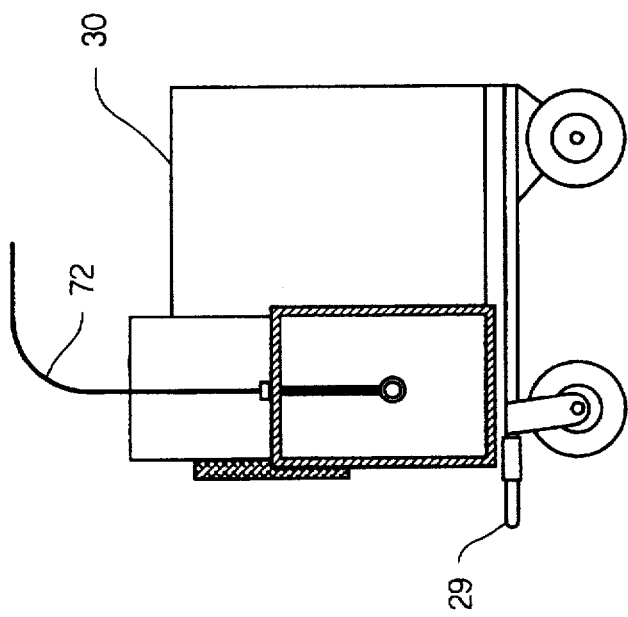
Figures 1, 25H:
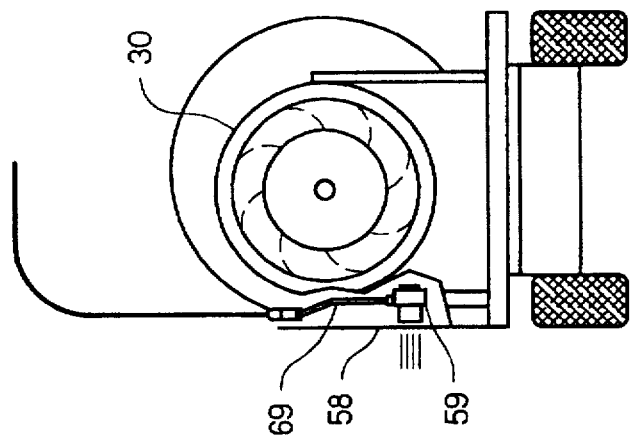
Figures 2, 25H:
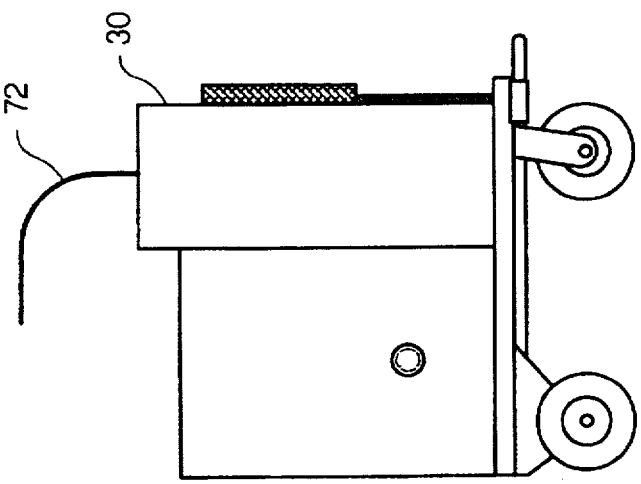
Figure 27C:
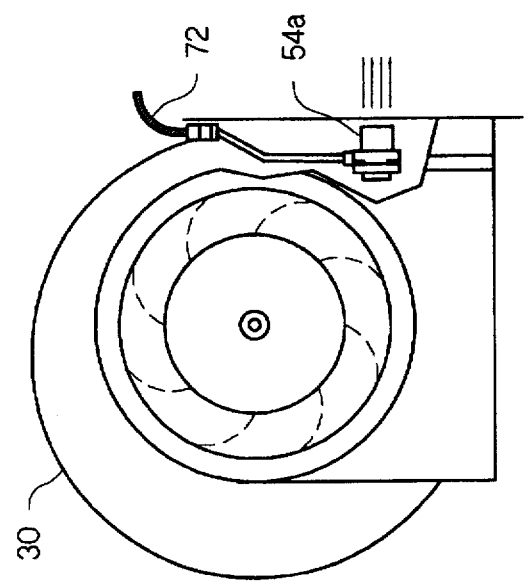
Figure 27A:
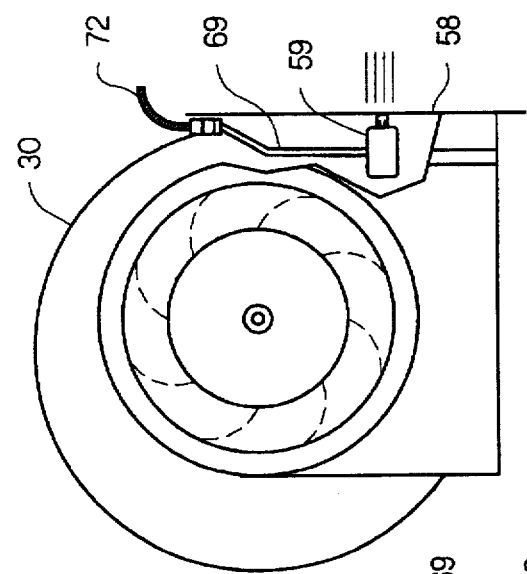
Figure 27B:
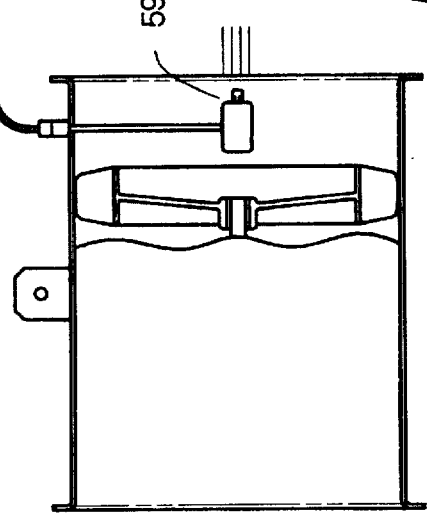
Figure 27D:
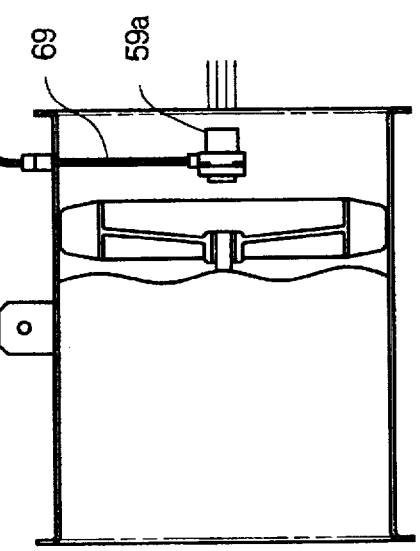
Figure 30B:
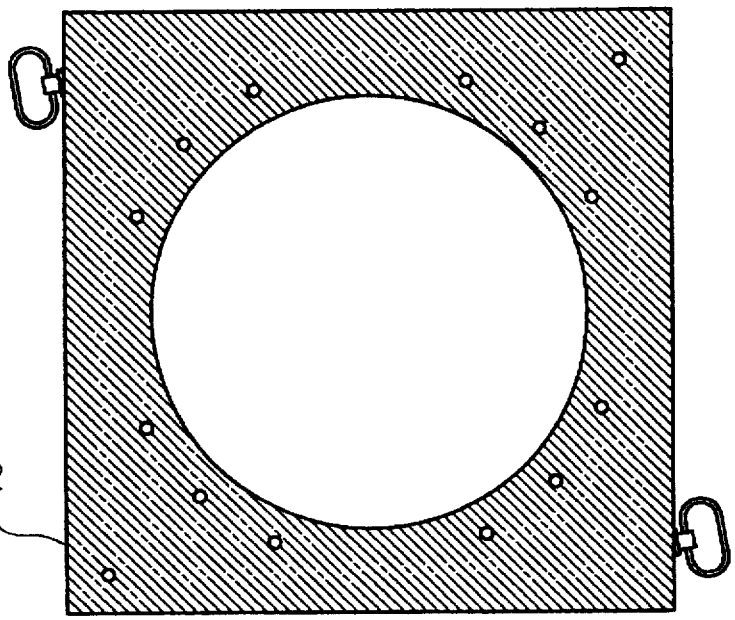
Figure 30A:
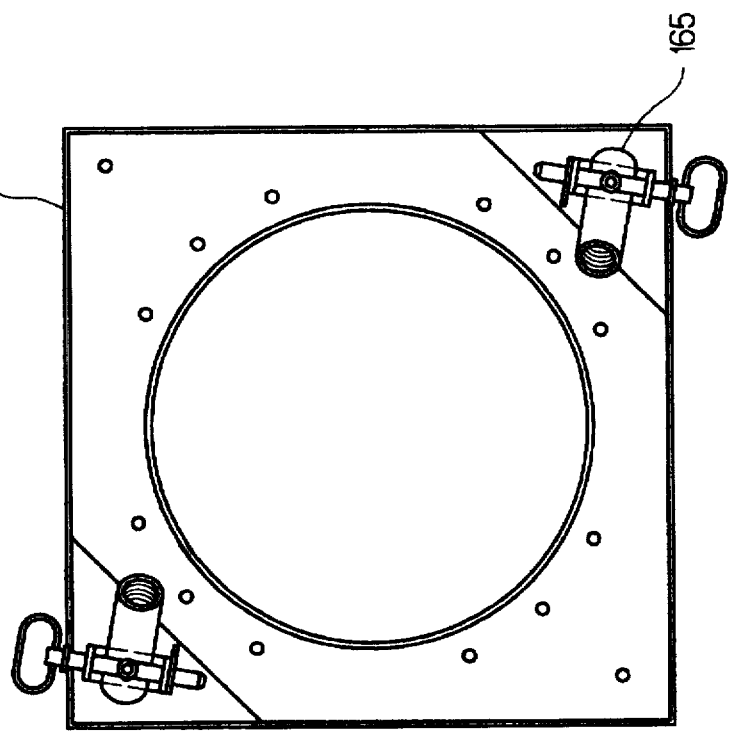
Figure 31B:
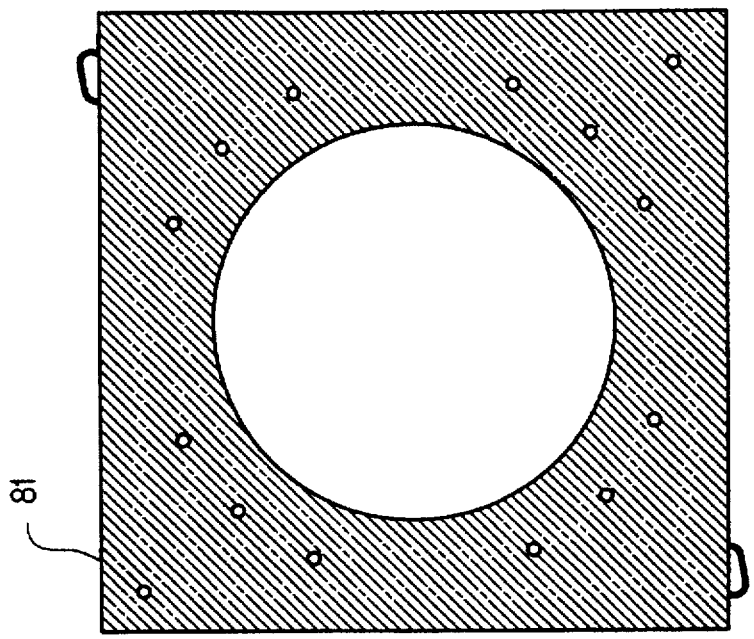
Figure 31A:
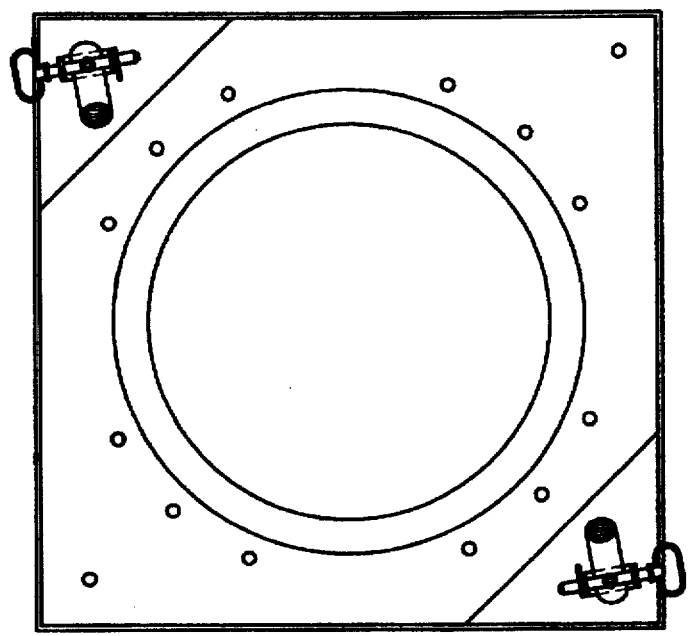
Figure 32A:
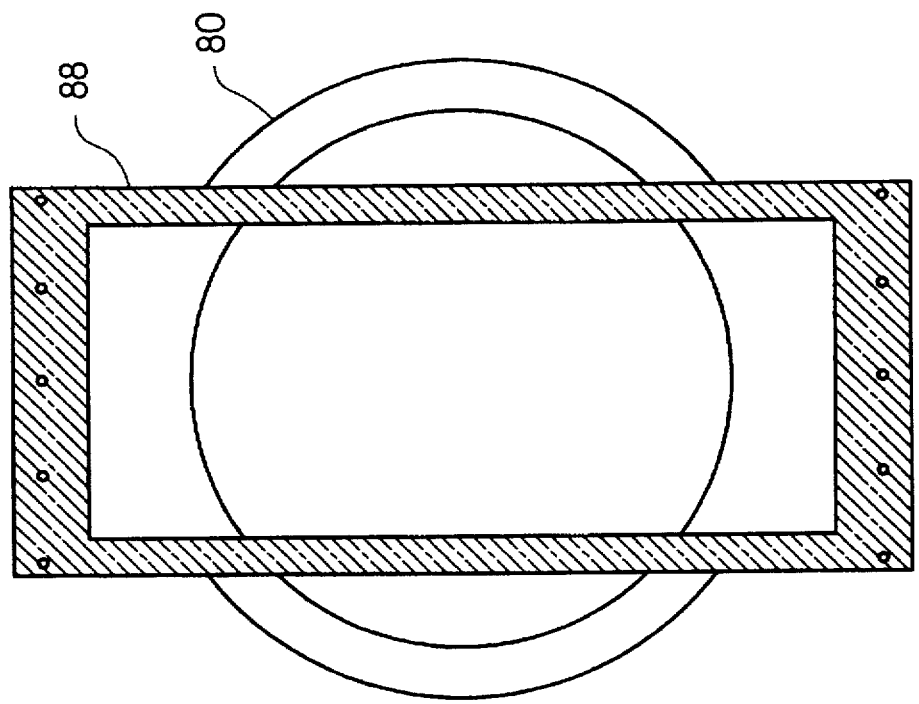
Figure 33A:
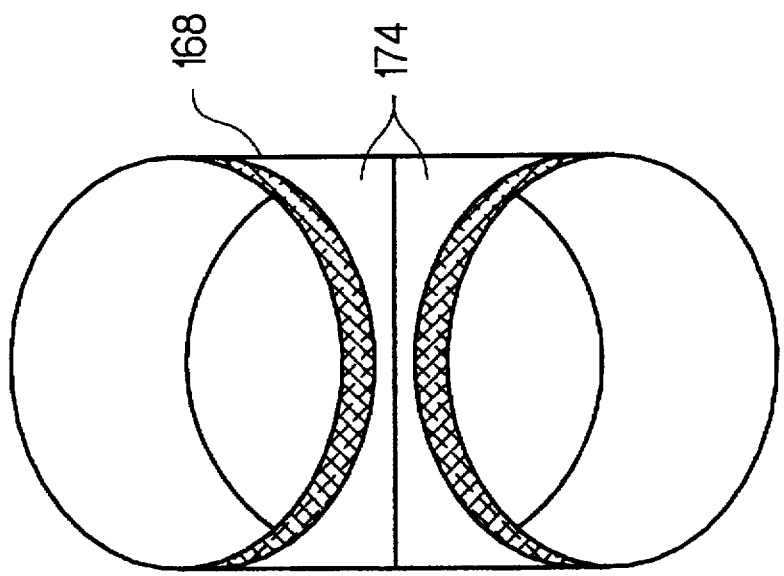
Figure 33B:
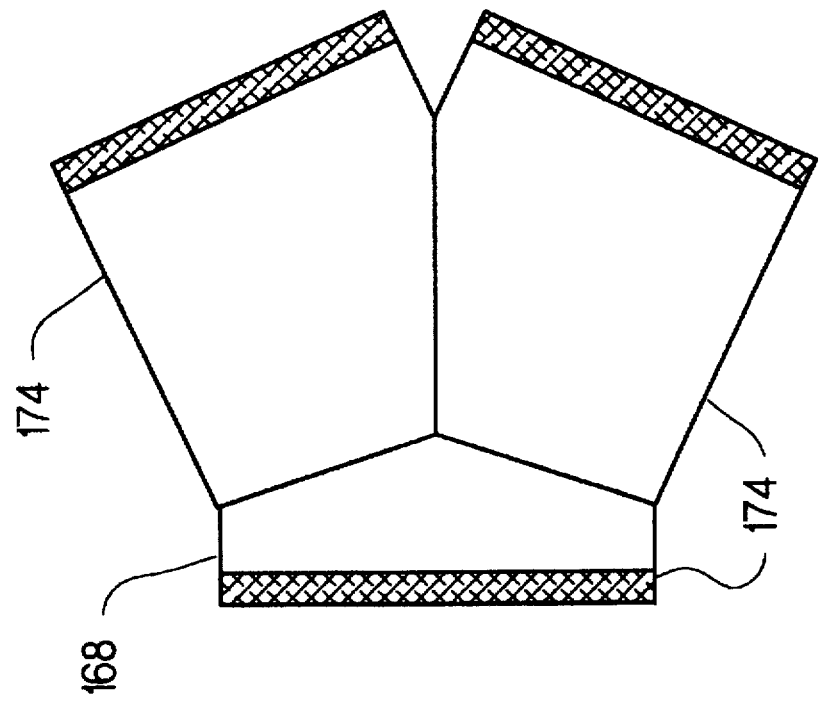
Figure 41B:
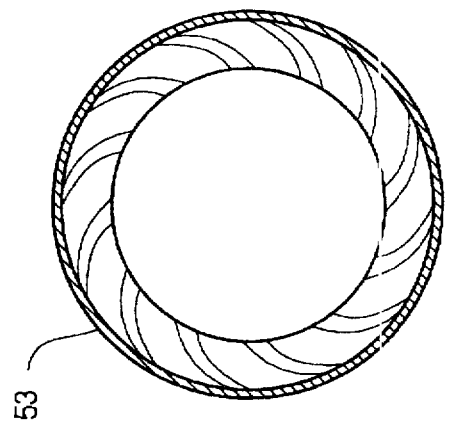
Figure 41A:
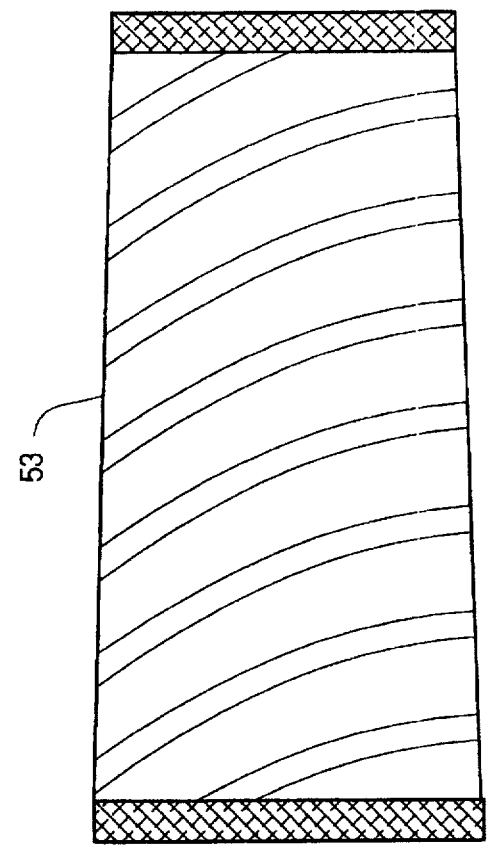
Figure 41E:
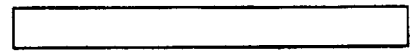
Figure 41D:
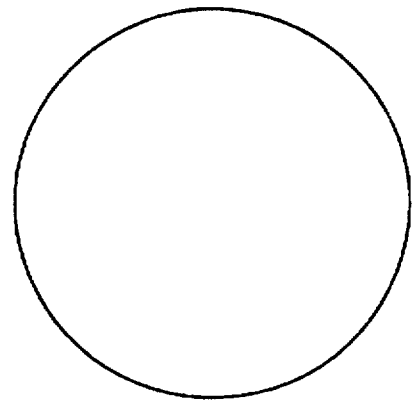
Figure 41C:
Figure 42A:
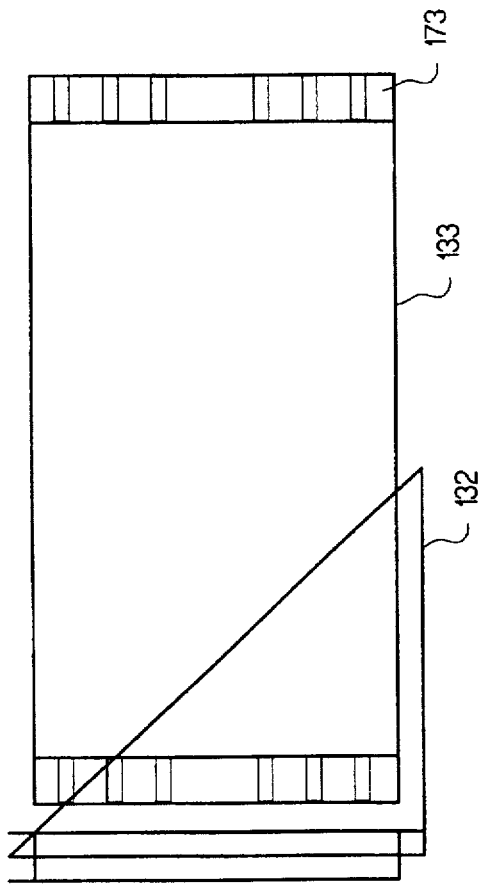
Figure 42B:
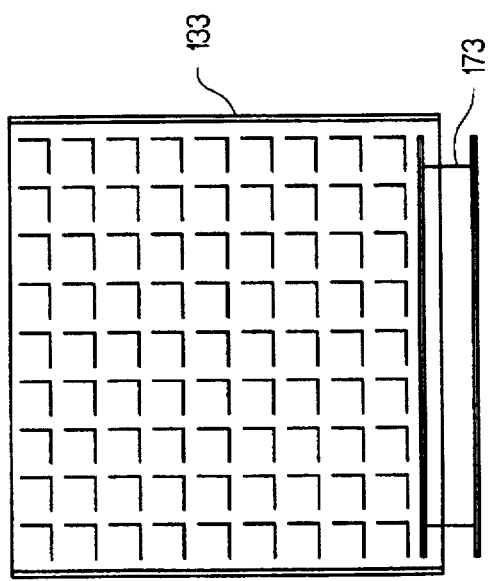
Figure 42C:
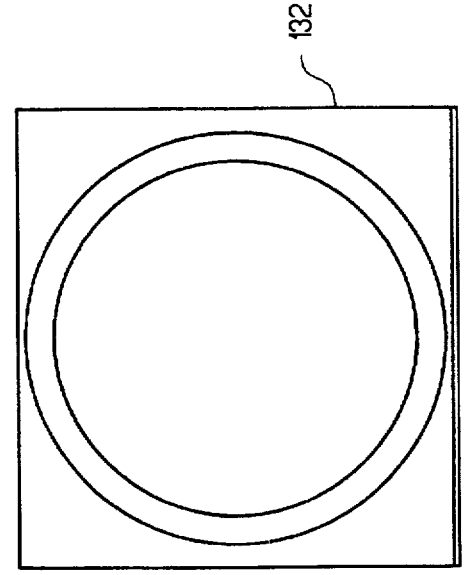
Figure 42D:
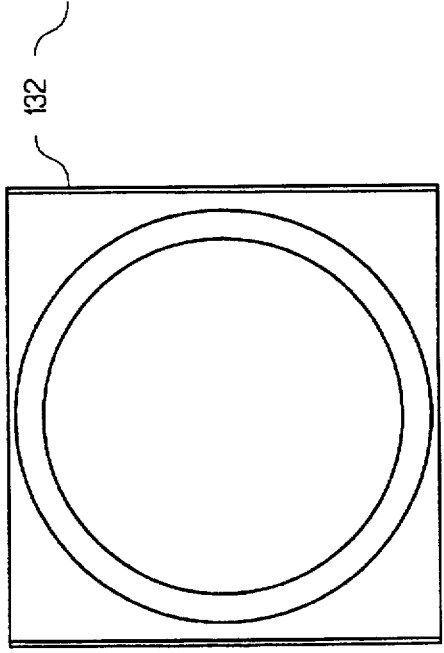
Figure 43A:
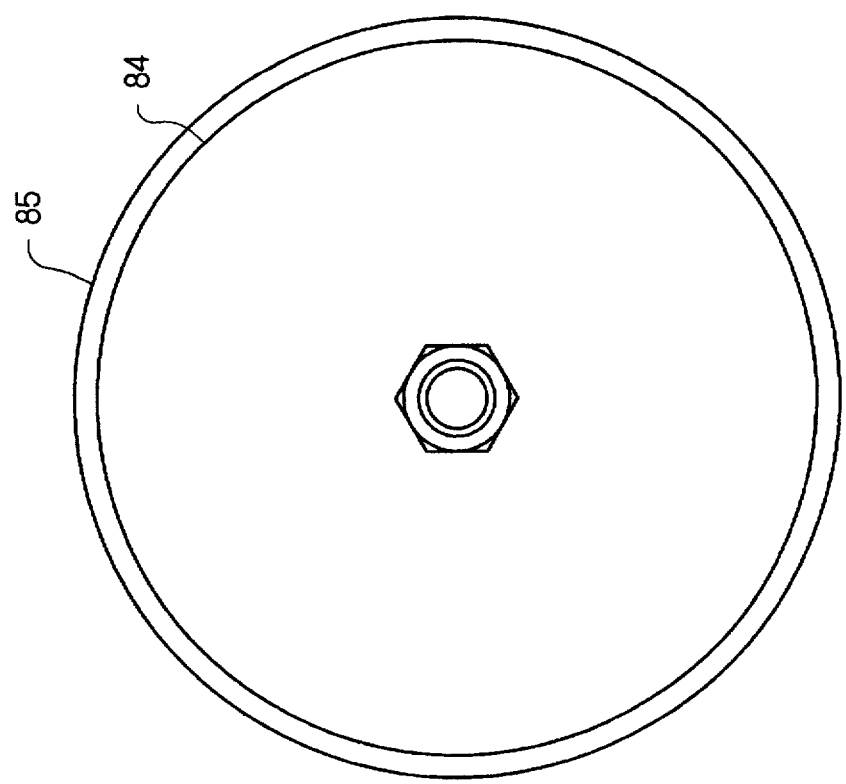
Figure 47:
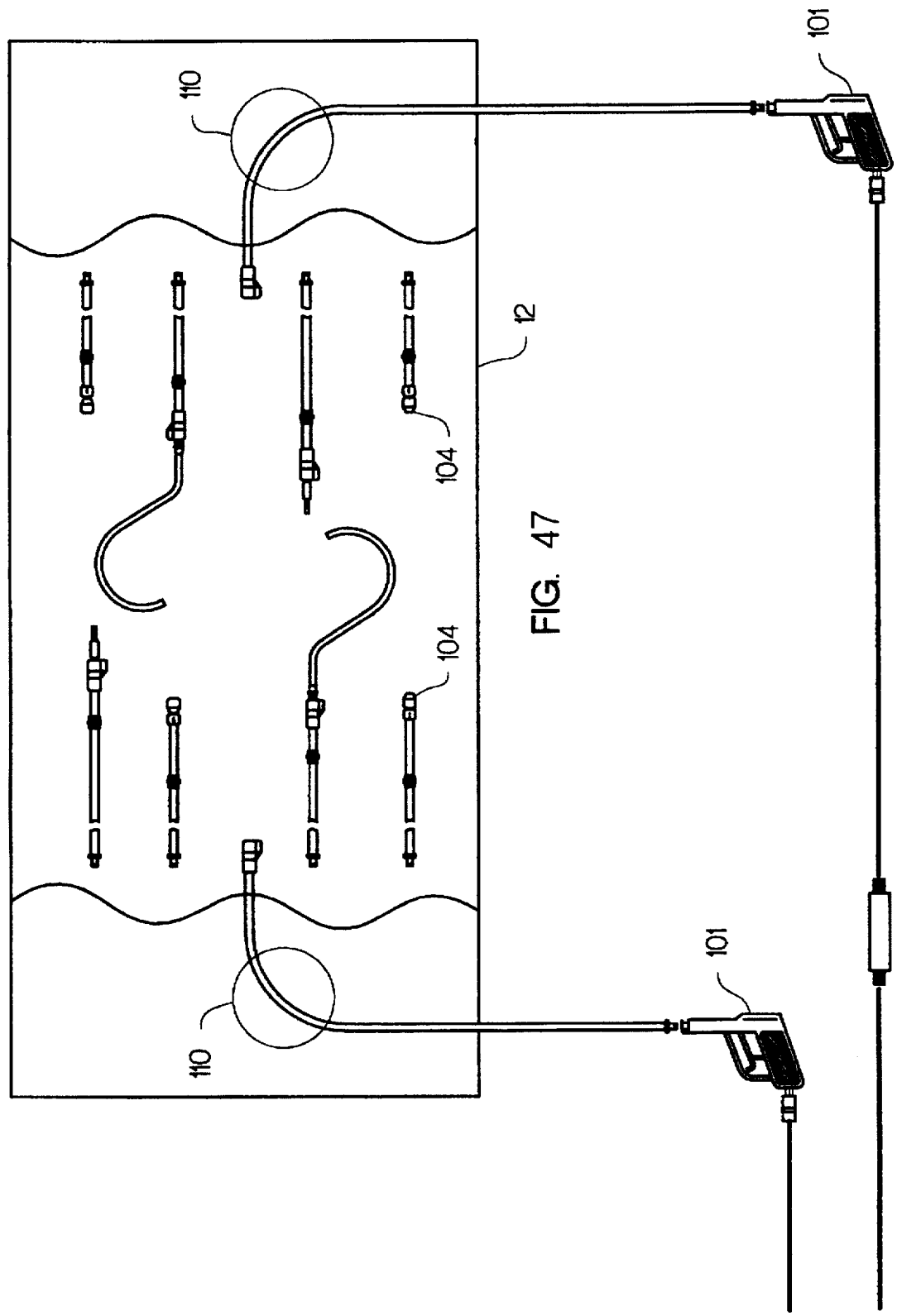
Figure 52B:
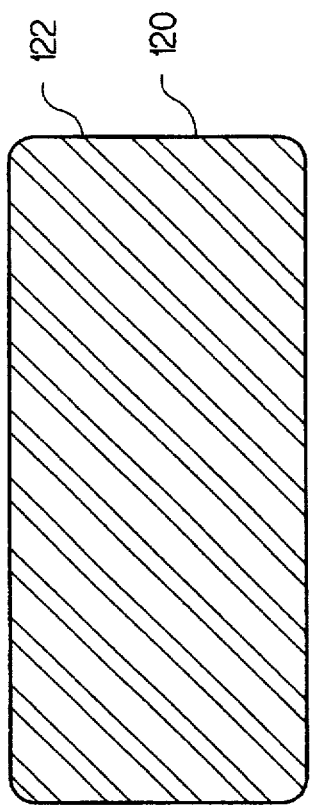
Figure 52A:
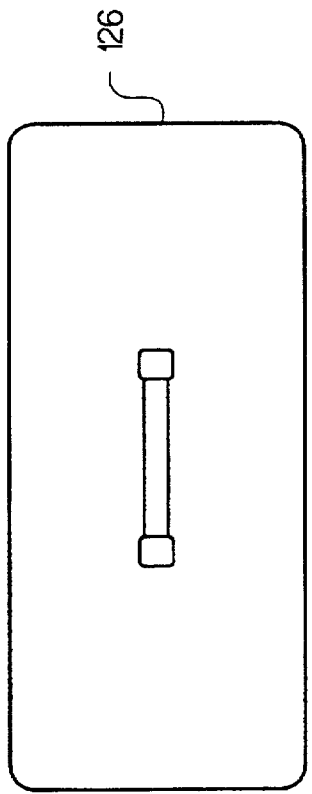
Figure 54C:
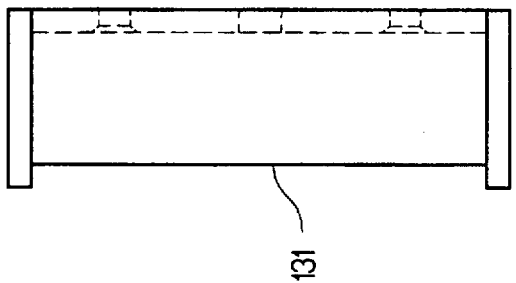
Figure 54A:
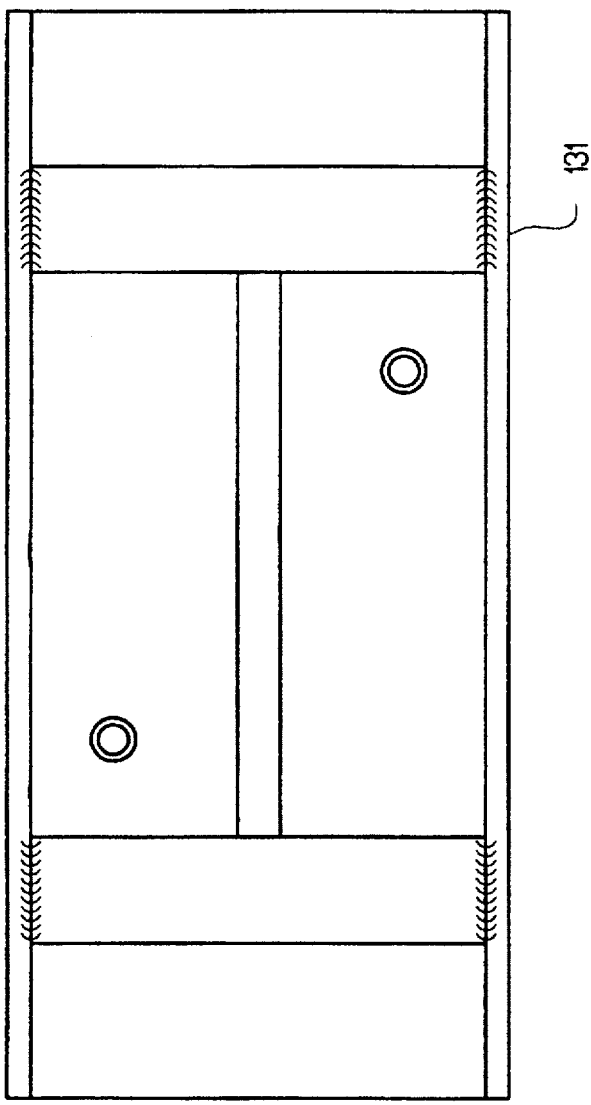
Figure 54B:
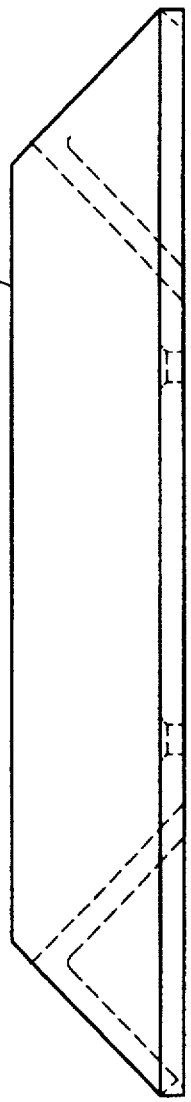

FIG. (19A-6) depicts the main filter module equipped with companion flanged rings for use with residential tube axial blower system;

FIG. 19B depicts the main filter module equipped with flanged rings for use with residential tube axial blower system;

FIG. 19B-1 and 19B-2 depict front and side views of the fastening pins;

FIGS. 20A, 20B and 20C disclose the commercial tube axial blower equipped with a pressurized exhaust and mounted on a cart;

FIG. 20A depicts a left side view and 20B depicts a right side view with FIG. 20C depicting the front view of the cart;

FIGS. 21a–f disclose the various views of the V-cell filters;

FIGS. 21g and h disclose the electrostatic filters and FIGS. 21i and j show the filter bag;

FIG. 22 discloses the filter sequence in the main filter module in a front view;

FIG. 23 discloses a filter sequence to the main filter module in a side view;

FIGS. 24a–c and 24e–g disclose a view of the main filter module with filtration in various views thereof;

FIG. 25A is a view of the filter sequence in the master filter module in a side view;

FIGS. 25B-1, 25B-2, 25B-3, 25B-4 and 25B-5 show front, rear and side views of the master filter module including operation of the breech view door;

FIG. 25C shows an exploded view of the primary filter module with the filter bag;

FIGS. 25D-1, 25D-2, 25D-3, 25D-4 and 25D-5 show various view of the primary filter module including a view showing the operation of the breech view door;

FIG. 25E is a view of the master module in an exploded view showing filtration;

FIGS. 25F-1, 25F-2, 25F-3, 25F-4 and 25F-5 show various views of the master module showing the operation of the breech view door;

FIG. 25G-1 shows a front view of the master module with the control dash board and FIG. 25G-2 shows a rear view of the apparatus;

FIGS. 25H-1, 25H-2 and 25H-3 show the centrifugal blower equipped with a pressurized exhaust in a front and side views;

FIGS. 26a–c discloses respectively front, rear and side views of the breech view door;

FIGS. 27A and B show a tube axial blower with an adjustable transvector blow tip, while FIGS. 27C and D disclose a tube axial blower with a preset compressed air amplifier;

FIG. 28 depicts the retractable glass door mounted in a trailer in operation;

FIG. 29 is a view of a tube axial blower mounted hydraulic lift platform within a truck;

FIG. 29A is a tube axial blower mounted within a truck with a hydraulic platform in operation with system operating;

FIGS. 30a, b, and c show front, rear and side views of the plenum plate;

FIGS. 31a, b and c show the front, rear and side views of the exhaust plenum plate;

FIGS. 32a and b depict respectively a front and side view of the plenum reducer;

FIGS. 33a and 33b depict front and side views of a ducting T;

FIGS. 34–40B show views of connections of ovalized ducting to the plenum plate, the plenum reducer, ovalized ducting tube, ovalized ducting to the breech view door and various connections made with tape ducting and transitional ducting between modules;

FIGS. 41a–e depict respectively front and end views of transitional ducting with FIGS. 41c and e representing the end couplings;

FIGS. 42a–d depicts respectively the front, end views and side views of the director;

FIGS. 43a and b comprise end and side views of the manifold protector;

FIG. 44a discloses the quick connect in an assembled condition; 44b is an end view of the quick connect and FIG. 44c is a view of the quick connect in a disassembled condition;

FIGS. 45a–c disclose respectively front and side views of the commercial air hose caddy;

FIG. 46a discloses the residential air hose caddy with 46b showing the air heads mounted within the caddy and FIG. 46c discloses the various air heads which may be used to clean the duct work;

FIG. 47 discloses an array of various air heads in a duct with access holes cut to allow entry in a broken away view;

FIG. 48a discloses a front view of the duct resonator;

FIGS. 48b and c depict side views; and FIG. 48d depicts a rear view;

FIG. 49a is a view of the duct bladder in a side position and 49b is a top view of the duct bladder;

FIG. 50 depicts the duct bladder in a cut-away view being inflated within a duct;

FIG. 51a is a view of the exchanger mattress from a side, and FIG. 51b is a and front perspective view views;

FIG. 52a is a front of the vent vac cover; FIG. 52b is a rear view and 52c is a side view;

FIG. 53a discloses an assembly of duct lights on an airhose in a side view with FIG. 53b disclosing the holder mounted about the airhose and FIG. 53c representing an end view of the assembly; FIG. 53d shows a single duct light; FIG. 53e an end view; FIG. 53f shows the assembly holder in a side view and FIG. 53g shows an end view of the holder; and, FIGS. 54a–c show respectively a top, side and end view of the tire trap.

DETAILED DESCRIPTION OF THE INVENTION

Referring now to the drawings, FIGS. 1–6 show various embodiments of the entire system and components of the H.V.A.C. duct cleaning system. The system in one embodiment, includes a master or control module 10, a filter module 20 and a blower 30. The master module 10 customarily includes a control panel 11 which contains the controls for the blower 30 so that the pressure within the ductwork 12 can be regulated. See FIGS. 25G-1–2. A separate control panel 75 may also be used. The controls include a variable frequency drive regulator for regulating the variable frequency drive 15, pressure meter, a pressure warning light and a filter meter for monitoring the hours the various filters 13 and filter module 20 have been in operation. The electronic controls may also be located in the compartment 14 and be accessible through doors 16. The three (3) phase power outlet 17 is connected to the blower outlet 18 by a conductor 76 when the system is in operation. The 220 volt power drive automatically converts single phase power to three phase power to power a backwardly inclined 3 HP up to a 10 HP blower 30.

As shown in FIGS. 17a–f, the master module 10 also includes a primary filter 13 which catches the majority of the debris flowing from the ductwork 12. A removable filter bag 74 is located behind the breech view door 19 so that the debris may be readily removed.

The filter bag 74 is removable, as shown in FIG. 25C, through the breech view door 19. As shown in FIGS. 26a–c, the breech view door 19 comprises a substantially square Lexan base 21 in stainless steel frame 22. A central aperture 23 in the base 21 is surrounded by a rolled steel or aluminum angle flange 24 secured to the base 21 by bolts 26. The inlet aperture 23 also includes a 2 inch wide neoprene gasket 27 to provide a secure seal to the flexible ducting 28. The filter particulate (not shown) is either pushed or pulled through the ductwork 12 and then the flexible ducting 28 into the filter 13 while the breech view door 19 permits visual monitoring of debris buildup without having to interrupt the operation.

Referring back to FIGS. 1–7, the master module 10 as well as modules 20 and 30 are mounted on mobile aluminum carts 29. The carts 29 are approximately 40 inches long by 24 inches wide by 34–44 inches high. The carts 29 include shock absorbing pneumatic casters 31 in the forward position and pneumatic tires 32 in the rear position. To move the module unit 10, 20 or 30, the particular unit is tilted holding retractable handles 78 so that the weight is on the tires 32. To prevent damage to floors the tires may be covered with wheel covers 33.

The master module 10 is connected to the filter module 20 with ducting 34 running from the 20 inch outlet ring 36 to the 20 inch inlet ring 37. The ducting 34 is secured to the rings 36 and 37 by a working T-handle 39 which tightens the strapping 41 about the rings 36 and 37. This arrangement is more clearly shown in FIGS. 36A–40B.

As shown in FIGS. 22 and 23, filter module 20 comprises a double series of electrostatic filters 37 and V cell filters 42 with the first series 43 facing the inlet stream and the second series facing rearward all mounted within the container 46. As shown in FIG. 1, container 46 has a removable top 47 with grooved end portions 48 which engage mating portions 49 on the edge of the container 46. The top 47 is periodically removed so that the various filter cells 42 can be changed to control the degree of filtration.

As shown in FIGS. 1–5 and 8–13a, the 20 inch outlet ring 51 of the filter module is connected to the inlet ring 52 of the blower 30 by tapered ducting 53. Stationary T-handles 39 are used for shoving the ends of the tapered ducting onto the respective rings 51 and 52. As discussed previously, working T-handles 39 are used to tighten the straps 56.

As shown in FIGS. 1–2, 6–9, 25H1–3 and 27 A–D, the blower module 30 may comprise a typical centrifugal blower fan 30 connected to a blower motor 40 in housing 57. The exhaust port 58 includes a blow tip 59 to provide a pressurized exhaust from the air hose 61 when the unit is operating.

Alternatively, the control panel 11 with its associated controls may be eliminated in the master module 10 and a tube axial blower 30 could be used. As shown in FIGS. 13a–c, 18 and 19A1–A5, in the tube axial blower 60, the controls 62 are located within a remote cabinet connected to the tube axial blower by means of a four (4) wire cable 76, from a variable frequency drive 15. The cart 29 would include tires 64A and 64B in this case. The exhaust ring 65 would include a transvector blow tip 59 to provide a pressurized exhaust. Bulkheads 67 extend upwardly from the base 68 to hold the blower 60 in place.

Figure 7:
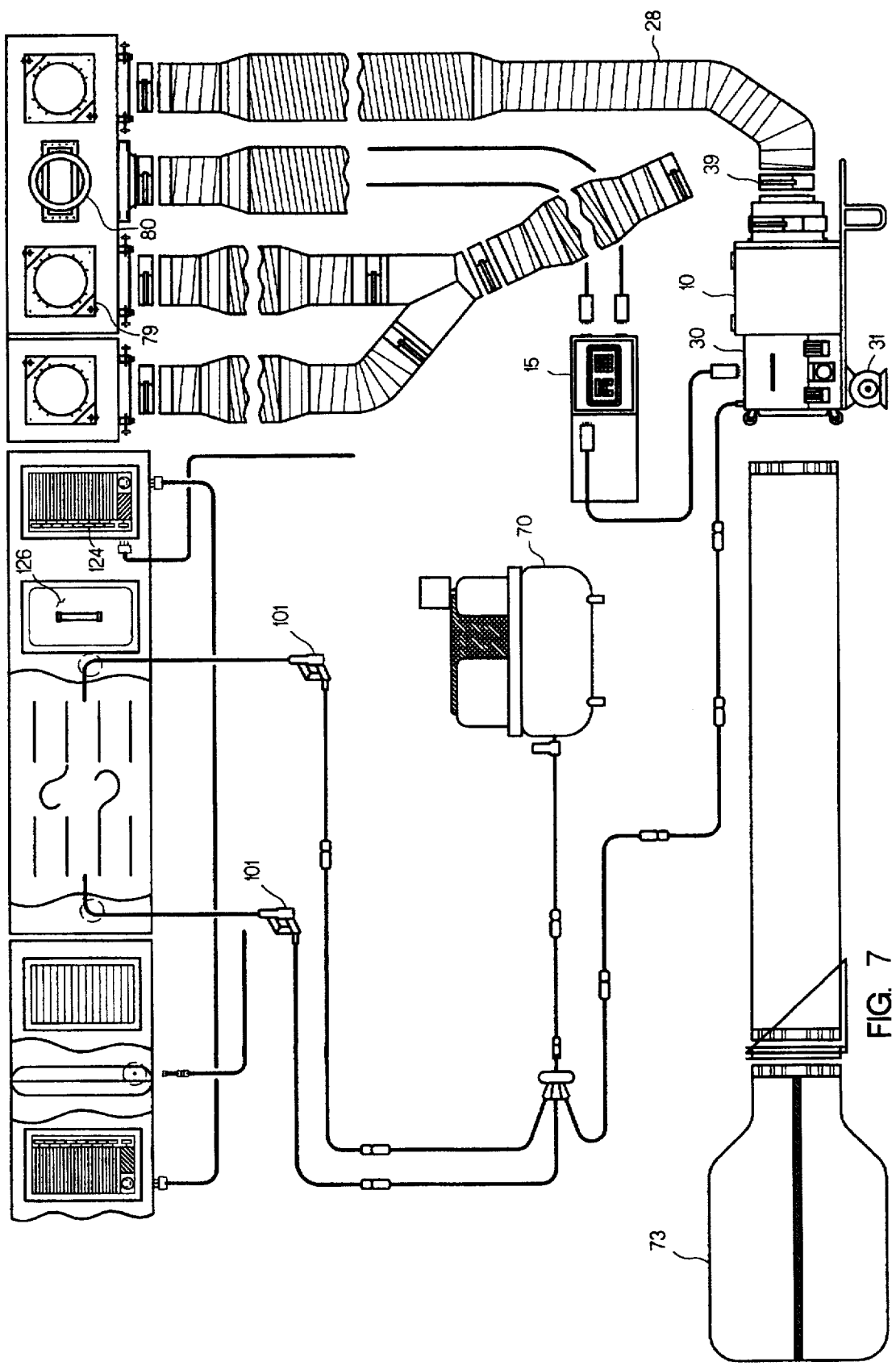

As shown in FIGS. 25H-1 and 27A–C, pressurized exhaust is provided by blow tip 59 which is which are connected to a downwardly extending pipe 69 in the exhaust port 58. The port 58 are connected to the air hose 72 respectively leading to an air compressor 70. The blow tip 59 is are selected to match the optimum CFM and PSI output of the air compressor system. The pressurized exhaust helps to create a negative pressure within the ductwork 12 which helps to draw debris outwardly into the filters 13 and 42. As shown in FIG. 7, the exhaust may be directed into a particulate arrestance bag 73 which cuts down on the velocity of the exhaust and the noise associated therewith and provides for filtration when the main filter module is not used.

More specifically, referring to FIGS. 1–6 of the drawings the invention comprises a blower 30 which may be a centrifugal blower fan or a tube axial blower controlled by a variable frequency drive 15. Air is evacuated from a H.V.A.C. System at one location through a plenum plate 79 or plenum reducer plate 80 on the feed side or return side, or air may be evacuated from two separate locations either on the feed side or return side or on the feed and the return side separately by use of the ducting T.

Exhaust from the blower 30 may be exhausted out the exhaust port 58 held secure by an exhaust plenum plate 81 into open space within a building or outside the structure; or the exhaust may be redirected back into the feed or return branch of the H.V.A.C. system by means of the exhaust port 58 attached to an exhaust plenum plate 81.

Figure 43B:
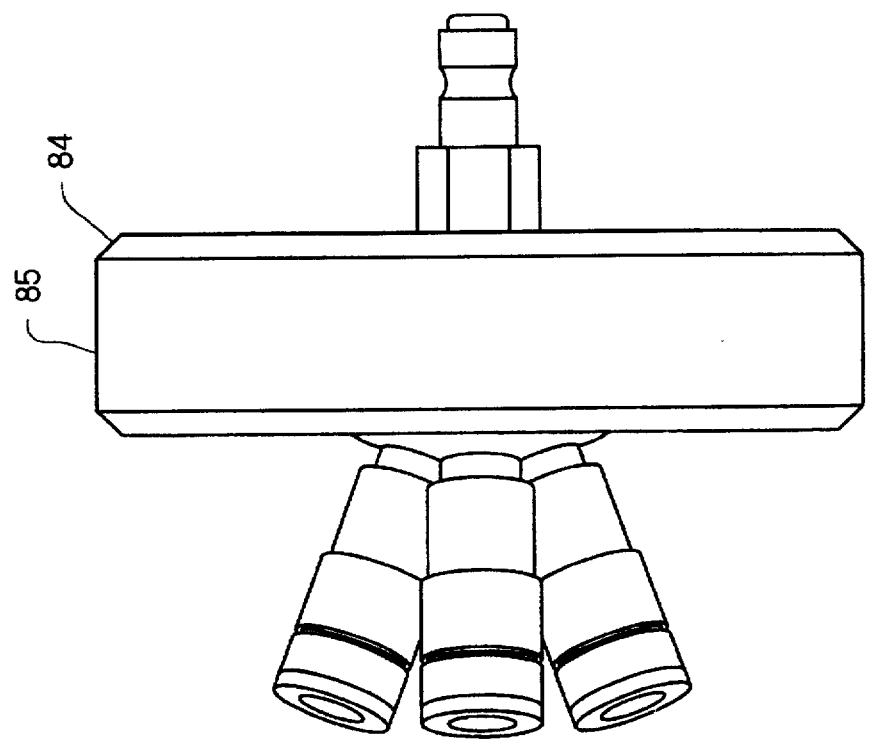

Compressed air is furnished by a commercially available air compressor 70 so that debris accumulated in all branches of an H.V.A.C. system may be efficiently dislodged and removed. A main air line 83 runs from the compressor 70 to a commercially available compressed air manifold 84 equipped with a manifold protector 85 that protects all flooring surfaces from damage by keeping commercially available metal quick connects 86 attached to the manifold 84 suspended off the ground while work progresses. This is shown in FIGS. 43a–b. The compressed air is then split three ways by means of smaller diameter compressed air lines 87, 88, 89. The smaller compressed air lines are connected with no scratch quick connects 90 so that work may progress with no resulting damage to floors, woodwork, or furniture. As shown in FIGS. 44a–c the quick connects 90 include a male 91 and a female 92 member which snap together. The male member 91 has a protruding element 93 with recesses 94 which engage portions of the female member 92 within aperture 95. The members 91 and 92 each include protruding members 96 at either other end with inclined portions 97 to engage an airhose aperture.

The compressed air in line 89 operates the pressurized exhaust on all blowers used in the mobile filtrated air moving system described herein. The remaining two lines 87, 88 feed two commercially available air guns 99, 101. The air guns 99, 101 then connect to various five foot lengths of lightweight plastic tubing 102. Each five foot length connects to one another by means of male/female commercially available lightweight plastic quick connects 103. Depending on the length of runs of various ducting within a structure, any number of lengths of five foot plastic tubes can be attached together quickly to obtain the desired length of air conduit to power the different array of air heads 104 to effect the cleaning of the air duct interiors. FIG. 46 shows a variety of air heads 104. A vector tip 105, forward air sweep 106, reverse air sweep 107 and spin air whip 108 can be quickly attached to the lead five foot length depending on the particular cleaning operation desired at the time.

The five foot lengths making up one air conduit with a desired air head 104 is inserted into any particular air duct 12 through an available register 109 or pre-cut access hole 110. With the latter, the pre-cut access hole 110 is then plugged with a commercially available pre-sized plastic cap to return the H.V.A.C. system's air handling the H.V.A.C. integrity. As work proceeds using the above mentioned compressed air tools, the debris that is dislodged from the interior surfaces of the H.V.A.C. air duct system is then entrained in the vigorous air stream created by the various mobile filtrated air moving system described herein.

Each of the various mobile filtrated air moving systems described herein entrap the removed debris by a series of filtering devices. To allow for easy debris removal from each of the mobile filtrated air moving systems, as shown in FIGS. 17d, 25A, C, and E, a twenty four inch by twenty four inch square by twenty inch deep primary filter bag 74 is provided which collects the majority of the large debris and particulate which has been removed from the H.V.A.C. system.

The primary filter bag 74 depending on construction can provide 40% to 60% efficiency of particulate entrapment. When exhausting inside a structure and recontamination of the interior spaces is to be avoided, an additional series of twenty four inch by twenty four inch by three quarter inch deep or one and three quarter inch deep electrostatic filters 43 can be placed inside the main filter module 20 or master filter module 10 along with a series of V cell filters 42. See FIGS. 21, 22, 23 and 25A. Depending upon the efficiency requirement of the exhaust job, the electrostatic 43 and V cell filters 42 can be arranged to allow for exhaust efficiency as high as 9.97% which is classified as H.E.P.A. (High Efficiency Particulate Arrestance). The placement of the final V cell in the main filter module 20 or the master filter module 10 will determine the ultimate efficiency desired.

The variable frequency drive that converts and controls power to the various blowers 30 described herein allows the operator to convert single phase power into three phase power automatically as all blowers 30 are equipped with three phase motors. If three phase power is available to the operator, both variable drives pictured herein will transfer it directly through to the three phase blower motors automatically. The variable frequency drives enable the operator to also control the C.F.M. rate of air being evacuated from any particular H.V.A.C. air duct system to optimize the cleaning operation but at the same time to protect the H.V.A.C. system from damage by possibly creating more air flow than the system can safely handle.

As shown in FIGS. 1–7, and in greater detail in FIGS. 45a–c and 46a–c, additional elements of the system are a commercial air hose caddy 111 and a residential air hose caddy 112. These devices neatly store and arrange all air hoses 101 in five foot lengths, air guns 101 and air heads 104 for convenient use. A residential air hose caddy with a carrying case 113 is also illustrated. The case 113 includes a pivotal lid 114 and a carrying strap 115 and handle 116. The residential case 113 is shown in FIGS. 46a–c with hoses 101 having a plurality of different heads 104.

The commercial unit 111 includes an array of cylindrical elements 117 in a unitary support structure 118 on a cart 119 having storage for tools and air guns 101.

To aid in cleaning the actual air ducts 12 an inflatable air duct bladder 120, as shown in FIGS. 1–7 and FIGS. 49 and 50 is provided to enable the operator to internally "zone off" desired areas of the H.V.A.C. air duct system to increase the air flow that the mobile filtrated air moving systems described herein create. The air duct bladder 120 is inserted through a pre-cut access hole 110 or an existing register 109 and inflated through valve 121, by compressed air, see FIG. 49. When no longer required, it can be deflated, removed and the pre-cut access hole is then plugged.

As shown in FIGS. 1–7 and FIGS. 52a–c, to also aid in increasing airflow, a vent vac cover 126 which is magnetized on one side with a commercially available sheet magnet 122 may be readily placed over steel registers 109 at various points by utilizing the convenient handle 127. The cover 121 also prevents debris from exiting from the register 109.

As shown in FIGS. 1–7 and FIGS. 48a–d, duct resonators 124 may be placed at various locations directly adjacent to registers. These devices 124 operate by means of electric motors that alternatively open and close a series of louvers 125. The louvers 125 open and close at various speeds and sequences and disrupt air flow inside the H.V.A.C. system's duct work aiding in the debris removal process mentioned above.

As shown in FIGS. 1–7 and 51a and b, to protect heat exchangers from collecting debris removed form other parts of an H.V.A.C. air duct system, an exchanger mattress 136 can be placed adjacent to the exchanger. The mattress 136 is made of rugged, heavy duty tear and rip resistant fabric divided into sewn pockets 171 which contain crushed pea gravel. The mattress permits a substantial weighted and reusable mattress to seal off heat exchangers in the H.V.A.C. systems. Duct cleaning can thus be attempted without "puff-back" or movement of debris into feeds or returns.

As shown in FIGS. 53a–g, to assist in illuminating the interior of the air ducts 12 of an H.V.A.C. system and to permit more efficient work and inspection, a series of duct lights 128 may be installed on various five foot lengths of the plastic tubes 102. This device comprises a series of commercially available light sticks 128 mounted on hoses 102 which when activated by snapping, emit a safe but bright chemically produced light source. As shown in FIGS. 53a–g, the light sticks are mounted circumferentially in a frame 129.

As shown in FIGS. 1–7, to provide stability for the mobile filtrated air moving systems described herein, a tire trap 131 conveniently prevents equipment modules from rolling around or moving when in operation or while in transit in a truck or a trailer.

The purpose of the duct resonator 124 invention is to easily disrupt air flow in any H.V.A.C. system to enhance cleaning of air ducts 12 with commercially available air tools. Air flow is typically created with commercially available mobile air handling equipment that has some degree of filtration. Disrupting a constant air flow intermittently creates for a very desirable bursts of suction and release that speeds up "source removal", the generally accepted term for particulate and debris removal from an H.V.A.C. system. The purpose of another feature of the invention shown in FIGS. 1–6, 8–10, 14 and 15 is an exhaust sleeve 132 to direct exhaust from a commercially available blower 30. The exhaust sleeve 132 is connected to the exhaust outlet 58. An exhaust sleeve typically is made from a lightweight material stitched in a circular shape of various diameters and lengths. An "exhaust director" 133 controls the direction of the exhaust at the end of the exhaust sleeve and more importantly, keeps the open end from snapping back and forth due to high speed air flow escaping the end.

In the invention, FIG. 2, shows the system of FIG. 1 but with a tube axial blower 30 controlled by a variable frequency drive. The filter module 20 is included within module 10.

Figure 3:
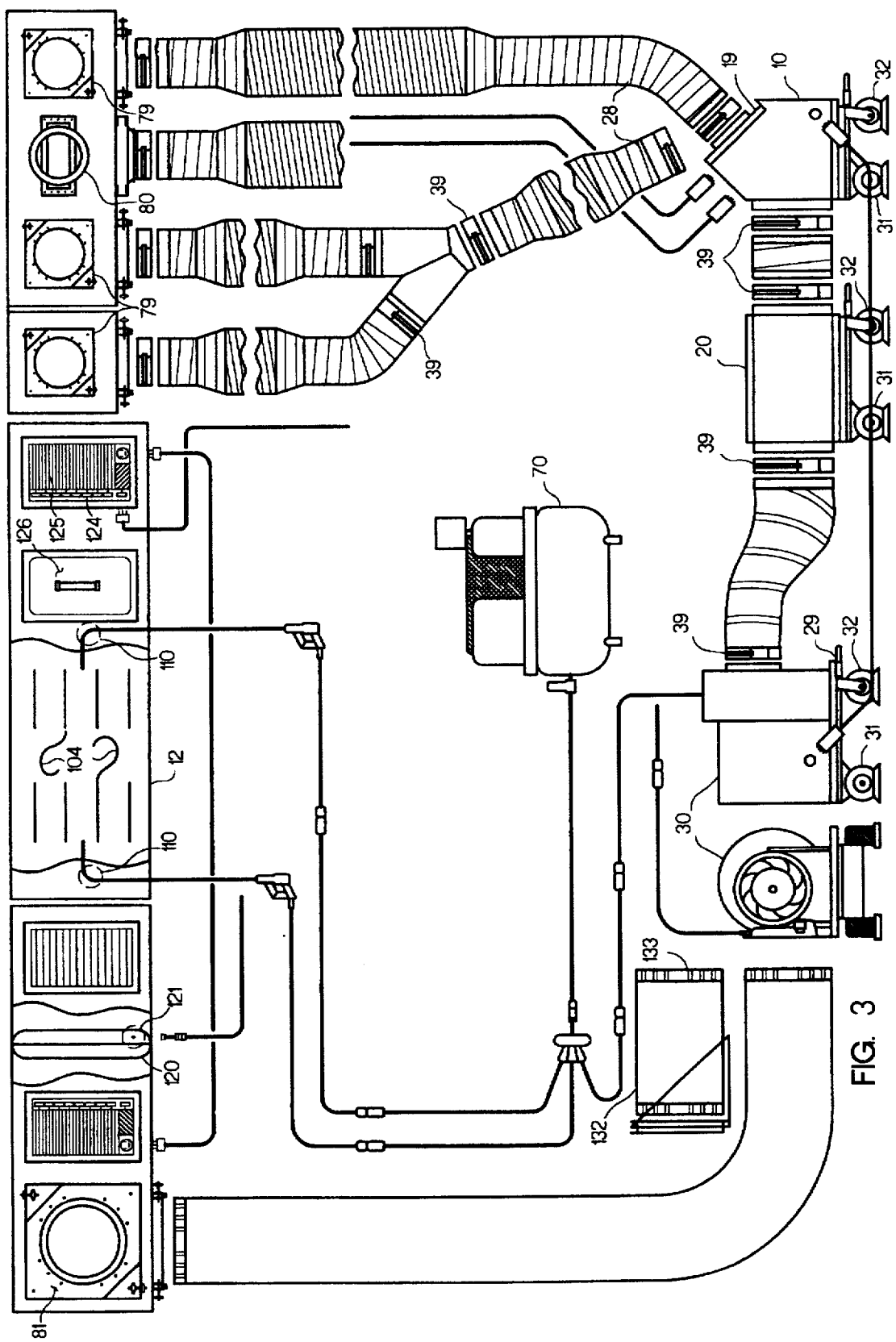
FIG. 3 shows a duct cleaning system with a centrifugal blower controlled by a variable frequency drive housed within the master module and filtration by a master module and main filter module, and other components.

FIG. 3 shows the invention with a centrifugal blower 30 controlled by a variable frequency drive housed within the master module 10. The filtration includes a master module 10 and main filter module 20.

Figure 4:
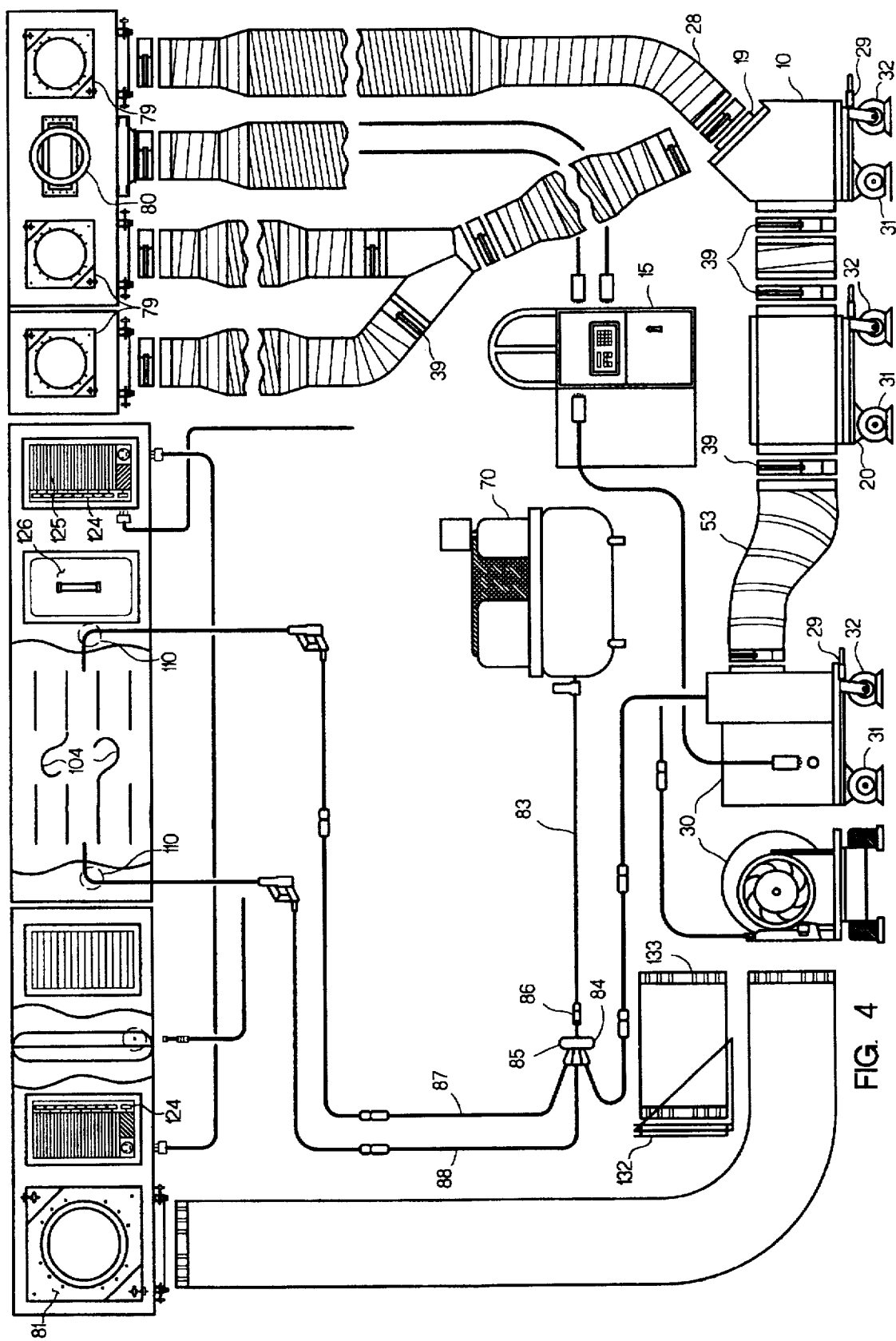
FIG. 4 shows a filtration by primary filter module and main filter module, and other components.
Figure 5:
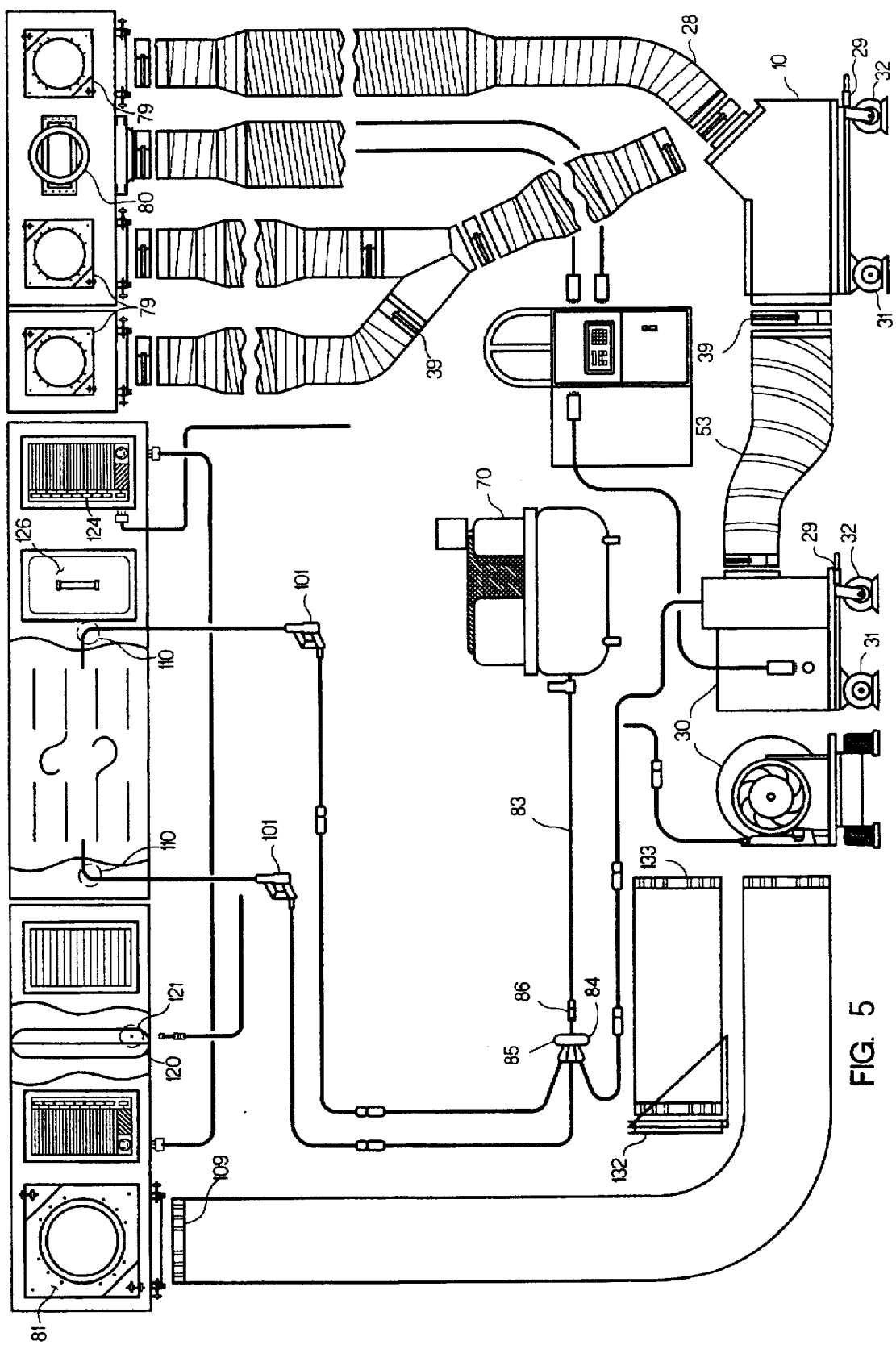
FIG. 5 shows a centrifugal blower controlled by variable frequency drive with filtration by a master filter module, and other components.

FIG. 4 shows the invention with a centrifugal blower 30 controlled by a variable frequency drive 15. The filtration includes a primary filter module 20 and a master module 10. On the other hand, FIG. 5 shows a centrifugal blower 30 controlled by a variable frequency drive with filtration by a master filter module 10.

Figure 6:
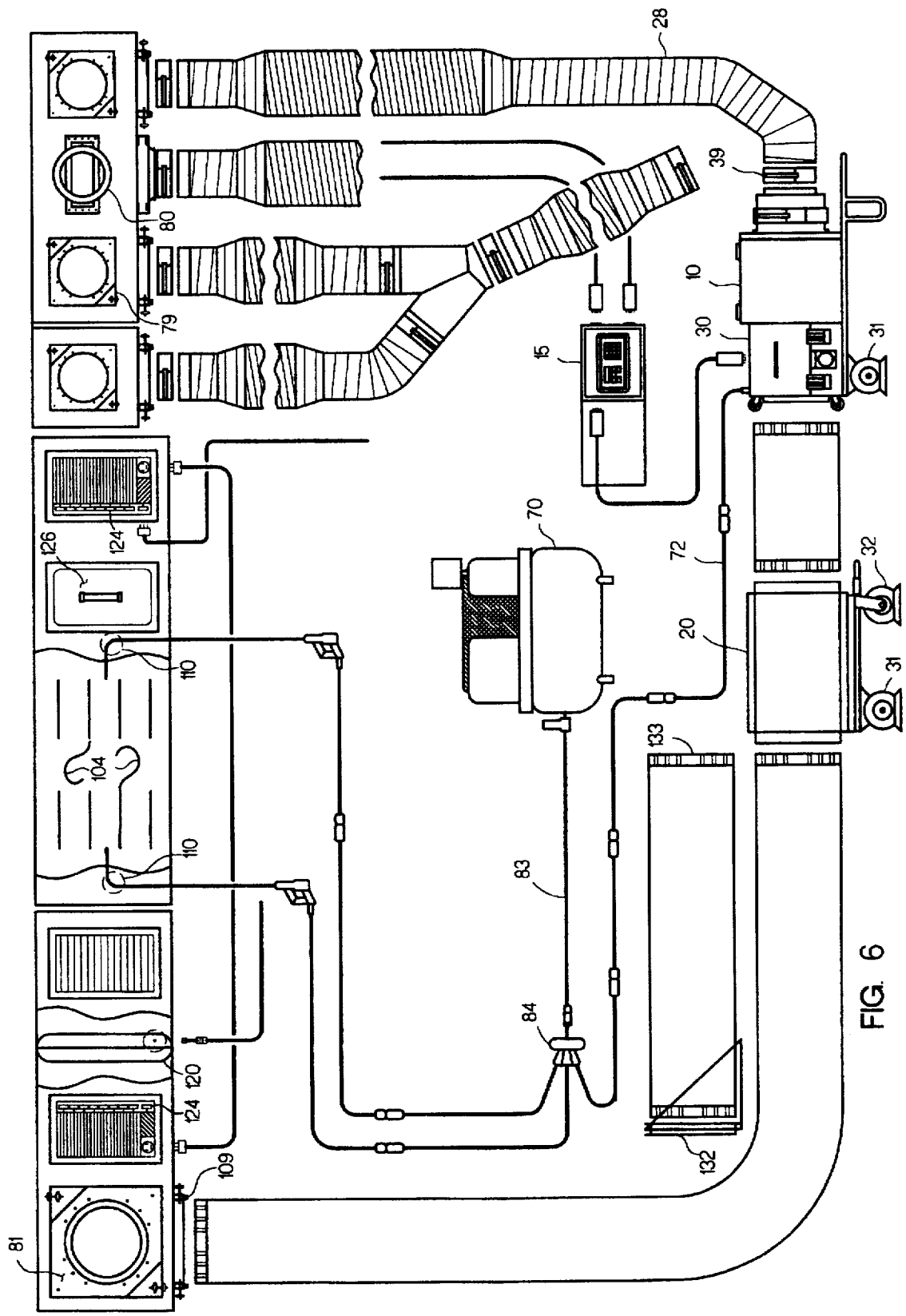
FIGS. 6–9 shows a tube axial blower controlled by a variable frequency drive.

In FIG. 6 a tube axial blower 30 is shown controlled by a variable frequency drive. Filtration is by a primary filter cabinet 20 and master module 10. In an alternate embodiment shown in FIG. 7 a tube axial blower 30 is controlled by a variable frequency drive 15, but the filtration is by a master module 10 and particulate arrestance bag 73. This is the only system not exhausting back into H.V.A.C. system.

Figure 8:
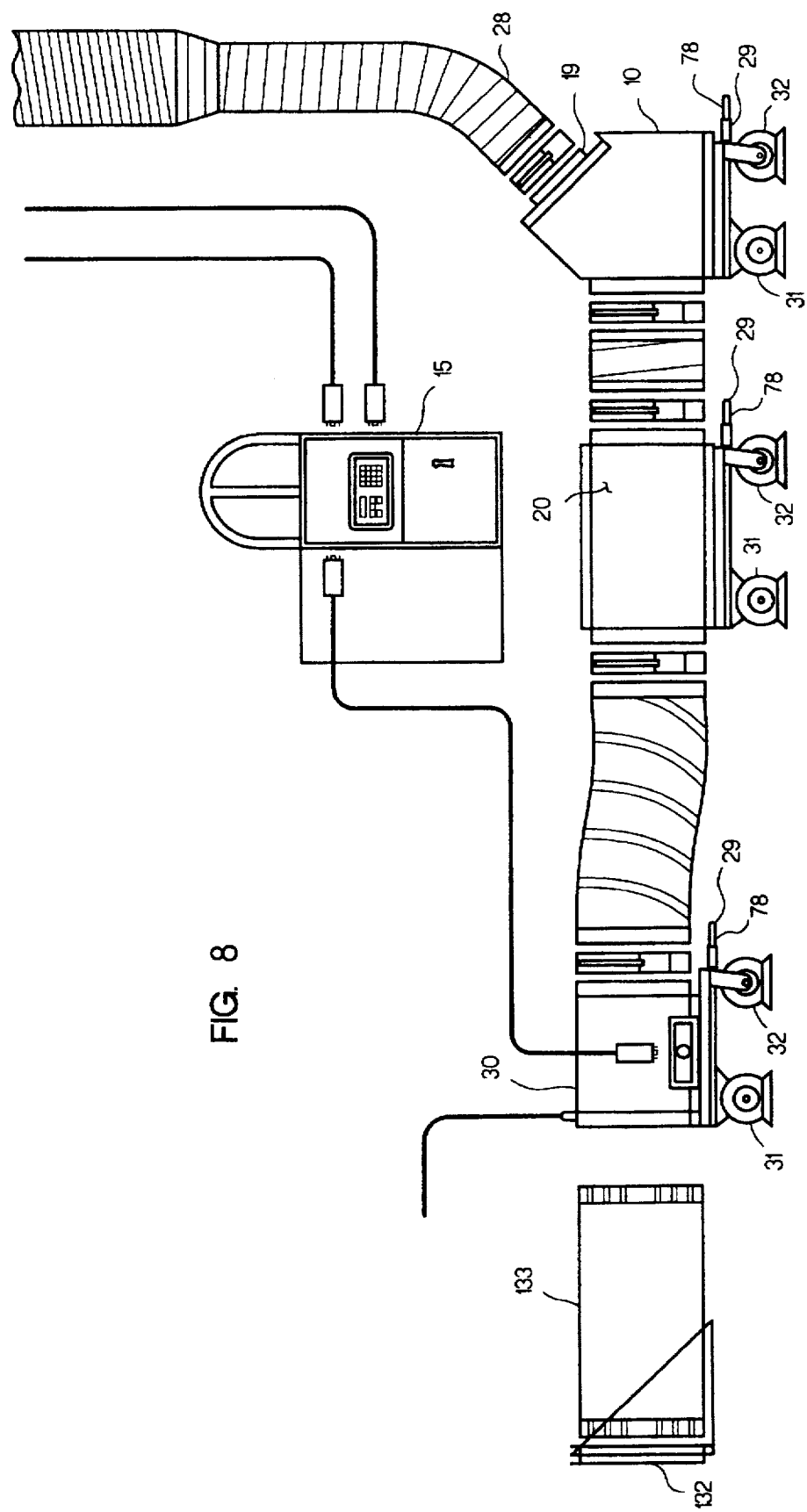
Figure 9:
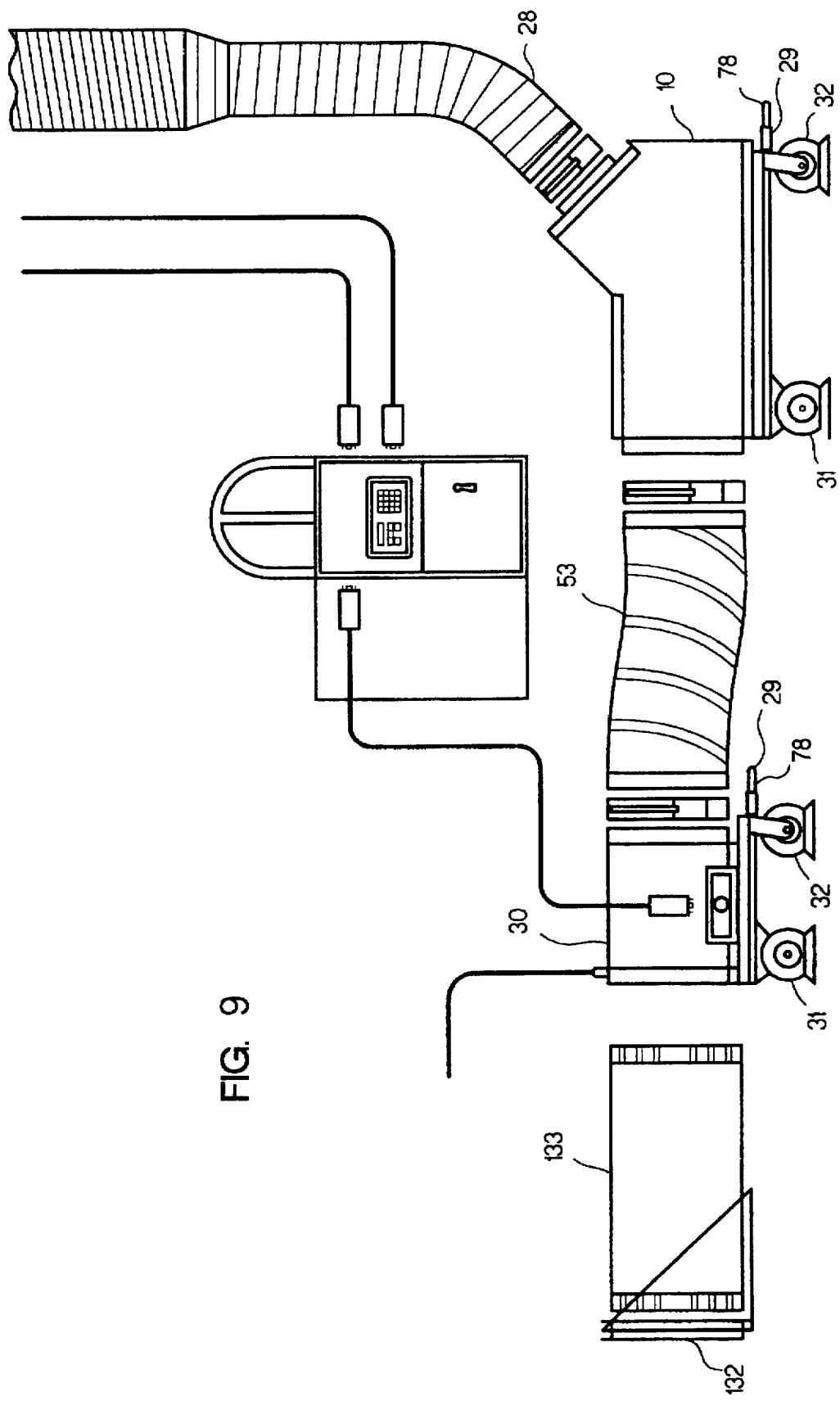

FIGS. 8 and 9 show further embodiments of the tube axial blower 30 controlled by variable frequency drive. Filtration in FIG. 8, is by a primary filter module 10 and main filter module 20. The exhaust chute 132 is attached to an exhaust director 133. In FIG. 9, filtration is by a master filter module and an exhaust chute 132 attached to an exhaust director 133.

Figure 10:
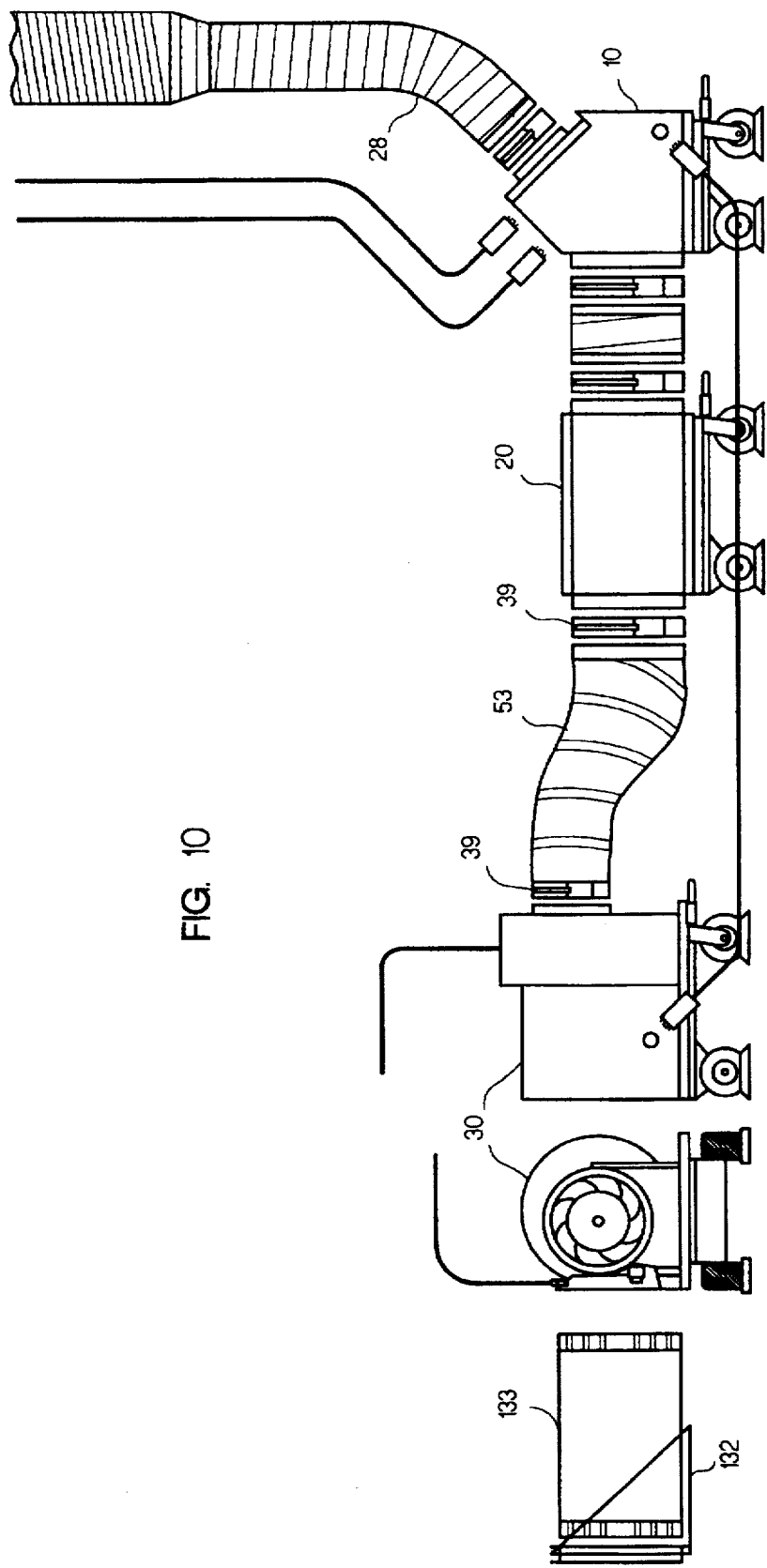
FIG. 10 shows a centrifugal blower controlled by a variable frequency drive housed inside a master module and filtration by a master filter by a master filter module and main filter module.

FIGS. 10-13 depict a centrifugal blower 30 controlled by a variable frequency drive. In FIGS. 10 and 11, the drive is housed inside a master module 10 and filtration is by a master filter module 10 and main filter module 20. An exhaust chute 132 is attached to an exhaust director 133.

In FIG. 12, filtration is by a primary filter module 10 and main filter module 20. The exhaust chute 132 is attached to an exhaust director 133.

Filtration in FIGS. 13a-b is by a master filter module 20 with the exhaust chute 132 attached to an exhaust director 133. It is to be noted that FIGS. 8 to 15 all have ovalized ducting 28 attaching to a breech view door 19 with a coupler 39.

Figure 14:
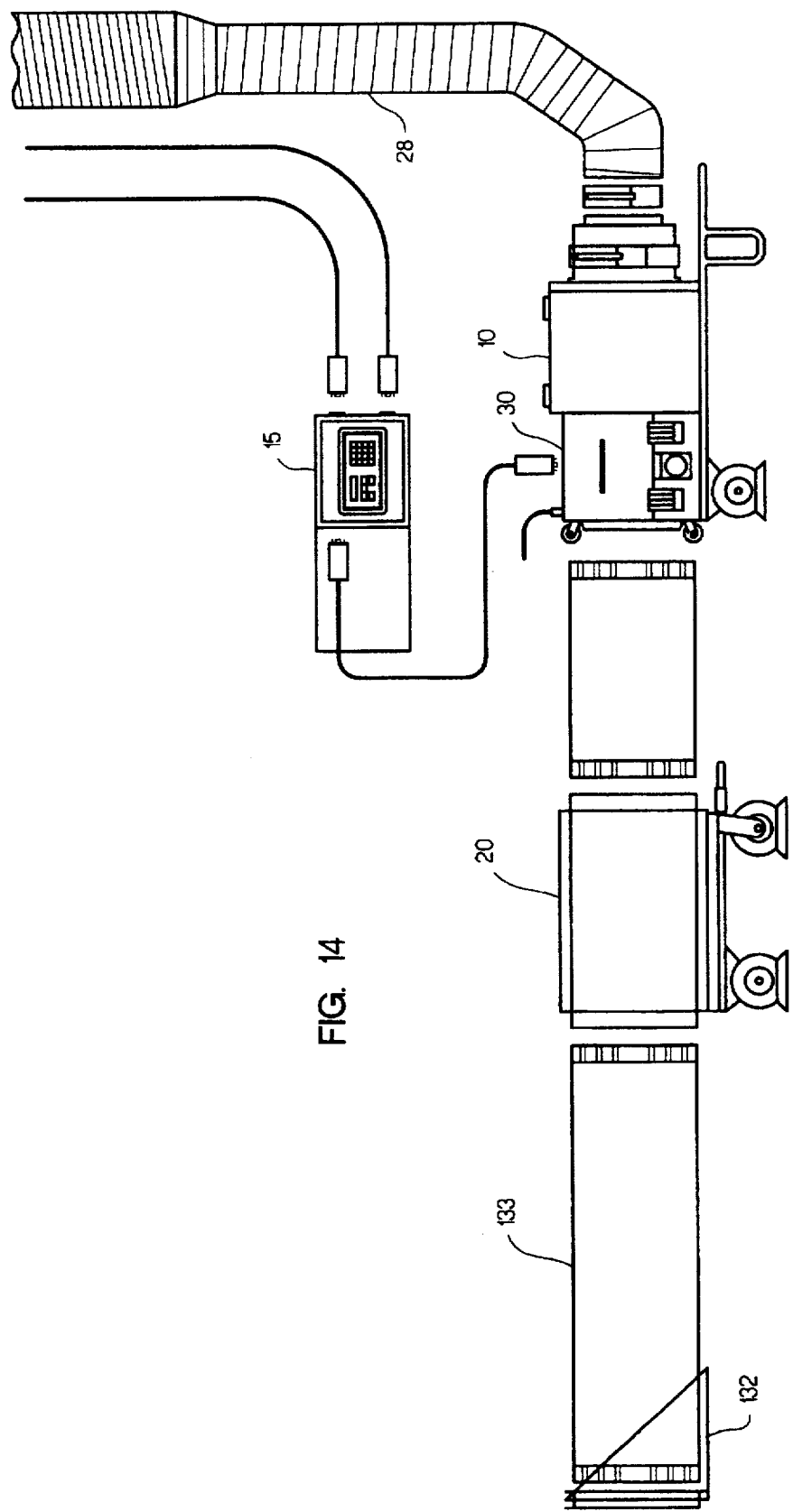
FIG. 14 shows a tube axial blower controlled by a variable frequency drive with filtration by a primary filter cabinet and a main filter module.
Figure 15:
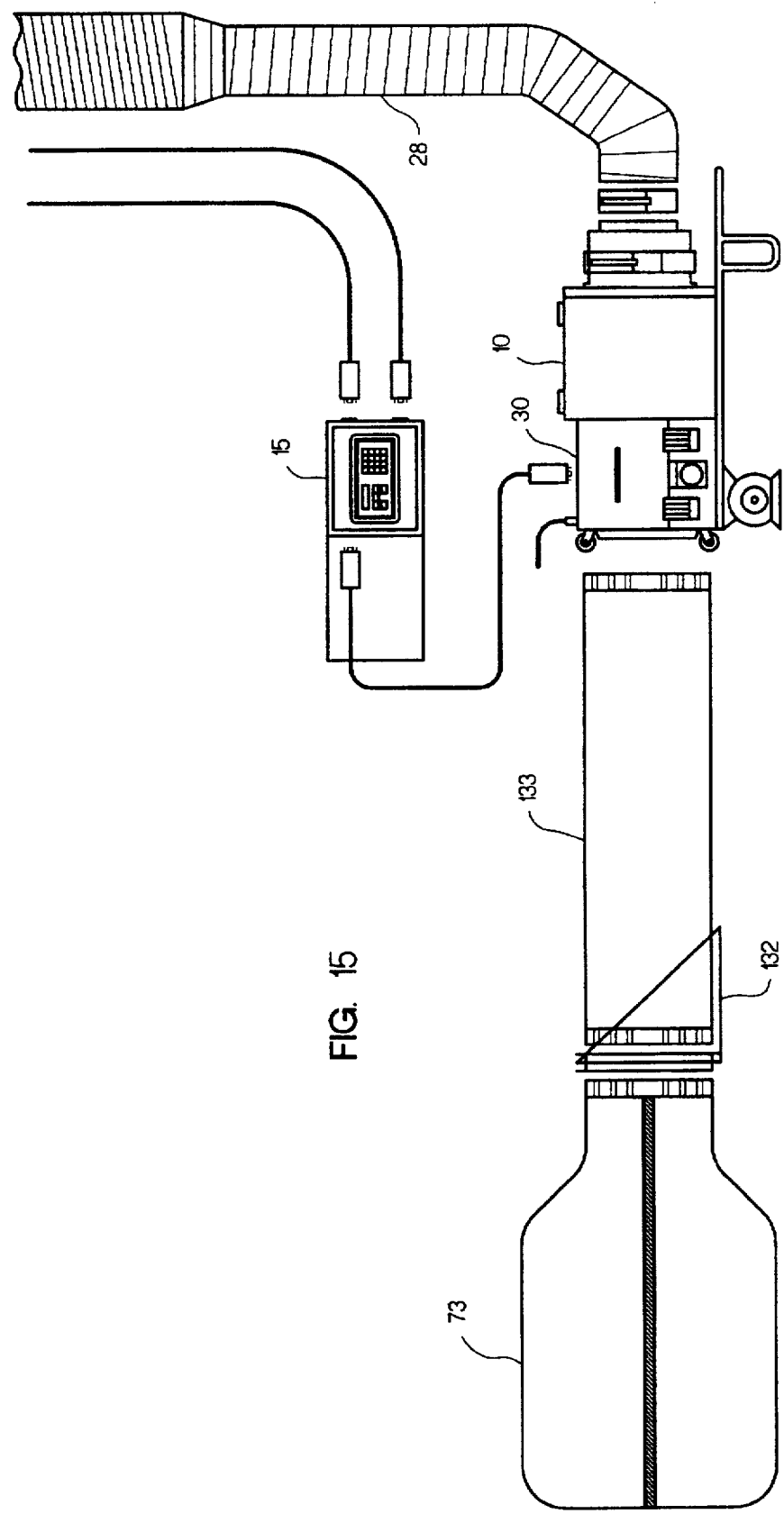
FIG. 15 discloses a tube axial blower controlled by a variable frequency drive with filtration by a primary filter cabinet and a particulate arrestance bag attached to an exhaust director.

In FIGS. 14 and 15, the tube axial blower 30 is controlled by a variable frequency drive 15 with filtration located in master module 10 and main filter module 20. The exhaust chute 132 is attached to an exhaust director 133.

Filtration in FIG. 15 is by master module 10 and particulate arrestance bag 73. The exhaust chute 132 is attached to an exhaust director 133 and a particulate arrestance bag 73 is also attached to an exhaust director 133.

Figure 16:
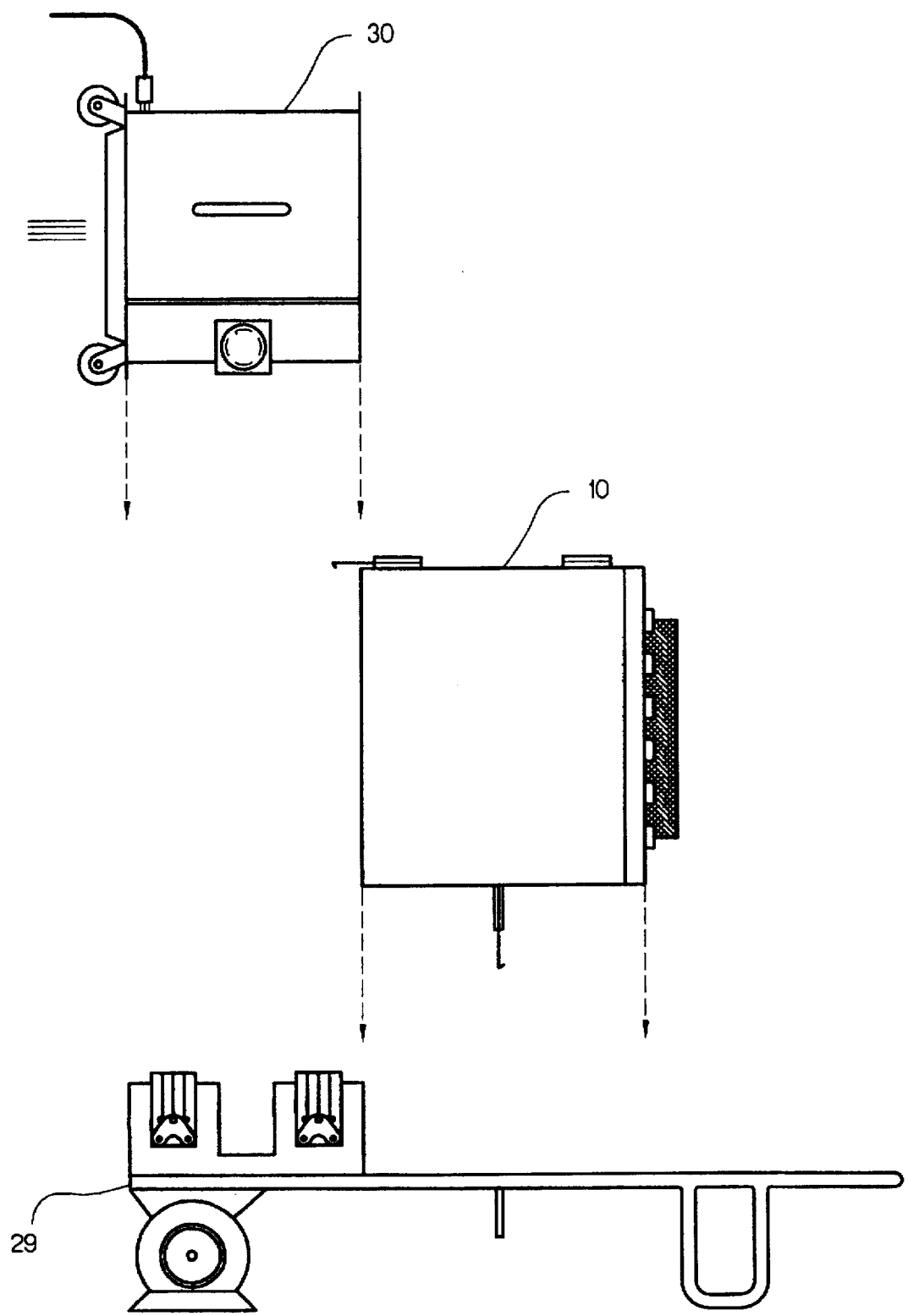
FIG. 16 shows a residential tube axial blower system and primary filter cabinet in a disassembled condition.

FIG. 16 illustrates a residential tube axial blower system with master module 10. This view shows how the blower 30 and master module 10 unlatch from the cart 29. Since residential work and some commercial locations offer very tight working conditions, and the units ability to be disassembled provides the operator maximum opportunity to "break down" the unit and move each of the components individually to the desired work area to be quickly reassembled for operation.

Figure 17A:
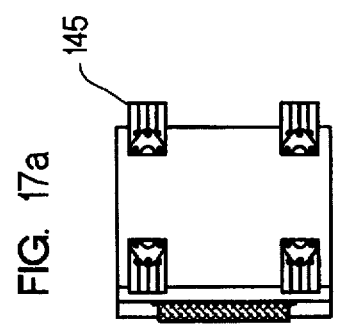
FIGS. 17a–f show various views of the primary filter cabinet and the various latching means attaching the unit to the cart; the breech view door in FIG. 17b; the gasketed end adjacent the tube axial blower in FIG. 17c.
Figure 17B:
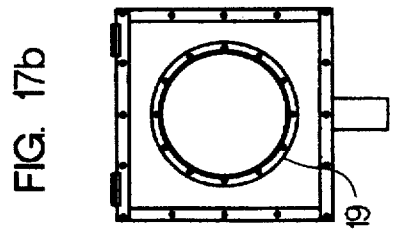
Figure 17C:
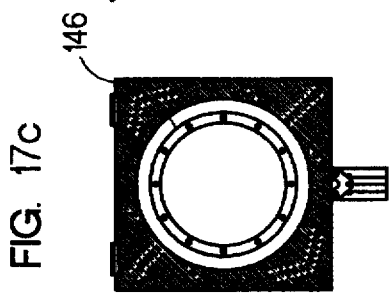
Figure 17D:
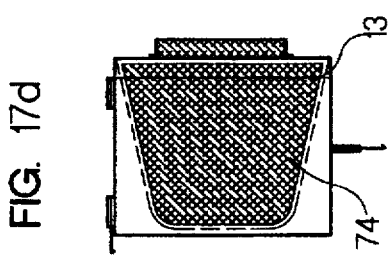
Figure 17E:
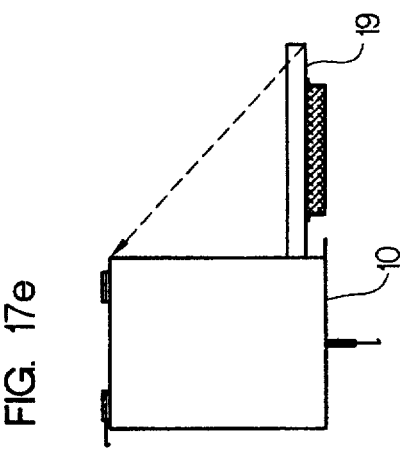
Figure 17F:
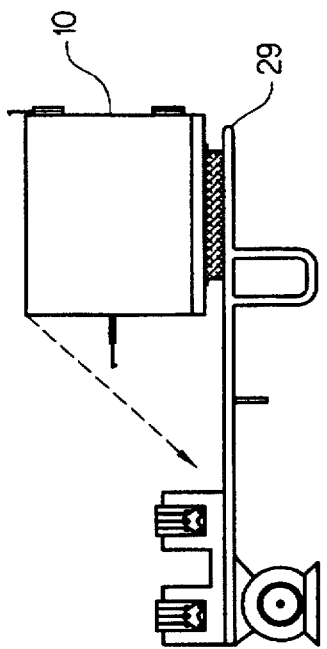

Views of the master module 10 in FIG. 17 show the various latching means 145 in FIG. 17a (FIG. 17b) to attach the unit 10 to a cart 29. The breech view door 19, the gasketed end 146 (FIG. 17c) that attaches to the tube axial blower 30 and a side view cut away showing placement of the primary filter bag 74 within the master module 10. The view also depicts in FIG. 17e, the breech view door 19 attaching to the master module 10, and the master module 10 attaching to the cart 29.

FIGS. 18a, b, and c show left, front and rear views of the tube axial blower equipped with pressurized exhaust attaching to the cart 29.

Figures 3, 19A:
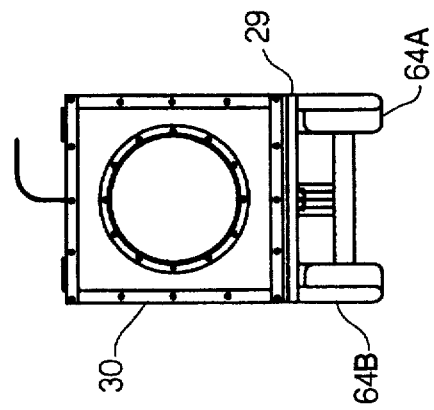
Figures 2, 19A:
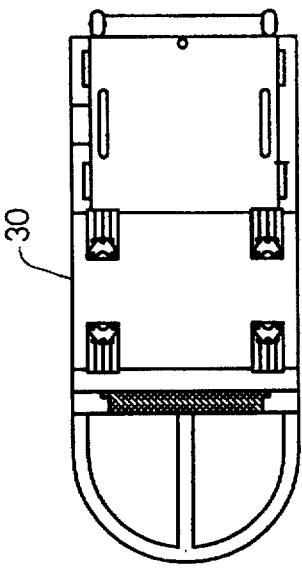
Figures 1, 19A:
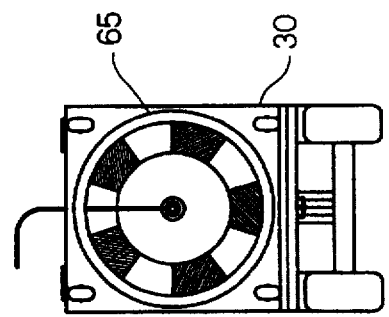
Figures 5, 19A:
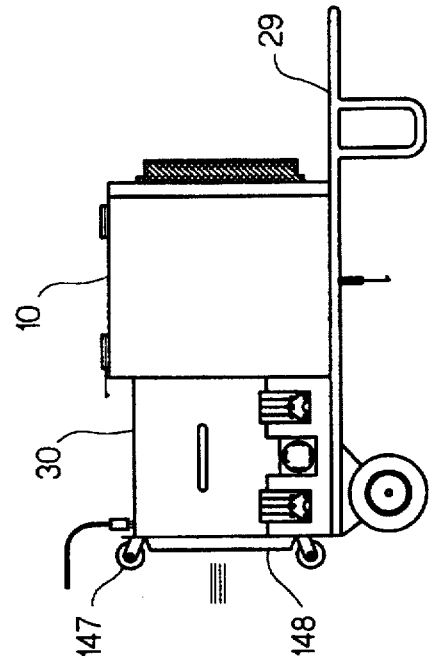
Figures 4, 19A:
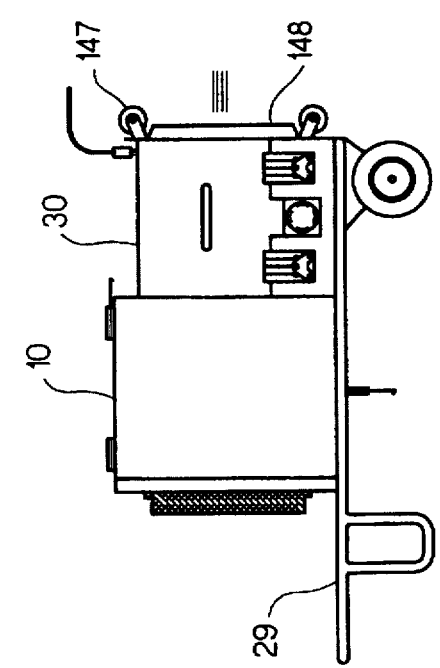
Figures 6, 19A:
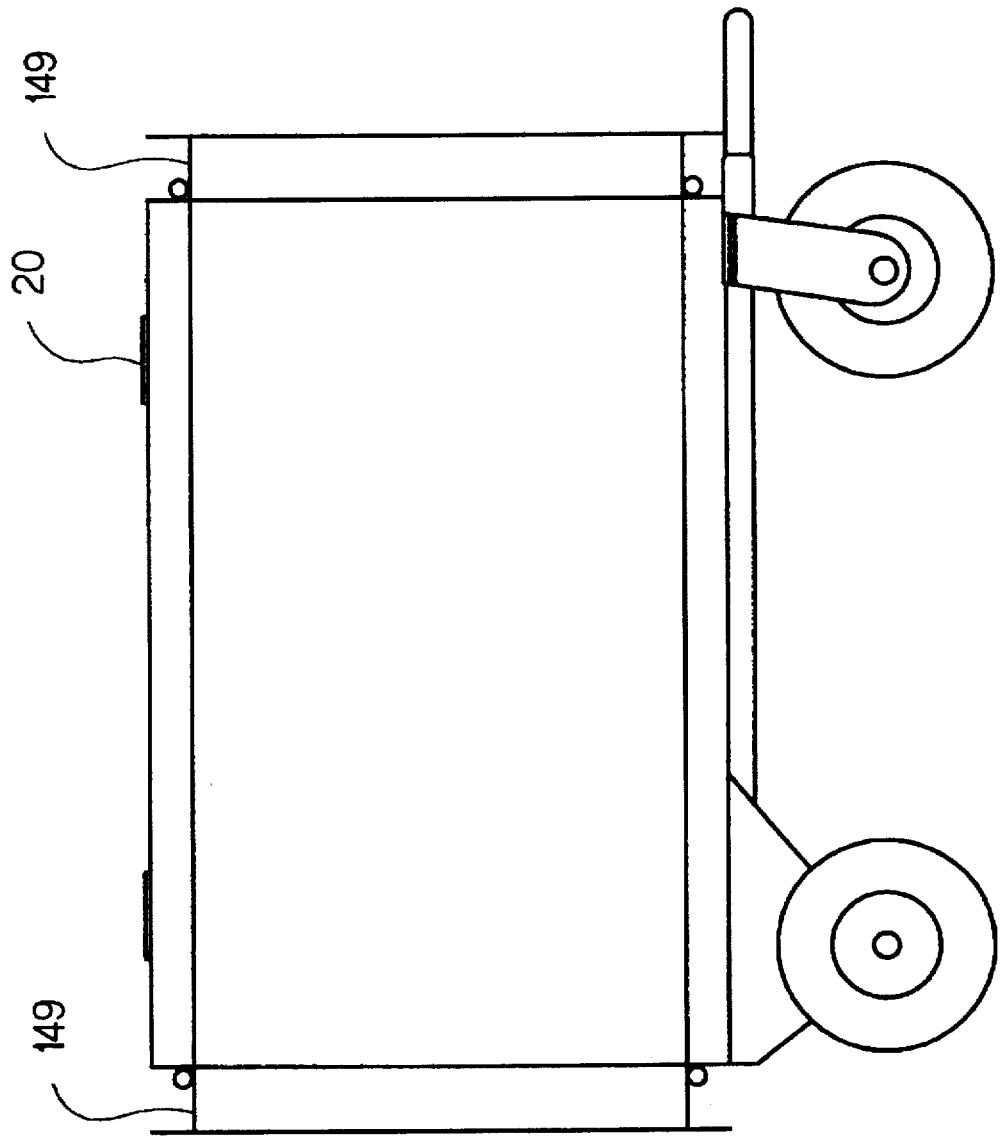

FIGS. 19A-1-19A-5 are views of the residential tube axial blower system. The tube axial blower 30 equipped with pressurized exhaust is latched securely to the on the cart 29 and is then latched securely to the master module 10 creating an air tight seal due to compression of the gasketed end of the master, module 10. The casters 147 attached to the end plate 148 of the tube axial blower 30 permit tipping the entire unit on end to allow for turning when in very tight quarters.

The main filter module 20 as shown in FIG. 19A-6 is equipped with companion flanged rings 149 for use with the residential tube axial blower system.

In FIG. 19B, this configuration is obtained by removing the compression gaskets from the stationary flanged rings 151, 152 which are welded on each end of the module and sliding on sized rings 154 over the stationary rings with the flanges projecting outwardly. Commercially available fastening pins 153 are then slid into pre-punched holes on the top and bottom to hold the rings securely. This configuration permits exhaust chutes to be strapped onto each ring 151, 152 using the outside flange 151, 152 as its anchor to prevent slipping off during operation.

FIGS. 20A, 20B and 20C represent various views of the commercial tube axial blower equipped with pressurized exhaust residential variable frequency drive, and commercial variable frequency drive. While views of V cell filters 42 three quarters of an inch to one and three quarters of an inch electrostatic filter 43 and primary filter bag 74 are shown in FIGS. 21a-e.

FIGS. 22-25g show various views of the master module 10 or the main filter module 20 showing filtration in some instances. The operation of the breech view door 19 is also shown while FIGS. 25H-1, 25H-2 and 25H-3 emphasize the centrifugal blowers 30 equipped with pressurized exhaust.

Referring to FIGS. 26a-c, the breech view door 19 is the initial entry point of all the mobile filtrated air moving systems described herein and permits instant viewing of the primary filter bag 74 while systems are in operation to monitor debris buildup. The operator may then change bags 74 periodically as warranted. A precision machined plate of ½ inch Lexan 21 is installed inside the stainless steel outside frame 22. A gasketed ring 27 is then bolted on the Lexan "window".

FIGS. 27A-D show views of blower 30 including tube axial and centrifugal blowers equipped with pressurized exhaust.

Two commercially available air nozzles are pictured in FIGS. 27A-D. One is an adjustable transvector blow tip 59 and the other is a pre-set compressed air amplifier 59a. The purpose of pressurized exhaust is two fold. Firstly, by feeding a constant supply of compressed air out the mouth of any of the blowers 30 connected to the systems mentioned herein through one of the air nozzles, a rapidly moving air channel is "punched" into surrounding ambient air. This permits the exhaust created by the blower 30 to travel more freely and with less static resistance thus allowing the blower 30 to operate more efficiently. Secondly, when the blower exhaust is equipped with an exhaust chute 133, the compressed air acts to inflate the chute 133 to allow exhaust to travel unhindered. This action provides optimum efficiency of the blower and thereby the entire system.

The retractable blast door 158 is shown in FIG. 28 installed on any commercially available truck or trailer 159 with any of the mobile filtrated air moving systems mentioned herein equipped with centrifugal blowers 30 operating inside a truck or trailer 159. When in operation, the door 158 is lowered by means of cables. The cable lengths are pre-determined to achieve the desired angle of the blast door of 25 degrees to the ground. At the tip of the blast door 158 is a triangular wedge that runs across the entire width of the blast door 158 which provides a surface of 42.5 degrees to the ground. As the system operates and exhaust is directed in the direction of the arrows 160 out the side of the truck or trailer, the exhaust hits the blast door deflecting up to 25 degrees and then to 42.5 degrees as it leaves the end of the tip. This arrangement permits safe operation of the equipment since the exhaust is directed up and away from the vehicle and dissipates safely in the surrounding atmosphere above pedestrians and onlookers. The blast door 158 is also equipped with an attachable skirt 161 that is constructed out of strips of brightly colored fabric normally hanging to the ground that acts as a potential hazard warning to pedestrians and onlookers.

FIGS. 29 and 29a show a tube axial blower 30 mounted on a hydraulic lift platform 162 mounted inside a truck or trailer 159. When any of the mobile filtrated air moving systems mentioned herein equipped with tube axial blowers 30 are operating inside a truck or trailer 159 the hydraulic platform 162 is raised so that the blower 30 can be connected to a stationary ceiling vent 163 by means of an exhaust chute 165. This permits the exhaust to be safely directed out the top of the truck or trailer 159 and safely dissipated in the surrounding atmosphere above pedestrians and onlookers.

Figure 30C:
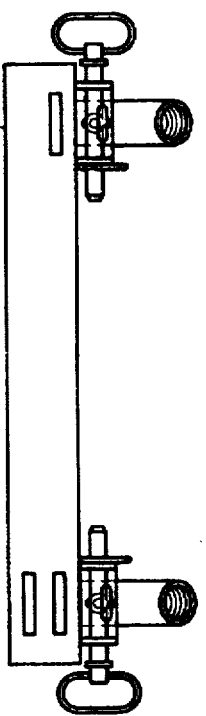

FIGS. 30a–c show a view of a plenum plate 79 which permits secure and convenient access to an H.V.A.C. system for the purpose of attaching ducting to a mobile filtrated air moving system. When in use, a hole 110 (not shown) is cut into a duct 12 (not shown) or plenum 79 that matches the hole on the plenum plate 110 for access into the H.V.A.C. system. An air tight seal is made by means of anchoring the plenum plate 110 by use of sheet-metal screws drilled through the pre-punched holes of the plate 110, using velcro strapping looped through the side slots on the outside flange which is secured around the duct or plenum 110 or commercially available adjustable extension poles screwed into the female swivels 165 found on opposing corners of the plenum plate 79 and propped against some firm surface adjacent to the area. An airtight seal results as the compression gasket on the reverse side of the plenum plate is compressed against the duct 12 or plenum. Ducting 12 is attached to the gasketed ring 164 by means of a coupler.

Figure 31C:
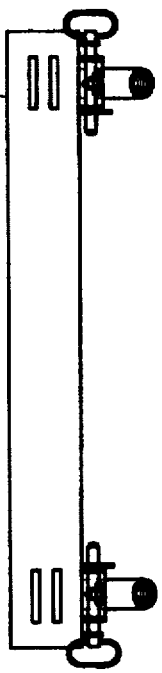

FIGS. 31a–c show views of the exhaust plenum plate 79 which permits secure and convenient access to an H.V.A.C. system for the purpose of exhausting filtered air back into the H.V.A.C. system to create improved air movement for cleaning purposes.

The attachment procedure of the exhaust plenum plate 79 is the same as described for the plenum plate. The flanged ring that is attached to the exhaust plenum plate 79 has the flanged end projecting out. This permits secure and easy attachment of an exhaust chute leading from one of the centrifugal or tube axial blowers mention herein.

Figure 32B:
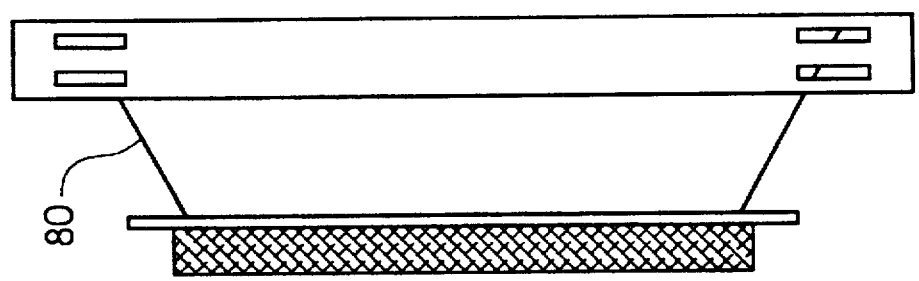

In FIGS. 32a–b, a plenum reducer 80 is shown which permits access into an H.V.A.C. system where size of the available duct or plenum 79 of the H.V.A.C. system is smaller preventing use of the plenum plate 79. The plenum reducer 88 is attached by means of sheet metal screws and/or strapping to H.V.A.C. systems ducting 12 or plenum 79 after a rectangular hole is cut matching the plenum reducer's back face. An airtight seal is then made as the compression gasket is compressed against the duct 12 or plenum 79 to connect the plenum reducer 80 and the mobile filtrated air moving system. The system is attached with couplers to the gasketed rings of the plenum reducer and the breech view door 19.

FIGS. 33a and b are a view of the ducting T which permits evacuating air out of an H.V.A.C. system at two locations at once. Each of the three legs 174 is gasketed so that couplers may be used to create an airtight seal to the ducting.

Figure 34:
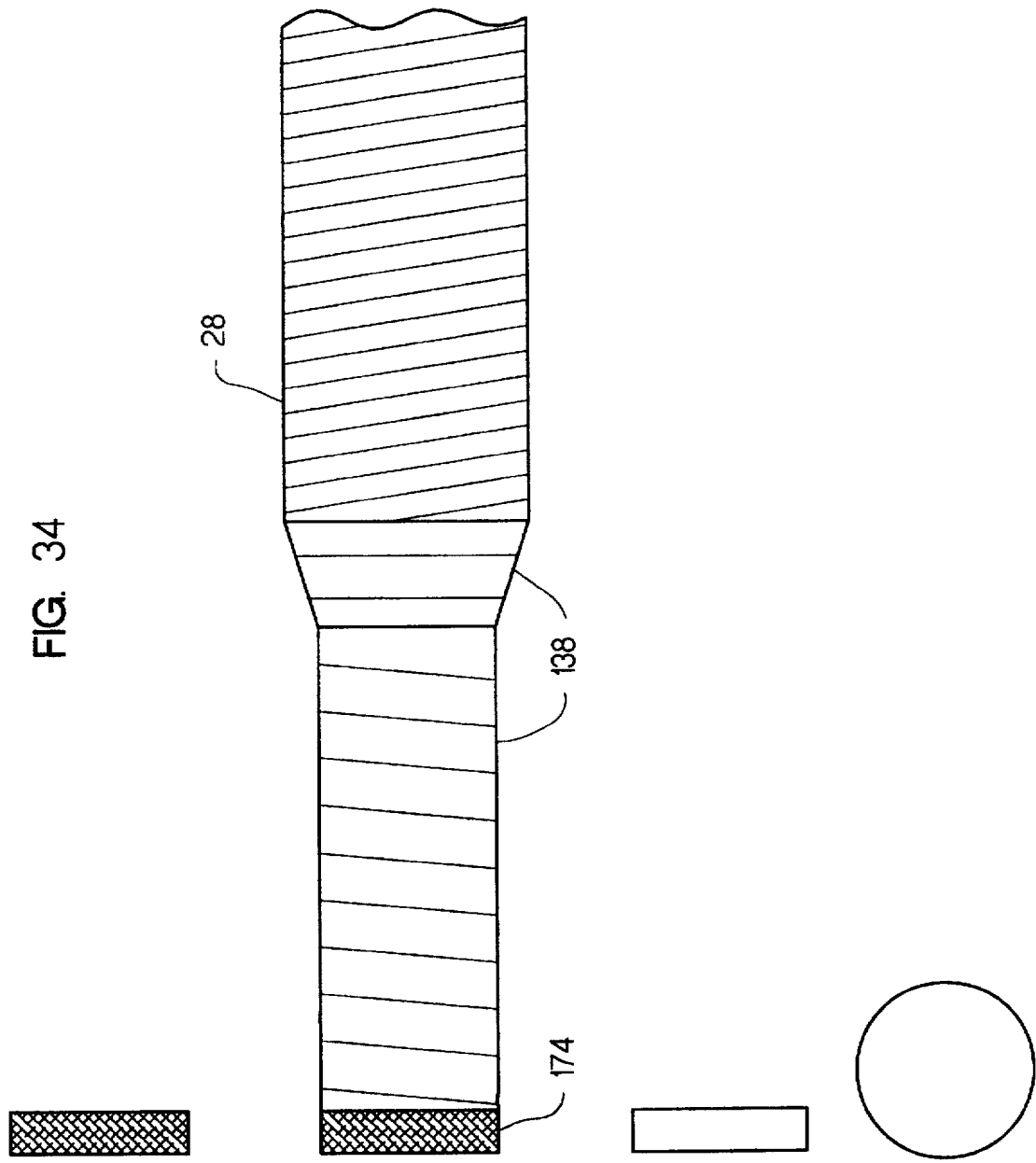
Figure 35:
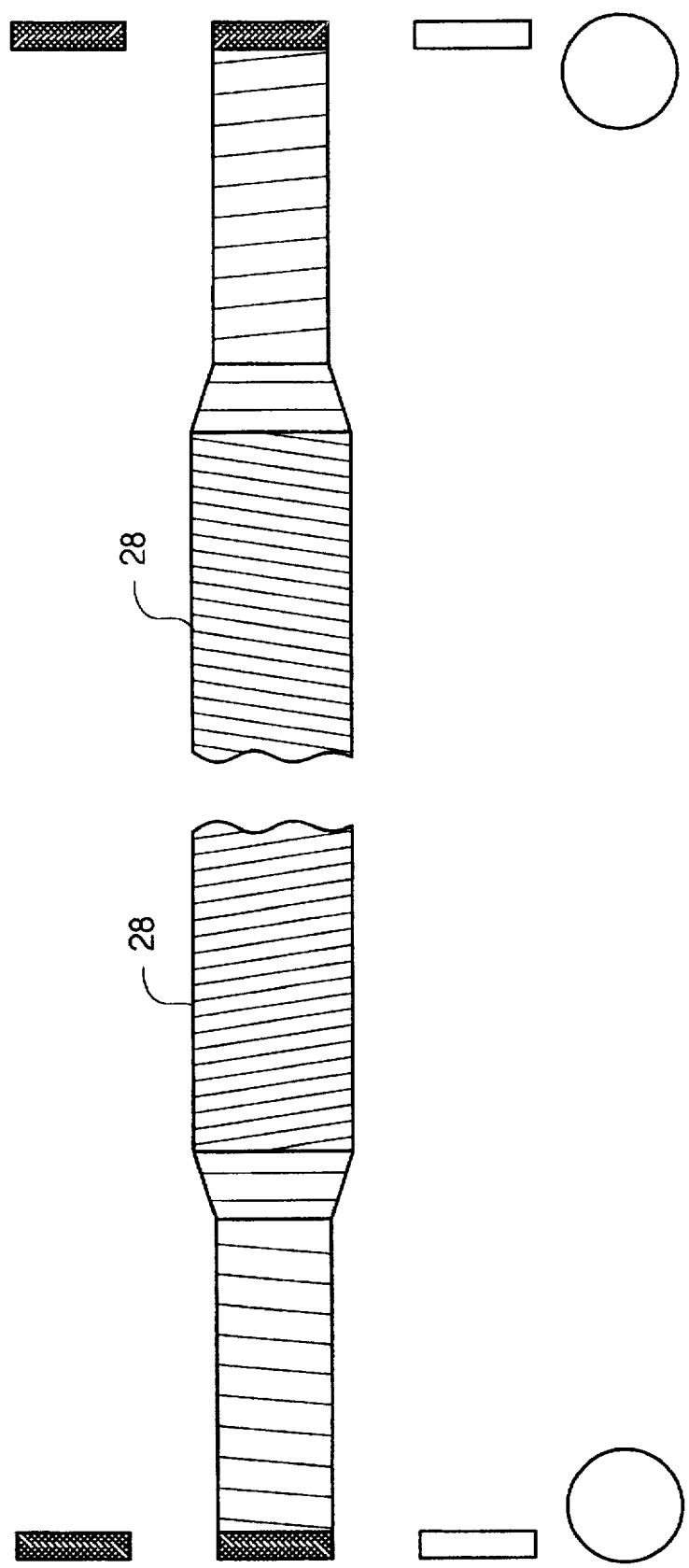
Figure 40B:
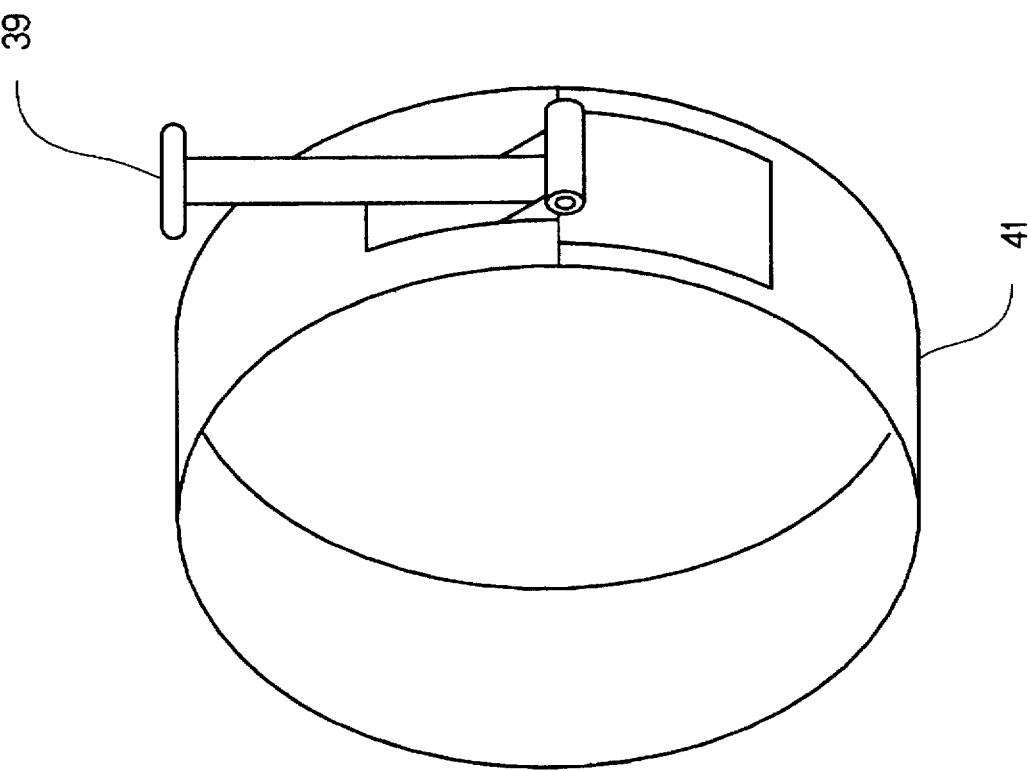
Figure 40A:
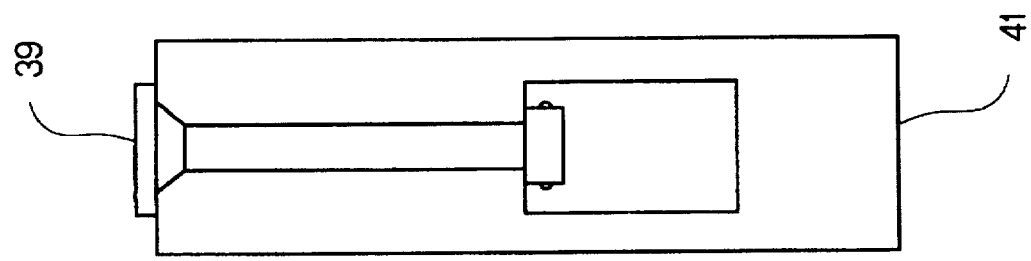

FIGS. 34–40B show views of connections of ovalized ducting to the plenum plate 79, plenum reducer 80, ovalized ducting 28 to ovalized ducting 138 to the breech view door 19, connections made with tapered ducting, connection made with transitional ducting between modules. FIG. 1 through FIG. 7 show views of connections using the ducting T 39. The ovalized ducting 138 pictured in FIG. 34 shows an aluminum ring 175 that is captured inside the end cuff of each end of the ducting length. A gasket is then fitted over the outside material of both end cuffs. The same configuration holds true for any of the transitional ducting and tapered ducting. Since all equipment modules, ducting ends and accessories mentioned herein have gasketed rings and are sized to match their respective hookup positions, sized couplers for each connection are then attached and tightened accordingly to connect all elements of the system. The coupler is stainless steel and by means of an adjustable T handle 39 can be loosened or tightened at will. When tightening a coupler to create a desired connection, the coupler captures the two adjoining gasketed rings of the different elements being joined. As the T handle is tightened, the air tight connection is made by the compression of the gaskets capturing the various internal rings which provide rigidity to allow for maximum tightness of the connection.

Ovalized ducting 138 contains three elements other than the above mentioned gasketed end cuffs. On either end there are circular sections corresponding size wise to the end rings. Then there are two transitional sections on either end that convert the circular sections to one large middle ovalized section. The ovalized section is designed dimensionally to match the square inch cross section of the circular sections so as not to impede or restrict air flow. The ovalized ducting makes radius bends in very tight areas unlike circular ducting as well as having to transit through small building openings where the corresponding circular section would have difficulty.

The tapered ducting shown in FIGS. 41a–e permits gradual focusing of air movement from a large to a smaller ring without creating an increase in static pressure due to an abrupt sized difference in ducting and equipment outlet and inlet rings.

The exhaust director 132 in FIGS. 42a–d permits secure attachment of exhaust chutes 133 and particulate arrestance bags 134 used in the herein mentioned systems. The exhaust director 132 is constructed so that it has sufficient weight to direct high speed exhaust safely. The rings 173 are attached to the face plate with the flanged sides projecting out so that chutes and bags can be conveniently and securely attached.

FIGS. 43a–b are views of the manifold protector 84 which was described previously.

FIGS. 44a–c are views the no scratch quick connect 90. The device uses commercially available brass swivel barbs 96 that permit commercially available compressed air hoses (not shown) to be installed on either end. Since the device screws together to create the connection, the swivel barbs will rotate freely so that the male and female connections of the device remain secure while work progresses. Once air hoses are connected to each barb, there are no surfaces of the device that can scratch flooring, woodwork, or furniture.

FIGS. 45a–c are views of the commercial air hose caddy 111 while FIGS. 46a–c are views of the residential air hose caddy 113. Also shown are an array of the various air heads, male and female plastic quick connects, shut off valve lengths of five foot plastic tubing for inflating the air duct bladder, as well as lengths equipped with duct lights 128.

FIG. 47 shows an array of the various air heads 104 in an air duct 12 with access holes 110 cut to allow for entry with commercially available air guns 101. FIGS. 48a–d show views of the duct resonator 124 which includes louvers 125, driven by gears 172.

FIGS. 49a–b are views of the air duct bladder 120 as previously described. Additionally, this device is constructed out of Kevlar which permits reliable inflation of the bladder 120 inside any air duct regardless of protruding screw heads or other sharp corners or edges that are typically a hazard when attempting to inflate latex or rubber balloons for the same purpose. Also, a male quick connect is attached to the bladder for convenient and sure inflation with an air line through valve 121. FIG. 50 shows the air duct bladder 120 being inflated inside an air duct.

FIGS. 51a and b are views of the exchanger mattress 136. The sewn sections 171 contain pea gravel to weight the mattress sufficiently so that air movement within the H.V.A.C. system does not move it while cleaning is taking place.

Figure 52C:
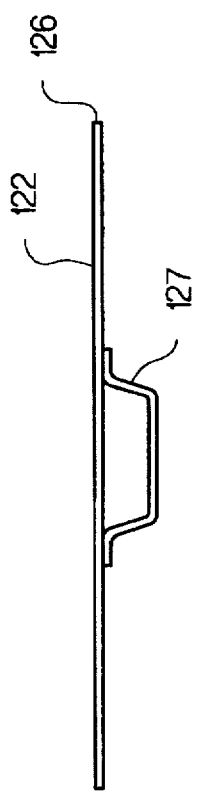

In FIGS. 52a–c, detail views of the vent vac cover 121, which seals off the plenum openings 79, are shown. As mentioned previously, the magnetized surface 122 adheres to the metal plenum 79 to seal the opening.

FIGS. 53a–g show views of the duct illuminator which comprises a plurality of light emitting tubes 128 mounted about an air hose 102 in circumferential holder 129. The chemically reactive light tubes 128 illuminate the interior of the duct work without any electrical requirement or hazard. The tubes are bent or twisted, causing a chemical reaction which emits light for approximately 6 to 8 hours. This permits the workers to visually monitor the duct cleaning operation by inserting an air hose with the illuminator mounted thereon.

Finally, FIGS. 54a–c show the truck tire trap 131 which prevents the carts from rolling out of position. The trap comprises a base and raised portion which lock the wheels in position.

While the invention has been explained by a detailed description of certain specific embodiments, it is understood that various modifications and substitutions can be made in any of them within the scope of the appended claims which are intended also to include equivalents of such embodiments.

What is claimed is:

1. A cleaning system for H.V.A.C. air ducts comprising:
    a tube axial blower having a pressurized exhaust and an inlet, said blower providing a vacuum to draw air through the tube axial blower and through an air duct to which the tube axial blower is connected;
    a variable frequency drive interconnected with the tube axial blower;
    a filter means having a first end and a second end, the filter being coupled to an air duct at the first end and to the tube axial blower inlet at the second end to filter air drawn into the tube axial blower from the air duct; and
    portable means for mounting the blower and the filter means thereon.

2. The system of claim 1 wherein the tube axial blower operates on three-phase electrical power and the system further comprises means for converting single-phase power to three-phase power to drive the tube axial blower.

3. The system of claim 1 wherein the portable means comprises can means for receiving and supporting the tube axial blower and the filter means.

4. The system of claim 3 wherein the tube axial blower and the filter means have casters thereon and can be used to facilitate movement of the tube axial blower and the filter means when the tube axial blower and the filter means are detached from the cart means.

5. The system of claim 4 wherein the filter means further comprises a filter bag and a transparent breech view door and the filter bag is viewed and accessed through the transparent breech view door.

6. An H.V.A.C. duct cleaning system comprising:
    a tube axial blower having first and second ends for creating an air flow;
    variable frequency drive means interconnected with the tube axial blower for varying the speed of the tube axial blower;
    preliminary filter means interconnected with the first end of the tube axial blower for filtering the air flow; and
    duct connection means for connecting the preliminary filter means to a H.V.A.C. duct.

7. The system of claim 6 wherein the tube axial blower operates on three-phase electrical power and the system further comprises means for converting single-phase power to three-phase power to drive the tube axial blower.

8. The system of claim 6 further comprising cart means for receiving and supporting the tube axial blower and the preliminary filter means.

9. The system of claim 8 wherein the tube axial blower and the preliminary filter means have casters thereon and can be used to facilitate movement of the tube axial blower and the preliminary filter means when the tube axial blower and the preliminary filter means are detached from the cart means.

10. The system of claim 9 wherein the preliminary filter means further comprises a filter bag and a transparent breech view door, and the filter bag is viewed and accessed through the transparent breech view door.

* * * * *